(12) United States Patent
Strub et al.

(10) Patent No.: US 6,825,875 B1
(45) Date of Patent: Nov. 30, 2004

(54) HYBRID RECORDING UNIT INCLUDING PORTABLE VIDEO RECORDER AND AUXILLARY DEVICE

(75) Inventors: Henry B. Strub, Lincolnwood, IL (US); David A. Burgess, Fairfield, CA (US); Kimberly H. Johnson, San Francisco, CA (US); Jonathan R. Cohen, San Francisco, CA (US); David P. Reed, Needham, MA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/557,101

(22) Filed: Apr. 21, 2000

Related U.S. Application Data

(63) Continuation of application No. 09/408,284, filed on Sep. 29, 1999, now abandoned.
(60) Provisional application No. 60/114,808.

(51) Int. Cl.[7] ........................ H04N 5/225; H04N 7/18
(52) U.S. Cl. .................................. 348/207.99; 348/158
(58) Field of Search .............................. 348/207, 232, 348/376, 158, 207.99, 231.3; 386/1, 46, 95, 96, 98; 360/27; 396/58

(56) References Cited

U.S. PATENT DOCUMENTS

| | | | |
|---|---|---|---|
| 3,884,403 A | 5/1975 | Brewer | 224/5 V |
| 3,919,475 A | 11/1975 | Dukich et al. | 178/7.91 |
| 4,033,488 A | 7/1977 | Brewer | 224/5 V |
| 4,051,534 A | 9/1977 | Dukich et al. | 358/210 |
| 4,131,919 A | 12/1978 | Lloyd et al. | 360/9 |
| 4,446,997 A | 5/1984 | Himberg | 224/151 |
| 4,526,308 A | 7/1985 | Dovey | 224/265 |
| 4,536,066 A | 8/1985 | Bauer | 352/35 |
| 4,714,184 A | 12/1987 | Young et al. | 224/253 |
| 4,837,817 A | 6/1989 | Maemori | 358/224 |
| 5,012,335 A | 4/1991 | Cohodar | 358/108 |
| 5,146,353 A | * 9/1992 | Isoguchi et al. | 348/232 |
| 5,185,667 A | 2/1993 | Zimmermann | 358/209 |
| 5,262,856 A | 11/1993 | Lippman et al. | 358/136 |
| 5,295,089 A | 3/1994 | Ambasz | 364/708.1 |
| 5,396,583 A | 3/1995 | Chen et al. | 395/127 |
| 5,416,310 A | 5/1995 | Little | 235/462 |
| 5,436,542 A | 7/1995 | Petelin et al. | 318/567 |
| 5,438,362 A | 8/1995 | Tabuchi | 348/211 |

(List continued on next page.)

OTHER PUBLICATIONS

Frost III, Otis, "An Algorithm for Linearly Constrained Adaptive Array Processing," Proceedings of the IEEE, vol. 60, No. 8, Aug. 1972, pp. 926–935.

(List continued on next page.)

*Primary Examiner*—Wendy R. Garber
*Assistant Examiner*—Luong T. Nguyen
(74) *Attorney, Agent, or Firm*—Van Pelt & Yi LLP

(57) ABSTRACT

The invention enables "low attention recording," i.e., recording that need not appreciably affect interaction of a recorder (i.e., a person in control of a recording unit according to the invention) or others with the environment in which the recording is taking place. The low attention recording enabled by the invention can be particularly advantageously employed in "social recording," i.e., recording in which multiple participants in an event are recording the event. As described in more detail below, advantageous aspects of the invention can be provided by a small, lightweight, wearable recording unit. In particular, a "hybrid recording unit" having the above-described characteristics and advantages is constructed by adding to a portable video recorder (e.g., camcorder, portable dockable videotape recorder (VTR)) one or more devices (an "auxiliary device") that provide additional functionality to the portable video recorder. The auxiliary device can advantageously provide, for example, one or more of the following capabilities: marking, position sensing, physiological monitoring and/or biometric identification.

8 Claims, 10 Drawing Sheets

U.S. PATENT DOCUMENTS

| | | | | |
|---|---|---|---|---|
| 5,467,271 A | | 11/1995 | Abel et al. | 364/420 |
| 5,477,331 A | | 12/1995 | Yamaguchi et al. | 358/296 |
| 5,486,852 A | | 1/1996 | Arai | 348/211 |
| 5,488,409 A | * | 1/1996 | Yuen et al. | 360/27 |
| 5,510,830 A | | 4/1996 | Ohia et al. | 348/36 |
| 5,514,861 A | | 5/1996 | Swartz et al. | 235/472 |
| 5,524,193 A | | 6/1996 | Covington et al. | 395/154 |
| 5,546,145 A | | 8/1996 | Bernardi et al. | 354/76 |
| 5,550,754 A | | 8/1996 | McNelley et al. | 364/514 |
| 5,575,443 A | | 11/1996 | Honeycutt | 248/231.9 |
| 5,583,571 A | | 12/1996 | Friedland | 348/373 |
| 5,594,498 A | | 1/1997 | Fraley | 348/158 |
| 5,604,551 A | * | 2/1997 | Choi et al. | 396/58 |
| 5,613,032 A | * | 3/1997 | Cruz et al. | 386/69 |
| 5,678,793 A | | 10/1997 | Hill | 248/206.3 |
| 5,684,514 A | | 11/1997 | Branscomb | 345/185 |
| 5,692,661 A | | 12/1997 | Kellerman | 224/648 |
| 5,694,474 A | | 12/1997 | Ngo et al. | 381/66 |
| 5,713,021 A | * | 1/1998 | Kondo et al. | 345/723 |
| 5,717,814 A | * | 2/1998 | Abecassis | 386/46 |
| 5,717,869 A | | 2/1998 | Moran et al. | 395/339 |
| 5,726,660 A | | 3/1998 | Purdy et al. | 342/357 |
| 5,729,108 A | | 3/1998 | Steele | 318/575 |
| 5,740,037 A | | 4/1998 | McCann et al. | 364/400 |
| 5,742,339 A | * | 4/1998 | Wakui | 348/232 |
| 5,742,517 A | | 4/1998 | Van Den Bosch | 364/507 |
| 5,749,010 A | | 5/1998 | McCumber | 396/420 |
| 5,752,113 A | | 5/1998 | Borden | 396/428 |
| 5,768,640 A | | 6/1998 | Takahashi et al. | 396/310 |
| 5,768,648 A | | 6/1998 | Skipp et al. | 396/428 |
| 5,796,426 A | | 8/1998 | Gullichsen et al. | 348/207 |
| 5,826,206 A | * | 10/1998 | Nemeth | 386/70 |
| 5,886,739 A | | 3/1999 | Winningstad | 348/158 |
| 5,940,004 A | | 8/1999 | Fulton | 340/825.49 |
| 5,982,979 A | * | 11/1999 | Omata et al. | 386/69 |
| 6,118,925 A | * | 9/2000 | Murata et al. | 386/83 |
| 6,160,950 A | * | 12/2000 | Shimazaki et al. | 386/95 |
| 6,243,725 B1 | * | 6/2001 | Hempleman et al. | 707/530 |
| 6,351,599 B1 | * | 2/2002 | Komeno | 386/70 |
| 6,360,234 B2 | * | 3/2002 | Jain et al. | 707/500.1 |
| 6,377,519 B1 | * | 4/2002 | Lee et al. | 386/55 |

OTHER PUBLICATIONS

Flanagan, J.L. et al., "Computer–steered microphone arrays for sound transduction in large rooms," J. Acoust. Soc. Am. 78 (5), Nov. 1985, pp. 1508–1518.

Grenier, Yves, "A microphone array for car environments," Speech Communication, vol. 12, No. 1, Mar. 1993, pp. 25–39.

Szeliski, Richard et al., "Creating Full View Panoramic Image Mosaics and Environment Maps," Computer Graphics Proceedings, Annual Conference Series, 1997, pp. 251–258.

Haeberli, Paul et al., "Automatic Panoramic Image Merging," World Wide Web, Grafica Obscura, 1998, 2 pages.

Szeliski, Richard, "Video Mosaics for Virtual Environments," IEEE Computer Graphics and Applications, Mar. 1996, pp. 22–30.

Mann, S. et al., "Virtual Bellows: Constructing High Quality Stills from Video," IEEE, 1994, pp. 363–367.

Mann, S. et al., "Video Orbits of the Projective Group: A simple approach to featureless estimation of parameters," IEEE Trns. Image Proc., Jul. 1997.

Kelly, Patrick H. et al., "An Architecture for Multiple Perspective Interactive Video," Multimedia 1995, pp. 201–212.

"Informedia: Experience on Demand," DARPA/ITO Joint IC and V/IM Principal Investigator Meeting, Oct. 15–17, 1997.

Gemperle, Francine et al., "Design for Wearability," IEEE, 1998, pp. 116–122.

World Wide Web page illustrating Alain Mikli La Lunette Camera Sunglasses, Jul. 27, 1998, 1 page.

World Wide Web pages regarding 1998 Everest Expedition Datacam Technology, Jul. 31, 1998, 2 pages.

Good Guys Circular, "JVC Compact Super–VHS Modular Component Video System," Nov. 1991 or 1992, 1 page.

Healey, Jennifer et al., "StartleCam: A Cybernetic Wearable Camera," Second International Symposium on Wearable Computers, Oct. 19–20, 1998, pp. 42–49.

Description of Toyoda Machinery USA's Virtual Tech system, believed to be in use in Japan in 1998, 2 pages.

World Wide Web page describing Supercircuits GC1 Professional Grade Color Covert Glasses Cam, 1998, 1 page.

World Wide Web pages describing Rock House Products Covert Video/Audio Sunglasses, 1998, 2 pages.

"Evolution of Steve Mann's 'existential computer'('wearable computer') invention developed for applications in 'personal imaging'", IEEE Computer Society, 1998, 1 page.

Product description for Studio Master Time Code and Sync Generators, Horita Co., Inc., Viejo, California, 1998.

Product description for SMPTE Time Code Products for GPS Video Position Logging, Horita Co., Inc., Viejo, California, 1998.

Slaney, Malcolm et al., "Baby Ears: A Recognition System for Affective Vocalizations," Proceeding of the 1998 International Conference on Acoustics, Speech, and Signal Processing (ICASSP), Seattle, WA, May 12–15, 1998.

Forsyth, David et al., "Searching for Digital Pictures," Scientific American, Jun. 1997.

Froba, Bernhard et al., "Multi–Sensor Biometric Person Recognition in an Access Control System," Proceedings Second International Conference on Audio– and Video–Based Biometric Person Authentication, Mar. 22–23, 1999, Washington, D.C., pp. 55–59.

Healey, Jennifer et al., "Quantifying Driver Stress: Developing a System for Collecting and Processing Bio–Metric Signals in Natural Situations," Proceedings of the Rocky Mountain Bio–Engineering Symposium, Apr. 16–18, 1999.

Scheirer, Eric et al., "Construction and Evaluation of a Robust Multifeature Speech/Music Discriminator," Proc. ICASSP–1997, Apr. 21–24, Munich, Germany.

Chen, Francine et al., "The Use of Emphasis to Automatically Summarize a Spoken Discourse," 1992 IEEE International Conference On Acoustics, Speech and Signal Processing, Mar. 23–26, 1992, pp. I–229 to I–232.

Rosenberg, Aaron et al., "Recent Research in Automatic Speaker Recognition," *Advances in Speech Signal Processing*, 1992, pp. 701–738.

Phillips, P. Jonathon et al., "the FERET Evaluation," *Face Recognition: From Theory to Applications*, 1998, pp. 244–261.

Senior, Andrew, "Face and feature finding for a face recognition system," Proceedings Second International Conference on Audio– and Video–based Biometric Person Authentication, Mar. 22–23, 1999, Washington, D.C., pp. 154–159.

Sony ClipLink Guide, pp. 9–14, 1996.

Sony PowerHAD digital camcorder operating instructions, pp. 65–71, 1998.

Hall, Allan, "A new spin on power dressing," Associated Newspapers Ltd., Sep. 14, 1999.

* cited by examiner

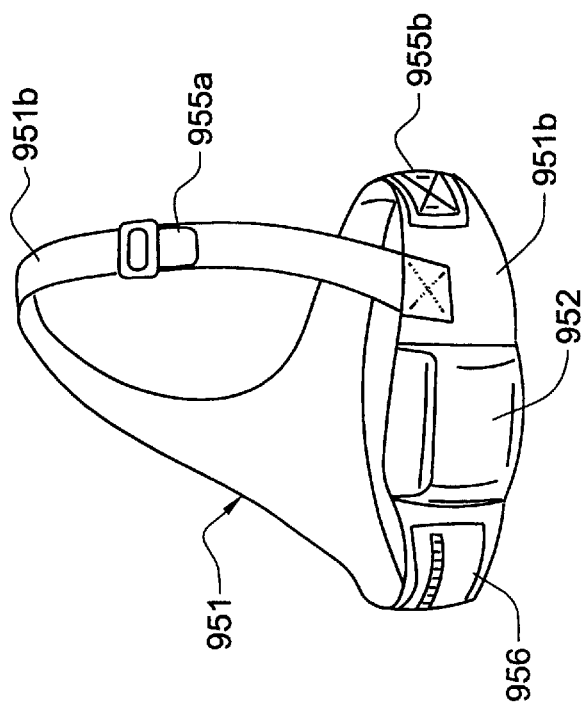
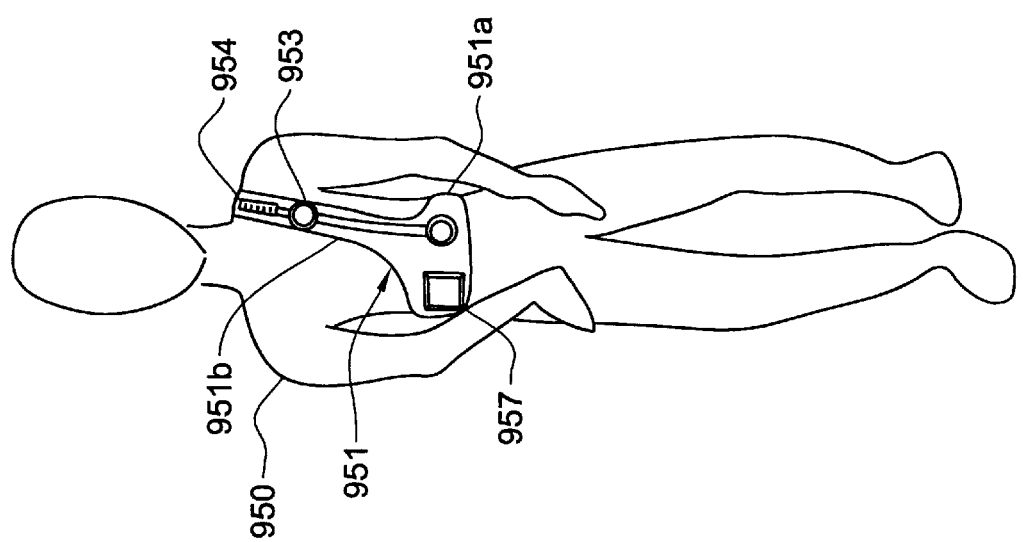
Figure 9B
Figure 9A

HYBRID RECORDING UNIT INCLUDING PORTABLE VIDEO RECORDER AND AUXILLARY DEVICE

This Application claims the benefit of Provisional Application No. 60/114,808, filed Jan. 5, 1999. This is a continuation of application Ser. No. 09/408,284, file Sep. 29, 1999, now abandoned.

CROSS-REFERENCE TO RELATED APPLICATIONS

This application is related to the following commonly owned, co-pending United States Patent Applications, filed on the same date as the present application, the disclosures of which are incorporated by reference herein: "Low Attention Recording, with Particular Application to Social Recording," by Henry B. Strub et al., Ser. No. 09/408,481; and "Low Attention Recording Unit for Use by Vigorously Active Recorder," by Henry B. Strub et al., Ser. No. 09/408,482.

BACKGROUND OF THE INVENTION

1. Field of the Invention

This invention relates, in general, to recording an event and to devices used to record an event. The invention further, and more particularly, relates to recording an event in which multiple persons participate (a "group event") and, even more particularly, to recording of the event by multiple participants (i.e., from multiple points of view), often simultaneously. Most particularly, the invention relates to a "hybrid recording unit" having capabilities useful in such recording that is constructed by adding to a portable video recorder one or more devices that provide additional functionality to the portable video recorder.

2. Related Art

It is often desirable to record the content of an event by obtaining a visual record of the event. People often desire to capture a visual record of an event (particularly one in which they participate) as a way of facilitating reminiscence of the event. Or, a person may desire to communicate the content of an event to one or more other people who were not present. However, existing devices for obtaining a visual record of an event have characteristics that can diminish their desirability as tools for recording an event, particularly when the person operating the recording device desires to participate in the event.

A camera ("still camera") for taking a still photograph is one example of a device that has been used to obtain a visual record of an event. However, still photographs can be deficient in representing the content of an event. Some (usually, most) of the visual content of the event is necessarily lost (e.g., the visual content that occurs between the times that photographs are taken). It is also difficult to capture interesting activity that occurs spontaneously, since, absent fortuity, a photograph will not be taken during the occurrence—or, at least, at the beginning of the occurrence—of such activity. Further, the content that is captured lacks context and motion that can convey the nuance and/or vitality of the event. Additionally, a still camera does not record audio content. In addition to deficiencies in the recording of content, use of a still camera also typically requires sufficient attention from the operator of the camera (e.g., aiming of the camera and setting of camera control parameters) that the camera operator cannot participate in the event when a photograph is being taken. (Use of a tripod and timer can eliminate this problem, but generally eliminates the spontaneity of the recorded content as well, and typically requires rather elaborate setup that may not be compatible with the event or be conducive to maximum enjoyment of the event by either the camera operator or other participants in the event.) The camera operator can be further distracted from participation in the event by the need to carry the camera even when the camera is not in use. Additionally, in normal operation of a still camera, the camera operator is not part of the photograph. (This may be particularly undesirable when a primary purpose of the camera operator in obtaining the visual recording is to facilitate later reminiscence of the event.) Further, the use of a typical still camera is readily apparent to other people in the vicinity of the camera operator; such awareness of the use of the camera may cause people to alter their activity (if they perceive that they are within the field of view of the camera) or otherwise interfere with the taking of photographs that record the "natural" occurrence of the event.

A camcorder is another example of a device that has been used to obtain a visual record of an event. Since a camcorder can continuously record an event, and since a camcorder can record audio content, a camcorder can, to some extent, overcome the above-noted deficiencies of a still camera in representing the content of an event. However, since the camcorder operator must focus a considerable amount of attention on operation of the camcorder, the camcorder operator is, to a significant extent, prevented from being an active participant in the event being recorded. Even if the camcorder is not being used at particular time to record the event, carrying the camcorder can prevent or significantly impede participation in the event. Moreover, the inconvenience of using a camcorder may generally deter the camcorder operator from using the camcorder, thus tending to reduce the number of events that are recorded or the amount of a particular event that is recorded. Additionally, the camcorder operator is, excepting atypical operation of the camcorder, not included in the visual recording of the event. Further, camcorders are constructed so that their use is readily apparent to others; such awareness may result in a change in behavior of people within and/or near the field of view of the camcorder so that the content of the recording is artificially altered from the content that would have occurred had the event proceeded naturally (i.e., without awareness by participants in the event of the recording). Typical camcorders also have physical deficiencies which can inhibit their operation. For example, battery capacity is often limited to an extent that undesirably limits the duration of time that the camcorder can operate without interruption. Consumer camcorders also typically are constructed such that the quality of the audio recording obtained may be deficient: the microphone(s) commonly pick up background noise associated with operation of the camcorder motor and are typically positioned at a single location so that sound is sensed from only one point of view.

Often, an event that it is desirable to visually record is a "group event" (i.e., an event observed, or participated in, by multiple persons). Often, some or all of the people that are part of a group event are associated by a desire to share the experience of the event together. A group hike is an example of such an event. A family's trip to an amusement park is another example of such an event. Such group events are frequently events that it is desired to record in order to facilitate later reminiscence. Further, such group events are also often events in which the associated people desire to participate.

Recording of a group event using a still camera or camcorder suffers from the deficiencies (e.g., inhibition of participation in the event by the operator of the recording device, as well as lack of presence of the operator in the recording of the event) described above. However, aside from those deficiencies, recording of a group event presents additional challenges.

For example, the use of a single recording device—of any type—to record a group event limits the content of the recording, since the recording can only be obtained from a single point of view. When a camcorder is used to record an event, it is often the case that a single camcorder is used. (This is especially so because camcorders are so cumbersome to use.) Further, though it may be more likely that multiple (or even all) participants in a group event carry a still camera, typically only one participant takes a photograph at any given time, thus providing only a single point of view from which the event is recorded at a particular time.

Additionally, even if multiple devices are used to record a group event, still cameras and camcorders suffer from other limitations. For example, existing such devices do not provide for sharing of recordings between devices during the event, thus inhibiting or preventing coordination of recording by multiple devices so as to best capture the content of the event (e.g., so as to increase the amount of different content recorded, increase the number of participants recorded and/or record interesting content from multiple viewpoints). Additionally, existing consumer devices do not provide for synchronization in time or coordination in space of the recordings obtained by the devices, making it difficult to later present the recordings together in a coherent fashion. It is typically desirable to acquire a visual recording at a distance from the content being recorded (so as to include more visual content), while it is typically desirable to acquire an audio recording near the content being recorded (so as to make it easier and less expensive to record proximate audio content), a conflict that might potentially be overcome by mixing of multiple recordings of an event obtained at different locations by different recording devices. However, the inability to coordinate and synchronize recordings obtained by multiple still cameras and/or camcorders inhibits the use of those multiple recordings in a manner that mitigates the above-described tension between visual and audio recording (e.g., by mixing a visual recording of content obtained at a distance by one recording device with an audio recording acquired near that content by a different recording device).

During recording of an event, it can be desirable to mark the recording. Some recording devices (e.g., some camcorders) can enable a mark of a single type to be associated with recording data at the time the recording data is obtained, the mark intended to indicate that the content represented by the recording data is of interest and may be particularly desirable to view during later display of the recording. The use of such a mark can enable the medium on which the recording data is stored to be searched to identify and display one or more parts of a recording in accordance with the location of mark(s) within the recording.

In a camcorder, marking is most easily implemented by storing marking data on the videotape onto which recording data is recorded. However, storing marking data on a videotape (or other linear data storage medium) has disadvantages. For example, searching for marks can take an undesirably long time, because the entire recording between a current location within the recording and a marked location within the recording must be traversed to reach the marked location. Additionally, for a similar reason, moving from a display of one marked part of a recording to another marked part of a recording can take an undesirably long time.

It is desirable to have greater flexibility in marking a recording. For example, it is desirable to be able to mark recording data of a recording other than the recording data being obtained at the time the mark is specified. This is particularly so since it may not be realized that it is desirable to mark a part of a recording until some time other than the time at which that part of the recording is being obtained. It is also desirable to be able to mark a recording with marks of different types, each type of mark having a different meaning. Such marking could be used to better facilitate searching and/or display of the recording by enabling increasing specificity in the identification of the content of parts of the recording. Further, it is desirable to store recording data and marking data on a non-linear data storage medium, since that enables faster searching for occurrence of a mark in a recording and also enables more flexible movement between different marked parts of a recording.

SUMMARY OF THE INVENTION

The invention enables "low attention recording," i.e., recording that need not appreciably affect interaction of a recorder (i.e., a person having the capability of controlling a recording unit according to the invention) or others with the environment in which the recording is taking place. The low attention recording enabled by the invention can be particularly advantageously employed in "social recording," i.e., recording in which multiple participants in an event are recording the event. As described in more detail below, advantageous aspects of the invention can be provided by a small, lightweight, wearable recording unit.

The invention facilitates low attention recording in a variety of ways. In particular, the invention allows a recorder to meaningfully participate in the event while recording the event. For example, as is clearer from the detailed description of the invention below, a recording unit according to the invention can be operated with little or no attention from the recorder (i.e., beginning operation of the recording unit can be accomplished with little effort, and, once turned on to begin recording, operation of the recording unit may not require further interaction from the recorder), the recording unit can be adapted so that the recording unit does not physically interfere (e.g., obstruct vision or movement) with the recorder's participation in the event, and the recording unit can be adapted so that the physical characteristics of the recording unit do not distract the recorder (e.g., the recording unit is not too heavy or bulky). A recording unit according to the invention can also be implemented so that recording of the event by the recording unit does not affect participation in the event by other participants to a significant extent. For example, as described in more detail below, a recording unit according to the invention can be adapted to have a relatively inconspicuous physical appearance and to operate in a relatively inconspicuous fashion.

The invention also facilitates social recording in a variety of ways. For example, a recording unit according to the invention can be adapted to enable recordings to be shared between or among recording units during the event. A recording unit according to the invention can also be adapted to enable recorders to communicate with each other during the event.

The invention can also enable a recording to be marked as an event is being recorded. Marking capability in accordance with the invention can be implemented in a variety of ways. A mark can be specified using a tactile control mechanism (which can be physically integrated with, or separate from, other components of the recording unit) adapted for that purpose or can be specified by a voice command. A mark can also be specified based upon analysis of audio recording data, visual recording data or both. A mark can also be specified, or an existing mark supplemented or modified, based on data other than recording data (e.g., physiological monitoring data, biometric data, position data) that is acquired by the recording unit. Advantageously, the invention can enable the use of multiple types of marks, each type of mark having a particular meaning. The invention can also advantageously enable the specification of a mark so that the mark is associated with recording data obtained at a time other than the time at which the mark is specified, i.e., prior to the time of the mark ("predictive marking") or after the time of the mark ("retrospective marking"). Restropective marking is especially consonant with the goal of unobtrusive, low attention recording, since, often, a recorder who is engaged in participating in the event will not appreciate the desirability of marking particular recording data until some time after activity of interest has occurred. Additionally, the invention can enable marking capability to be implemented so that specification of a mark causes predetermined operation of the recording unit in accordance with the type of the mark ("augmented marking").

In particular, a recording unit (a "hybrid recording unit") according to the invention having the above-described characteristics and advantages is constructed by adding to a portable video recorder (e.g., camcorder, portable dockable videotape recorder (VTR)) one or more devices (an "auxiliary device") that provide additional functionality to the portable video recorder. The auxiliary device can advantageously provide, for example, one or more of the following capabilities: marking, position sensing, physiological monitoring and/or biometric identification.

In one embodiment of the invention, a hybrid recording unit for use in recording an event includes: i) a portable video recorder for acquiring recording data representing the event, the portable video recorder including an external communication port for communicating with an external device; ii) an auxiliary device for producing and/or acquiring auxiliary data during the recording of the event, the auxiliary device including means for communicating with the portable video recorder via the external communication port of the portable video recorder (the auxiliary device also typically includes a non-volatile data storage device for storing auxiliary data, such as an EEPROM or flash memory device); and iii) means for establishing a temporal correspondence between the auxiliary data and recording data. The auxiliary device can advantageously be implemented to acquire auxiliary data that is of a type that cannot be acquired by the portable video recorder.

For example, the auxiliary device can include marking apparatus for specifying one or more marks that are associated with particular recording data acquired by the portable video recorder. Or, for example, the auxiliary device can include apparatus for sensing the position of the hybrid recording unit (e.g., a GPS receiver; a transmitter or receiver for transmitting or receiving, respectively, a signal to a receiver or from a transmitter, respectively, positioned at a known location or on a known device; an electronic compass; a tilt sensor; an inertial reference system). The auxiliary device can also include apparatus for acquiring physiological data representing a physical characteristic of a recorder (e.g., one or more of a heart rate monitoring device, a galvanic skin response measurement device, an EEG monitoring device, an ECG monitoring device, a force sensor, an EMG monitoring device, a body temperature measuring device and a respiration rate measurement device). The auxiliary device can also include a biometric device.

The portable video recorder and auxiliary device can communicate with each other using any of a variety of communication protocols, such as, for example, the LANC protocol, the JLIP protocol, an IEEE 1394 protocol, or a "5-pin editing terminal" protocol. Further, communication between the portable video recorder and auxiliary device can be implemented using wireless and/or wired methods and apparatus.

The temporal correspondence between the auxiliary data and recording data can be established using a method including the steps of: i) causing a synchronization event to occur prior to, or at the time of, beginning recording of the event; ii) producing synchronization data, from the synchronization event, that identifies the recording position, at the beginning of the recording, of a first non-volatile data storage device on which recording data is stored and/or a second non-volatile data storage device on which auxiliary data is stored; and iii) storing the synchronization data. The invention can be implemented so that the method of establishing a temporal correspondence between the auxiliary data and recording data can be performed automatically whenever recording is begun. Further, the invention can be implemented so that the method of establishing a temporal correspondence between the auxiliary data and recording data is not performed if, at the beginning of recording, the recording position of the first non-volatile data storage device at which it is desired to begin storing recording data is a beginning data storage position of the first non-volatile data storage device.

In a further embodiment of the foregoing method, which is particularly applicable when the first non-volatile data storage device is a linear data storage medium (e.g., videotape), the step of causing a synchronization event can further include the steps of: i) identifying a first value of a data counter of the first non-volatile data storage device on which the recording data is stored, the first data counter value corresponding to a recording position of the first non-volatile data storage device at which it is desired to begin storing recording data; ii) operating the first non-volatile data storage device so that the recording position of the first non-volatile data storage device corresponds to a beginning data storage position of the first non-volatile data storage device; iii) identifying a second value of the data counter corresponding to the beginning data storage position; and iv) operating the first non-volatile data storage device so that the recording position of the first non-volatile data storage device again corresponds to the recording position at which it is desired to begin storing recording data. Further, in such an embodiment, the step of producing synchronization data can further include the step of determining a data counter offset by comparing the first and second data counter values, the data counter offset identifying the recording position of the first non-volatile data storage device at the beginning of the recording, and the step of storing the synchronization data can further include the step of storing the tape counter offset. In a still further embodiment of the foregoing method, the step of producing synchronization data further includes the step of providing one or more incremental data counter values during recording, each incremental data counter value being associated with recording data and auxiliary data obtained at the same time, and the step of storing the synchronization data further includes the step of storing the one or more incremental data counter values.

In another further embodiment of the general method described above of establishing a temporal correspondence between the auxiliary data and recording data, the step of causing a synchronization event further includes the step of producing a visual and/or aural phenomenon at the beginning of recording, the step of producing synchronization data further includes the step of operating the first data acquisition device so as to acquire recording data representing the visual and/or aural phenomenon, and the step of storing the synchronization data further includes the step of storing the recording data representing the visual and/or aural phenomenon. The visual and/or aural phenomenon can be, for example, a predefined sound or a flash of light.

In still another further embodiment of the general method described above of establishing a temporal correspondence between the auxiliary data and recording data, in which the first non-volatile data storage device is a videotape, the step of causing a synchronization event further includes the steps of: i) determining whether a time code is stored at the current location of the videotape; ii) if a time code is not stored at the current location of the videotape, rewinding the videotape to a location at which storage of a time code on the videotape is detected; and iii) if a time code is stored at the current location of the videotape, winding the videotape to a location at which storage of a time code on the videotape is not detected, then rewinding the videotape to a location at which storage of a time code on the videotape is detected.

In another embodiment of the invention, an auxiliary device for use with a portable video recorder adapted to acquire recording data representing an event includes: i) apparatus for producing and/or acquiring auxiliary data during recording of the event; ii) apparatus for communicating with the portable video recorder via an external communication port of the portable video recorder; and iii) a non-volatile data storage device for storing auxiliary data. The communication between the auxiliary device and portable video recorder can advantageously be implemented using wireless methods and apparatus.

BRIEF DESCRIPTION OF THE DRAWINGS

FIGS. 9A and 9B are perspective views of a recording unit representing another particular physical instantiation of the recording unit of FIG. 7. FIG. 9A is a front perspective view of the recording unit being worn by a recorder. FIG. 9B is a side perspective view when the recording unit is not being worn by a recorder.

DETAILED DESCRIPTION OF THE INVENTION

Figure 1:
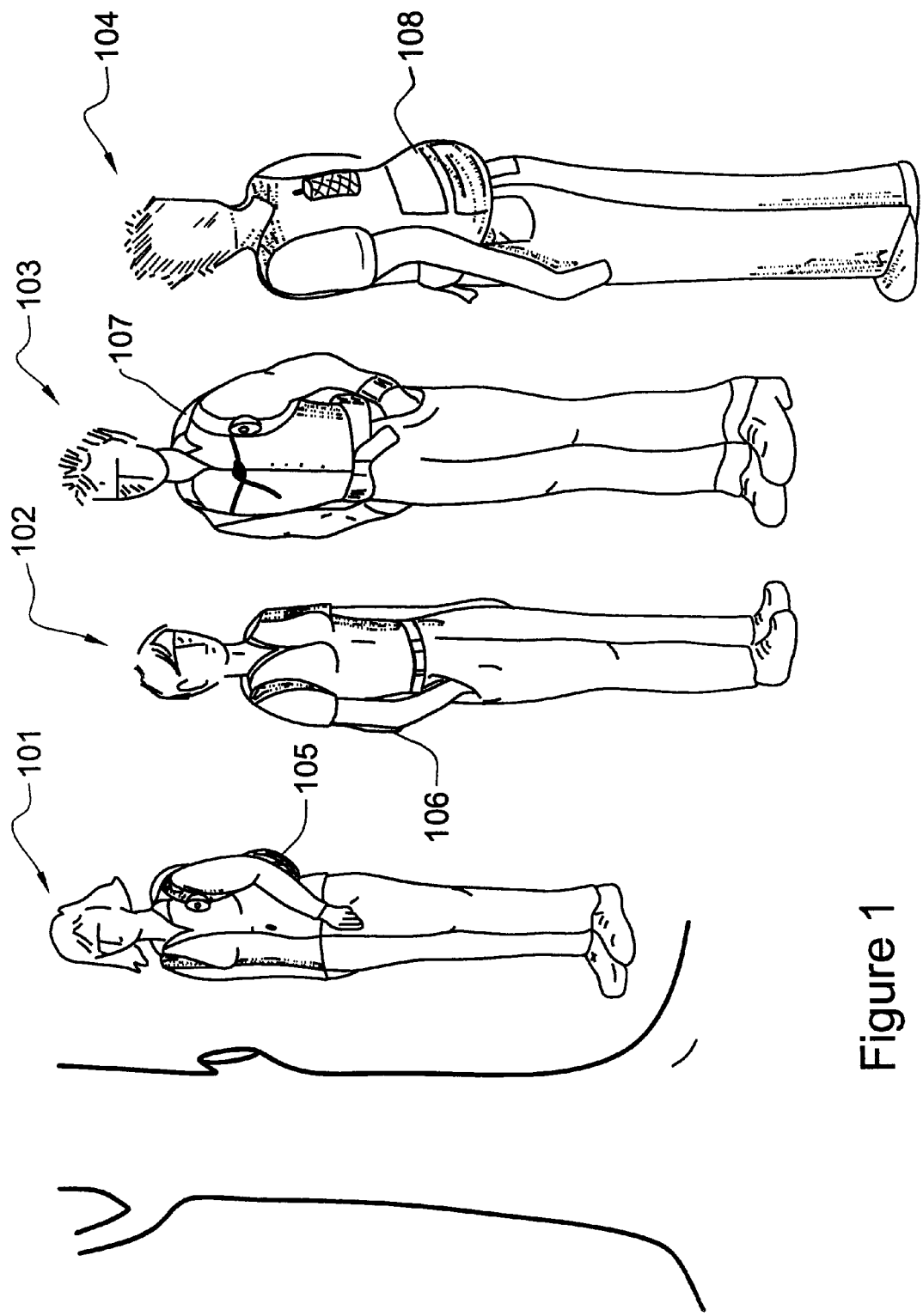
FIG. 1 illustrates use of recording units according to the invention.

FIG. 1 illustrates use of recording units according to the invention. In FIG. 1, four people are participating in, or observing, an event. (For convenience, herein, all such people are referred to as "participants.") Each of the participants (designated by the numerals 101, 102, 103 and 104) are equipped with a recording unit (designated by the numerals 105, 106, 107 and 108). Each of the recording units 105, 106, 107 and 108, in accordance with the invention, enables the corresponding participant (recorder) to obtain a recording of the event in a manner that does not interfere with participation in, or observation of, the event, either by the recorder or other participants. (Generally, a "recorder" is any person having the capability of controlling a recording unit according to the invention.) Additionally, in the use of the invention shown in FIG. 1, since there are multiple recorders, the event can be simultaneously recorded from multiple points of view. Further, the invention enables the above-described recording from points of view that are "in" the event, since the recording is done by participants in the event. Thus, the invention can enable first person recording, from multiple points of view simultaneously, while minimizing or eliminating the effect of the act of recording upon the conduct of the event.

The type of recording enabled by a recording unit according to the invention is sometimes referred to herein as "low attention recording," the term indicating the salient feature of a recording unit according to the invention, which is that the act of recording need not—and typically does not—(appreciably) affect interaction of the recorder or others with the environment in which the recording is taking place. Recording in which multiple participants in an event are recording the event is sometimes referred to herein as "social recording." As will be more completely appreciated from the description of the invention herein, the low attention recording enabled by a recording unit according to the invention can be particularly advantageously employed in social recording situations.

A recording unit according to the invention is adapted to obtain visual data representing a visual record of the event. Visual data that can be obtained by a recording unit according to the invention can include data obtained by any device for obtaining a visual recording, such as, for example, a video camera, motion picture camera or a still image camera. Typically, a recording unit according to the invention is also adapted to obtain audio data representing an aural record of the event. (Herein, such visual and/or audio data is sometimes referred to as "recording data.") A recording unit according to the invention can also be adapted to obtain and/or produce other data representing a record of some aspect of the event. (Herein, data other than recording data that is obtained and/or produced by a recording unit according to the invention is sometimes referred to as "augmenting data.") For example, a recording unit according to the invention can be adapted to produce marking data. A recording unit according to the invention can also be adapted to obtain data regarding the position of the recording unit. A recording unit according to the invention can also be adapted to record physiological data (e.g., heart rate, galvanic skin response): physiological data may be useful to enable the emotional state of the recorder (e.g., excitement, boredom) during recording to be inferred. Additionally, a recording unit according to the invention can be adapted to obtain (and, perhaps, store) biometric data (e.g., fingerprint, retinal pattern).

As indicated above, a particularly advantageous aspect of the invention is that a recording unit can be made to be relatively unobtrusive. One aspect of the unobtrusiveness of a recording unit according to the invention is that the recorder is able to meaningfully participate in the event while recording the event. For example, a recording unit according to the invention is preferably adapted so that the operation of the recording unit requires little or no attention from the recorder during recording (i.e., beginning operation of the recording unit can be accomplished with little effort, and, once turned on to begin recording, operation of the recording unit may not require further interaction from the recorder). A recording unit according to the invention is also adapted so that the recording unit does not physically interfere (e.g., obstruct vision or movement) with the recorder's participation in the event. Preferably, a recording unit according to the invention is also adapted so that the physical characteristics of the recording unit do not distract the recorder (e.g., the recording unit is not too heavy or bulky). Another aspect of the unobtrusiveness of a recording unit according to the invention is that participation in the event by other participants is not affected to a significant extent by the recording of the event. For example, a recording unit according to the invention can be adapted to have a relatively inconspicuous physical appearance and to operate in a relatively inconspicuous fashion, thus minimizing or eliminating inhibitions that participants in the event may otherwise feel if the recording unit is a conspicuous device that provides an ongoing visceral reminder that their actions are being recorded.

A recording unit according to the invention can include capabilities that facilitate low attention recording. For example, a recording unit according to the invention can be adapted to enable display in real time of the recording being obtained by the recording unit. This enables the recorder to monitor, with little effort, the content of the recording as the recording is obtained so that the recorder can, if desired, take appropriate action to ensure that desired content is obtained. Additionally, viewing a recording display can increase a recorder's confidence that the recording unit is operating properly, making it easier for the recorder to ignore the recording unit and concentrate on participating in the event. It is important to note, however, that such monitoring of the recording need not necessarily occur; as indicated above, the recording units can be (and preferably are) constructed so that recordings with useful content can be obtained with little interaction by the recorder with the recording unit.

A recording unit according to the invention can also be adapted to enable the recorder to mark the recording as the event is being recorded. ("Marking" is used herein broadly to indicate any annotation of the recording that is made in response to an action by the recorder intended to create such annotation.) The capability of marking the recording enables the recorder to, with little effort, augment the recording in a way that facilitates and/or enhances use (e.g., searching, display and/or processing) of the recording, either during or after recording the event. There are many ways in which marking capability can be implemented in a recording unit according to the invention. For example, in some embodiments of the invention, as incidents of particular interest occur during the event being recorded, a dedicated marking mechanism can be used to specify a mark that is associated with the recording data being obtained at that time. (As described in more detail below, a mark may have a unique identification that, for example, identifies content in the marked part of the recording and/or the identity of the person who specified the mark.) Narrative description (either textual description entered via an appropriate input device or spoken description acquired by an appropriate audio data acquisition device) of an incident can be added to a recording as mark(s) or part(s) of mark(s). A mark can be specified using a tactile control mechanism adapted for that purpose. A mark can also be specified by voice commands. Advantageously, a recording unit according to the invention can enable the use of multiple types of marks, each type of mark having a particular meaning. A recording unit according to the invention can also advantageously enable the specification of a mark so that the mark is associated with recording data obtained at a time other than the time at which the mark is specified ("non-contemporaneous marking"). Non-contemporaneous marking can be implemented to enable the recorder to mark recording data obtained prior to the time of the mark ("retrospective marking") or subsequent to the time of the mark ("predictive marking"). Non-contemporaneous marking is especially consonant with the goal of unobtrusive, low attention recording by the recording unit, since, often, a recorder who is engaged in participating in the event will not appreciate the desirability of marking particular recording data until some time after activity of interest has occurred.

A recording unit according to the invention can also include capabilities that facilitate social recording. For example, a recording unit according to the invention can be adapted to enable recordings to be shared between or among recording units during the event so that recorders can observe recordings that have been, or are being, obtained by other recording units. Again, this can, if a recorder is so inclined, aid the recorder in obtaining desired content, since the recorder can be aware of the content obtained by other recording units and can attempt to operate the recorder's recording unit so as to obtain a recording that is coordinated in some manner with the recording(s) being obtained by other recording unit(s). Particularly if the recording units according to the invention also include the capability for recorders to communicate with each other during recording, this capability enables collaborative social recording without need for the recorders to become overly disengaged from participating in the event. (However, as indicated above, the invention contemplates that a recording unit can be employed to obtain useful content without such monitoring of other recordings by the recorder.) Sharing of recordings during the event can also be desirable because viewing the recording(s) of other recorder(s) can make the event more enjoyable.

A recording unit according to the invention can also be adapted so that the recording can be obtained from novel and/or interesting points of view. As discussed in more detail below, this can be accomplished as a result of adapting the recording unit so that the recording unit can be mounted on the recorder. A recording unit can also be adapted so that the recording can be obtained from any of multiple points of view. As also discussed more below, this can be accomplished by adapting the recording unit so that the recording unit can be mounted at different locations on the recorder.

Below, aspects of the invention are described in more detail, including apparatus with which a recording unit according to the invention can be embodied, operation of a recording unit according to the invention, interaction of a recording unit according to the invention with other recording units during recording of an event, and post-event use of the recordings obtained by recording unit(s) according to the invention.

I. Recording an Event

A. Overview of Recording Unit Apparatus and Operation

As indicated above, it is desirable that a recording unit according to the invention can be implemented so that the recording unit requires little attention from the recorder during recording, does not physically interfere with, or distract from, the recorder's participation in the event, and does not unduly occupy attention of other participants in the event. Thus, for example, it is generally desirable that the recording unit be relatively small and that the recording unit be relatively lightweight. Further, it is highly desirable that the recording unit be adapted to be mounted on (e.g., attached on, or worn by), rather than held by, the recorder. The recording unit should be mounted, and components of the recording unit interconnected, so that the recording unit does not obstruct the recorder's vision, hearing or motion, or distract the recorder from participation in the event. The recording unit should be capable of being operated easily: for example, it is desirable that starting and stopping recording require little interaction by the recorder with the recording unit, and that the recording unit be adapted so that any required recording adjustments (e.g., focusing, brightness control) are made automatically by the recording unit as recording occurs. It is also desirable that the recording unit be capable of operation for a long period of time (e.g., several hours) relative to the expected duration of activities during which it is desired to use the recording unit: for example, a power supply used with the recording unit should be capable of storing sufficient power to enable a desired duration of operation without need to recharge or replace the power supply.

Figure 2:
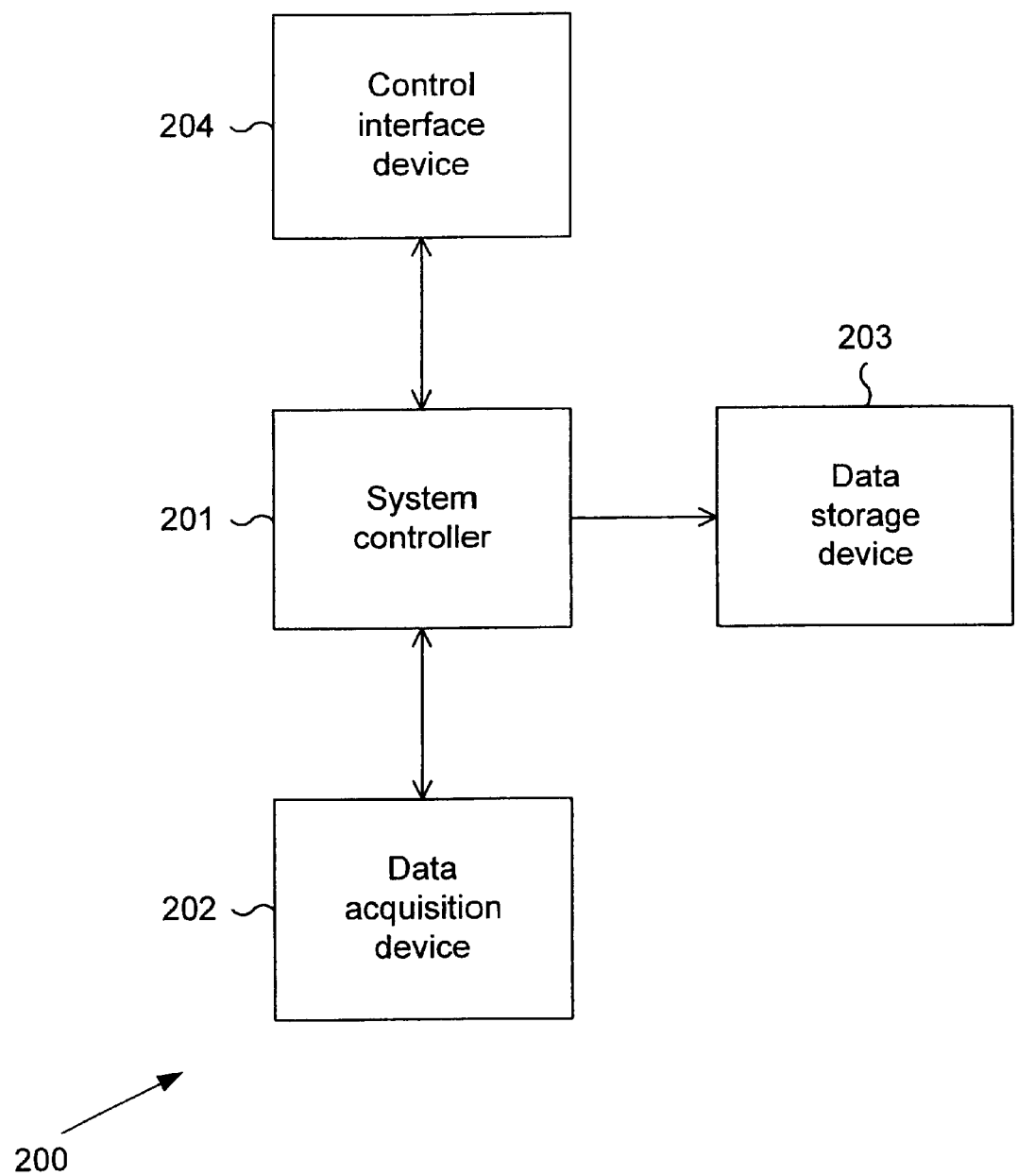
FIG. 2 is a block diagram illustrating the functional components of a recording unit in accordance with the invention.

FIG. 2 is a block diagram illustrating the functional components of a recording unit 200 in accordance with the invention. The recording unit 200 includes the basic capabilities of a recording unit for use in a system according to the invention.

The recording unit 200 includes a system controller 201, a data acquisition device 202, a data storage device 203 and a control interface device 204. (In practice, each of the devices of the recording unit 200—as well as of the recording unit 300, described below with respect to FIG. 3, or any other recording unit according to the invention—can be embodied by a single apparatus or multiple physically distinct apparatus, and can also be embodied in such apparatus together with one or more other devices of the recording unit.) The system controller 201 controls the operation of, and mediates interaction among, the other components of the recording unit 200. The data acquisition device 202 acquires recording data representing the content of the event being recorded. The recording data acquired by the data acquisition device 202 is stored in the data storage device 203 for use subsequent to the event in observing the recording of the event. The control interface device 204 enables the recorder to control the operation of the recording unit 200 and can also provide information to the recorder regarding the operation of the recording unit 200.

Figure 3:
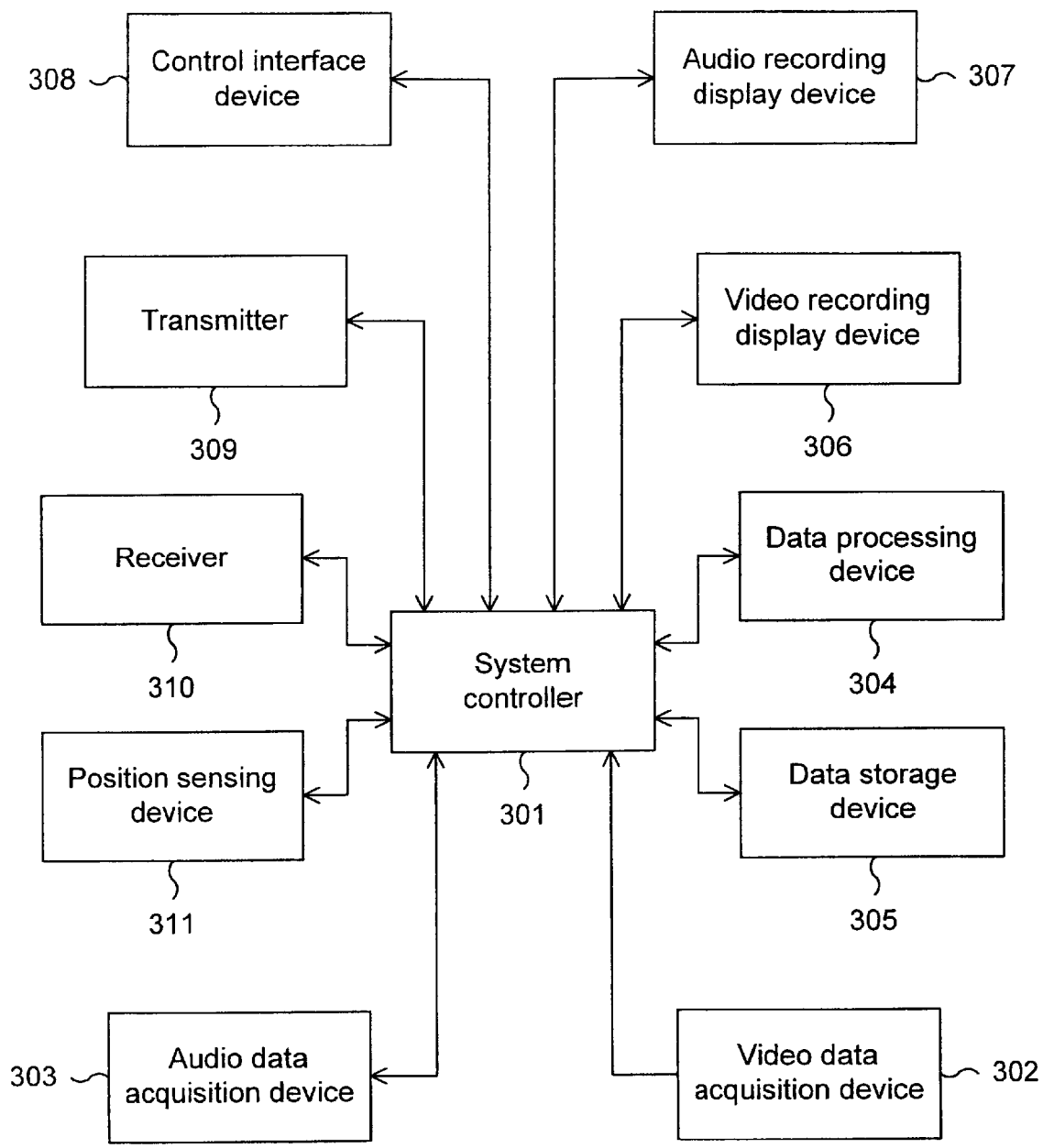
FIG. 3 is a block diagram illustrating the functional components of another recording unit in accordance with the invention, the recording unit having enhanced capabilities as compared to the recording unit of FIG. 2.

FIG. 3 is a block diagram illustrating the functional components of another recording unit 300 in accordance with the invention. The recording unit 300 has enhanced capabilities as compared to the recording unit 200 described above with respect to FIG. 2. It is to be understood that there are many other possible embodiments of a recording unit according to the invention in addition to those shown in FIGS. 2 and 3: such embodiments may include only some of the components of the recording unit 300 that are present in addition to the components of the recording unit 200, and can also include other components not shown in FIGS. 2 and 3. FIGS. 2 and 3 are merely illustrative of the types of components that can be present in a recording unit according to the invention.

The recording unit 300 includes a system controller 301, a visual data acquisition device 302, an audio data acquisition device 303, a data processing device 304, a data storage device 305, a visual recording display device 306, an; audio recording display device 307, a control interface device 308, a transmitter 309, a receiver 310 and a position sensing device 311. As in the recording unit 200, described above, the system controller 301 controls the operation of, and mediates interaction among, the other components of the recording unit 300. The visual data acquisition device 302 and audio data acquisition device 303 acquire visual and audio recording data, respectively, representing the content of the event being recorded. Depending upon the particular implementation of the recording unit 300, the acquired recording data can be stored directly in the data storage device 305, or can first be processed (e.g., compressed) in the data processing device 304, then stored in the data storage device 305. The visual recording display device 306 and the audio recording display device 307 enable presentation to the recorder of a display (which is typically a real-time display) of the visual recording and audio recording, respectively, being obtained by a compatible recording unit (which can be the recording unit 300 or another recording unit). As in the recording unit 200, the control interface device 308 enables the recorder to effect operation of the recording unit 300 and can also provide information to the recorder regarding the operation of the recording unit 300. The transmitter 309 transmits signals ("recording data signals") representing recording data acquired by the recording unit 300, so that such recording data can be used by other recording units (e.g., to generate a display of the visual and/or audio recording being obtained by the recording unit 300, or to enable processing of recording data obtained by the recording unit 300 for use in affecting the manner in which another recording unit records, processes or stores recording data). The receiver 310 receives recording data signals representing recording data acquired by one or more other recording units to enable generation of a display of the recording being obtained by those recording units. (The receiver 310 can also receive recording data signals transmitted by the transmitter 309 and use such signals to generate a display of the recording being obtained by the recording unit 300.) The position sensing device 311 can be used to ascertain the position (location and/or orientation) of the recording unit 300, the position information being used, for example, to augment the display of the recording or to facilitate integration of the recording obtained by the recording unit 300 with the recording(s) obtained by other recording unit(s).

Particular apparatus that can be used to embody the components of the recording units 200 and 300, as well as additional aspects of the operation of recording units like the recording units 200 and 300, are described in more detail below.

B. Recording Unit Components

1. Power Supply

For typical implementations of a recording unit according to the invention, a portable power supply (e.g., a battery) must be included as part of the recording unit. (However, other implementations are possible: for example, power may be transmitted—preferably, in a wireless manner—from a fixed power supply that is separate from the recorder, so that the recording unit receives adequate power for operation so long as the recording unit remains within a defined area.) In general, it is desirable that such a portable power supply be capable of storing sufficient energy to enable operation of the recording unit, without recharging or replacing the power supply, for a period of time long enough to encompass the expected duration of events with which the recording unit is intended to be used. To enable a particular power supply to operate a recording unit for a desired period of time without recharging or replacement, it is, in general, desirable that the components of the recording unit described below be implemented using devices that consume relatively little power.

An increase in the energy storage capacity of a power supply typically results in an increase in the size of the power supply. Since it is generally desirable that the recording unit be small, the implementation of a power supply for use with a recording unit according to the invention typically involves a trade-off between size and power storage capacity. It is desirable that the power supply be capable of supplying power to enable operation of the recording unit for at least several hours (e.g., 2–5 hours) without recharging or replacing the power supply. Thus, the power supply is preferably selected, in view of the power consumption characteristics of the other components of the recording unit, so as to enable such operation.

It may be desirable to implement a recording unit according to the invention so that the power supply is integrated with another periodically replaceable part of the recording unit (e.g., a non-volatile data storage device for storing recording data), thereby enabling both components to be conveniently replaced at the same time. In such case, the characteristics of the components (e.g., energy storage capacity of the power supply and data storage capacity of the non-volatile data storage device) are preferably established so that the components will typically be ready for replacement at about the same time.

2. System Controller

In general, as indicated above, a system controller of a recording unit can be any device that controls the operation of other components of the recording unit and mediates interaction among those components to effect performance of the functions of the recording unit in response to (either directly or indirectly) input from the recorder. The construction and operation of a system controller for use in a recording unit according to the invention can be implemented by those skilled in the art in view of the description herein of other components and aspects of a recording unit according to the invention.

The system controller can also perform functions in addition to the above-described control and mediation. Preferably, the system controller is operated to store information that identifies particular stored recording data, in some manner. For example, the system controller can include a clock that is used to time-stamp the recording data obtained by the recording unit. (The time-stamps can be used, for example, to display the time at which a displayed recording was obtained, to locate particular stored recording data, or to enable post-event synchronization of the display of recordings obtained by different recording units.) The system controller can also cause information to be stored that identifies the recording unit (and/or recorder) that obtained the recording data, and/or that identifies the position of the recording unit at the time the recording data was obtained. Additionally, as described in more detail below, the system controller can cause data to be stored that represents a mark specified by the recorder, the mark identifying the corresponding recording data in a predefined manner.

In general, the system controller can be embodied by any device or devices that can be operated to accomplish the necessary functions, such as a microcontroller or other processing device. The system controller operates in accordance with appropriately specified instructions and/or data (e.g., computer programs) that are stored on a data storage device of the recording unit. Illustratively, a system controller for use in a recording unit according to the invention can be embodied by a Motorola 68HC11 microcontroller (as is commercially available) appropriately programmed, as can readily be done those skilled in the art, to accomplish the desired functions of the system controller, as described herein.

3. Data Acquisition a. Visual Data Acquisition

Generally, any visual data acquisition device (i.e., an image capture device) can be used in a recording unit according to the invention. It is anticipated that use of a device that acquires a continuous stream of visual data (e.g., frames of visual data acquired at video frame rates, such as approximately 30 frames per second, as known by those skilled in the art), such as a video camera, will be preferable for many applications of the invention. However, a still image camera can also be used.

It is desirable that the visual data acquisition device be capable of acquiring high resolution images. However, the cost of a visual data acquisition device typically increases as the resolution of the visual data acquisition device increases. The visual data acquisition device can be chosen in view of these competing considerations. However, as described in more detail below, it can be possible to process visual recording data to enhance the quality of the images that the visual recording data represents. If it is contemplated that such processing will be performed during post-event use of the recording, it may be desirable to use a relatively lower resolution and less expensive visual data acquisition device with a recording unit according to the invention.

Either an analog visual data acquisition device (e.g., an analog video camera) or a digital visual data acquisition device (e.g., a digital video camera) can be used. A digital visual data acquisition device can be advantageous because then there is no need to perform conversion of an analog visual recording to digital form (which can result in reduced image quality and which necessitates additional apparatus) to enable processing of the visual recording data. Additionally, a digital visual data acquisition device can typically enable better automatic device control: aspects of the recording process can be controlled better than with an analog visual data acquisition device, and more aspects of the recording process can be controlled. When the automatic control features of an analog visual data acquisition device fail to adequately compensate for changing conditions, the quality of the resultant recording can be degraded quite noticeably. An analog visual data acquisition device can be advantageous because such devices are typically cheaper, more widely available, more generally familiar, and available in a wider variety than digital visual data acquisition devices.

The size and weight of the visual data acquisition device are constrained by the need to make the visual data acquisition device unobtrusive (so that the visual data acquisition device is not distracting to the recorder of other people in the vicinity of the recorder), capable of being used in a manner that requires little attention from the recorder (e.g., as indicated above, worn by the recorder), capable of being used in a manner that does not interfere with the recorder's participation in the event, and (if appropriate) comfortable for the recorder to wear. Generally, these considerations militate in favor of making the visual data acquisition device as small and lightweight as possible. For example, it can be desirable that the visual data acquisition device weigh no more than several ounces. The above considerations can also affect the shape (to the extent that the shape of the visual data acquisition device can be chosen) of the visual data acquisition device, as well as the location of the visual data acquisition device with respect to the recorder's body (when the visual data acquisition device is worn), as discussed further below.

In keeping with the goal of minimizing the need for interaction by the recorder with the recording unit, the visual data acquisition device is preferably adapted to be mounted on (e.g., attached on or worn by, as opposed to held by) the recorder. The visual data acquisition device should be stably mounted on the recorder to minimize or eliminate blurring of the visual recording. However, if the visual data acquisition device is sufficiently small (as is generally desirable for other reasons, as discussed elsewhere herein), mounting the visual data acquisition device so that adequate stability (with respect to the part of the body on which the visual data acquisition device is mounted) is obtained is typically not a problem.

Not only should the visual data acquisition device be stably mounted on the recorder, but the visual data acquisition device should be mounted on a part of the body of the recorder that remains relatively stable during the event. Thus, it is usually not desirable to mount the visual data acquisition device on the hand or part of the arm distant from the shoulder, since those parts of the body will often experience swift and/or far ranging motion. For the same reason, it is usually not desirable to mount the visual data acquisition device on the leg distant from the hip. Adequate stability of the visual data acquisition device can typically be obtained by mounting the visual data acquisition device on, for example, the waist, chest, shoulder or head of the recorder.

However, in some situations, it may not be possible for the visual data acquisition device to be held sufficiently still to enable a high quality recording to be obtained (e.g., if the recorder is running or vigorously hiking). As discussed in more detail below, it can be possible to process the visual recording data after it is obtained to enhance the quality (e.g., remove some of the jerkiness) of portions of a visual recording that have been obtained when the visual data acquisition device was unstable. Additionally, the mechanism for mounting the visual data acquisition device on the recorder can be implemented with an active control mechanism that, in response to movement of the visual data acquisition device, appropriately adjusts the position of the visual data acquisition device to maintain a stable filming direction.

Figure 4:
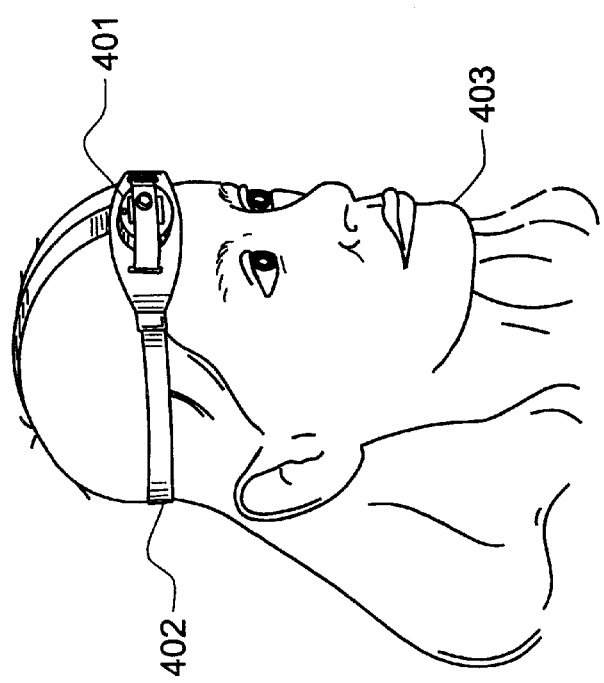
FIG. 4 is a perspective view of a visual data acquisition device of a recording unit according to the invention attached to a head harness that is worn by a recorder.

The location on the recorder at which the visual data acquisition device is mounted can also be affected by consideration of the desired characteristics of the point of view of the visual recording. In this vein, the height of the visual data acquisition device and the direction in which the visual data acquisition device records must be considered. For example, it is anticipated that it will often be desirable to record from a height at or above chest level. It is also anticipated that, typically, it will be desirable to position the visual data acquisition device on a front part of the recorder's body, so that the visual data acquisition device records activity that occurs in front of the recorder, the assumption being that the recorder will usually position his body so that it faces the activity of interest to the recorder. Further, it may be desirable to mount the visual data acquisition device on the front of the recorder's head (e.g., on the forehead), since it is even more likely that the recorder will position his head to look in the direction of activity of interest to the recorder. Mounting the visual data acquisition device on the head also enables the point of view of the visual recording to be changed without interaction by the recorder, and enables changes in point of view that are expected, for the reason given above, to increase the likelihood of obtaining content of interest. FIG. 4 is a perspective view of a visual data acquisition device 401 attached to a head harness 402 that is worn by a recorder 403, illustrating one way of mounting a visual data acquisition device on the front of the recorder's head. However, mounting the visual data acquisition device on the recorder's head can make the visual data acquisition device more visible (and thus, perhaps, more distracting or disconcerting) to others. Since one goal of the invention is to enable unobtrusive recording, this can be undesirable, as discussed elsewhere herein. The visibility of the visual data acquisition device can be reduced (and the associated distractiveness mitigated) by mounting the visual data acquisition device on the side of the recorder's head (by, for example, mounting the visual data acquisition device on a headband near the recorder's ear, or on the side of a pair of eyeglasses worn by the recorder), rather than on the recorder's forehead.

It may be particularly advantageous to implement the recording unit so that the visual data acquisition device can be mounted at different locations on the recorder ("location-adjustable mounting"), thus enabling a recorder to choose to obtain the visual recording from different points of view for different events (or even to change the point of view of the visual recording during an event), as well as enabling different recorders (of, for example, different heights) to obtain a visual recording from the same point of view. Location-adjustable mounting of the visual data acquisition device can be accomplished in any suitable manner.

For example, the recording unit can be adapted so that the visual data acquisition device can be detachably attached to one or more other parts of the recording unit which are fixedly mounted on the recorder, or to the recorder's clothing, in such manner that the visual data acquisition device can be mounted at different locations on the recorder. As one illustration of such mounting, one or more Velcro™ strips can be attached to the visual data acquisition device, and one or more mating Velcro™ strips can be attached at various locations on other parts of the recording unit or a single "large" mating Velcro™ strip can be provided as part of the recording unit. For example, as discussed elsewhere herein (see FIG. 6 and the accompanying description), a recording unit according to the invention can be implemented so that components of the recording unit are positioned within a backpack that is worn by the recorder: in such an embodiment of a recording unit, one or both of the straps of the backpack could include a Velcro™ strip so that the visual data acquisition device can be attached at various locations on the strap or straps. As can be readily appreciated, there are a variety of other ways in which a visual data acquisition device can be attached to a recorder in a similar manner. For example, mating snaps can be used in a manner analogous to the use of Velcro™ strips described above. Or, a spring-loaded clip can be attached to the visual data acquisition device and used to clip the visual data acquisition device to the recorder's clothing. There are many other possibilities.

Another way in which location-adjustable mounting of the visual data acquisition device can be accomplished is by attaching the visual data acquisition device to a wearable apparatus that can be worn at different locations and/or with different orientations on the recorder's body so that the visual data acquisition device is mounted at different locations with respect to the recorder's body. As one illustration of such mounting, the visual data acquisition device can be attached to headgear (e.g., helmet, headband or head harness) that is worn by the recorder (see FIG. 4). The recorder can change the location at which the visual data acquisition device is mounted on the recorder by changing the orientation of the headgear on the recorder's head. Similarly, the visual data acquisition device can be attached to an armband or legband (or other, similar apparatus that can be mounted on the recorder's arm or leg) that can be worn at different locations, or with different orientations, on the recorder's arm or leg.

Two or more of the above-described mechanisms for attaching the visual data acquisition device to a recorder can be combined. Such combination can advantageously provide particularly flexible mounting of the visual data acquisition device. For example, mating Velcro™ strips (or other suitable means of detachable attachment) can be used to attach the visual data acquisition device at various locations on headgear, an armband, a legband or other wearable apparatus.

As discussed above, the visual data acquisition device is preferably small. The visual data acquisition device can typically be made small enough so that mounting of the visual data acquisition device on the recorder as described above can be accomplished while providing adequate stability of the visual data acquisition device.

In addition to implementing the recording unit so that the visual data acquisition device can be mounted at different locations on the recorder, it can be desirable to mount the visual data acquisition device on the recorder so that the orientation of the visual data acquisition device (and, thus, the filming direction) is adjustable ("orientation-adjustable mounting"). Most generally, the visual data acquisition device can be mounted so that the visual data acquisition device can be rotated about each of three orthogonal axes (e.g., pan, tilt and rotational axes), i.e., the mounting mechanism for the visual data acquisition device provides three rotational degrees of freedom. However, increasing the number of rotational degrees of freedom may necessitate a more complex and/or expensive mounting mechanism. Thus, the number of rotational degrees of freedom provided may involve a trade-off between the additional flexibility provided and the increased complexity and/or cost.

Orientation-adjustable mounting can be combined with location-adjustable mounting to provide extremely flexible mounting of the visual data acquisition device. In particular, the ability to mount the visual data acquisition device so as to have adjustable orientation can provide even greater flexibility in choosing the location on the recorder at which to mount the visual data acquisition device, since the orientation of the visual data acquisition device can be adjusted, for any mounting location, to produce a variety of recording points of view.

The commonly owned, co-pending U.S. patent application Ser. No. 09/225,993, entitled "Adjustable Mounting Mechanism for a Directional Device with Particular Application to Mounting a Camera on a Person," by J. Daniel Psomas and Kimberly H. Johnson, filed on Jan. 5, 1999, describes mechanisms for location-adjustable and orientation-adjustable mounting of a visual data acquisition device on a recorder that can be used with a recording unit according to the invention. The disclosure of that application is incorporated by reference herein.

When the visual data acquisition device is mounted so that the orientation of the visual data acquisition device can be adjusted, it can be useful to enable the recorder to readily identify the orientation of the visual data acquisition device at any point in time. This can be accomplished, for example, by forming a mark on the visual data acquisition device or a housing in which the visual data acquisition device is positioned. The mark can correspond to, for example, the top of the visual frame of a lens of the visual data acquisition device. It can be desirable to form the mark near the periphery of the visual data acquisition device or housing because such positioning can facilitate viewing of the mark by the recorder and/or because the increased distance from the rotational axis of the visual data acquisition device enables precise control of the rotational orientation of the visual data acquisition device to be accomplished more easily. It can also be desirable to form the mark on a surface of the visual data acquisition device or housing that substantially faces the recorder's head, so that viewing of the mark by the recorder is facilitated. A mechanism for identifying the orientation of the visual data acquisition device can be particularly useful when the visual data acquisition device or housing is generally symmetric in appearance, since such appearance tends to otherwise conceal the rotational orientation of the visual data acquisition device.

In keeping with the general goal of the invention that the visual data acquisition device require little attention from the recorder, it may be advantageous for the visual data acquisition device to be implemented so that various aspects of the device control occur automatically. For example, it can be desirable to use a visual data acquisition device in which the focusing mechanism, white balance, aperture and/or gain of the visual data acquisition device are automatically adjusted, as required by the recording conditions, to increase the likelihood of obtaining a high quality visual recording. Such automatic compensation can enable the recorder to, for example, move from a relatively dark area (e.g., a room in a house) to an area with relatively more light (e.g., a yard outside the house) without having to make adjustments to the visual data acquisition device to account for the change in ambient lighting conditions. Additionally, some digital visual data acquisition devices can enable such compensation (e.g., adjustment for regions of light and shadow) to be made within an image being recorded, further enhancing the quality of the visual recording. However, providing such automatic control may necessitate use of an undesirably expensive and/or large visual data acquisition device (e.g., providing an automatic focusing mechanism necessitates a relatively large and expensive lens). Thus, automatic control of visual data acquisition device operating parameters may be desirable for some embodiments of a recording unit according to the invention and not for others.

It may also be desirable for the visual data acquisition device to have zoom capability, thus providing a recorder with additional flexibility in framing the visual content to be recorded. However, provision of zoom capability necessitates use of a larger lens than would otherwise be necessary, which may add undesirable size and weight to the recording unit. Further, since use of zoom capability requires attention from the recorder, the provision of such capability in the visual data acquisition device may be deemed undesirable as being contrary to the goal of the invention to minimize recorder interaction with the recording unit. If zoom capability is provided, then, consistent with the foregoing goal, it can be desirable to establish a default lens angle that is believed to do the best overall job of capturing desirable content in the visual recording, so that the recorder will relatively infrequently feel the need to use the zoom control to expand or reduce the lens angle. For example, it is believed that in many applications it is desirable to establish a default lens angle that is the widest possible lens angle that can be used with the visual data acquisition device without producing unacceptable distortion of the recorded visual image. (What constitutes unacceptable distortion can be influenced by the availability and cost of post-event processing of the visual recording data, as discussed further below, to reduce or eliminate distortion introduced by the use of a wide angle lens.)

Generally, any desired magnitude of lens angle can be used in a visual data acquisition device according to the invention up to, and including, a 360° angle lens. Increasing the lens angle mitigates the detrimental effects resultant from movement (shakiness) of the camera during recording. Increasing the lens angle also enables more visual content to be captured. (Aside from conveying a greater amount of information, the capture of a larger amount of visual content can also be useful in coordinating visual recordings obtained simultaneously by different recorders, since the possibility of overlapping visual content in the different recordings is increased.) Notwithstanding the foregoing, it may be desirable to limit the lens angle. As the lens angle increases, the distortion at the edges of the recorded image typically increases. (For digital video cameras with on-board signal processing capability, e.g., compression, such distortion may be non-existent or relatively minor for even very wide lens angles; such cameras may obtain visual recording data of acceptable quality even for a lens angle of 360°.) Though there are techniques that can be used to correct such distortion (discussed in more detail below with respect to the description of post-event processing techniques), as the amount of the distortion increases, the correction becomes computationally more expensive. Further, as the lens angle is increased, the appearance of motion by the visual data acquisition device (i.e., the recorder) is distorted so that such motion appears to be faster than it would appear to be. Additionally, as the lens angle is increased, the level of detail in the visual recording data decreases. Increasing the lens angle can also distort the appearance of translational motion in the visual recording, making such motion appear faster than it actually is. Further, as the lens angle is increased, the possible mounting locations of the visual data acquisition device may become more limited; for example, using a 360° angle lens may require mounting the visual data acquisition device on top of the recorder's head to enable the full field of view of the visual data acquisition device to be unobstructed. For a particular recording unit, the magnitude of the lens angle can be chosen in view of the intended use(s) of the recording unit and the above-described trade-off between advantages and disadvantages of increasing the lens angle. Illustratively, for many uses of a recording unit according to the invention, a lens angle no wider than about 120° is desirable for typical current analog video cameras.

Illustratively, a visual data acquisition device for use in a recording unit according to the invention can be embodied by a Super Circuits PC-17YC video camera. The Super Circuits PC-17YC is an analog video camera that includes various automatic camera control features, such as automatic gain control, automatic white balance control and automatic iris control that can compensate for changes in the ambient visual recording conditions. The Super Circuits PC-17YC video camera includes a pickup unit (including lens and other optical apparatus) interconnected with the electronics (one or more printed circuit boards) that are used to perform the compensation functions. The pickup unit can be separated from, and movably attached to (as described above and in the above-referenced U.S. patent application Ser. No. 09/225,993), the printed circuit boards on which the camera, electronics are formed so that the recording orientation of the pickup unit can be adjusted as desired. The Super Circuits PC-17YC video camera can be mounted on the recorder as described above. The printed circuit boards can be covered with an appropriate cover to protect the circuitry from contaminants and to mask their presence. A connector is provided that electrically connects the video camera electronics (as well as an LED, discussed below, for indicating whether the camera is being supplied with power) to a power supply and, in the case of the video camera electronics, to a digital disk recorder (discussed in more detail below with respect to the description of data processing devices used in a recording unit according to the invention) that processes (e.g., converts from analog to digital) the visual recording data obtained by the video camera.

The Chugai CEC-100 video camera is another example of a video camera that can be used to embody a visual data acquisition device in a recording according to the invention. The Chugai CEC-100 video camera is constructed and operates in a manner similar to that described above for the Super Circuits PC-17YC video camera.

As indicated above, the visual data acquisition device can be a digital device instead of an analog device. For example, digital video cameras such as are commonly used in videoconferencing systems can be used to embody a visual data acquisition device in a recording unit according to the invention. Additionally, CMOS digital video cameras that are beginning to be commercially available can advantageously be used with a recording unit according to the invention. The use of a CMOS digital video camera can in particular be advantageous—particularly as developments in technology decrease the chip size necessary to implement specified functionality—because of their relatively small size and light weight.

A recording unit according to the invention can include more than one visual data acquisition device (e.g., multiple video cameras). As described further below, to accommodate multiple visual data acquisition devices, it may be necessary to add one or more components to the recording unit and/or to modify an existing component to enable processing of the additional visual recording data.

When multiple visual data acquisition devices are used, in general it is desirable to coordinate the mounting positions of the devices to obtain a desired combination of viewpoints. For example, it may be desirable to mount the visual data acquisition devices so that significantly different points of view are obtained so that as much different content can be recorded as possible. To accomplish such a goal, it may be advantageous to mount the visual data acquisition devices on different parts of the recorder's body.

The use of multiple visual data acquisition devices mounted on different parts of a recorder's body can be implemented to produce recording units having particular types of recording capability. For example, a recording unit could be implemented so that a first visual data acquisition device is mounted on a part of the recorder's body that generally moves very little, such as the chest or shoulder, while a second visual data acquisition device is mounted on the front of the recorder's head. The first visual data acquisition device can obtain a relatively stable recording of the event (because of the relative lack of movement of the body part on which the first visual data acquisition device is mounted), albeit one which may not always include the content of most interest to the recorder. The second visual data acquisition device can obtain a recording of the events that will usually include more content of interest to the recorder than the recording obtained by the first visual data acquisition device (because the point of view of the recording constantly tracks the recorder's viewing direction), but that may not always be as stable as desired (due to, for example, quick turns of the recorder's head).

Or, for example, a recording unit could be implemented so that a first visual data acquisition device is mounted on a part of the recorder's body that generally moves very little, such as the chest or shoulder, while a second visual data acquisition device is mounted on the recorder's wrist or hand. As above, the first visual data acquisition device can obtain a relatively stable recording of the event, though the recording may not always include the content of most interest to the recorder. The second visual data acquisition device, mounted on the hand or wrist of the recorder, can be easily directed by the recorder to record content of interest during the event. Though the use of the second visual data acquisition device requires more interaction by the recorder to obtain useful content (if the recorder does not make a conscious effort to move his hand or wrist to position the second visual data acquisition device in the proper direction, the recorded content will usually not be of interest and/or will be framed poorly), it is expected that such content will often be of greater interest than the content obtained by the first visual data acquisition device. Further, the recorder need make such effort to position the second visual data acquisition device only when desired (which may, of course, be not at all). Thus, the presence of the second visual data acquisition device affords the recorder the option to obtain a recording including content of somewhat greater interest at the expense of devoting more attention to the operation of the recording unit.

A recording unit including multiple visual data acquisition devices can also be implemented so that at least one of the visual data acquisition devices (a "secondary" visual data acquisition device which is not intended to be the visual data acquisition device obtaining the primary visual recording) is attached to the recorder so that the visual data acquisition device can easily be either detached or moved to enable high attention use by the recorder. For example, a visual data acquisition device can be detachably attached (using mechanisms as described elsewhere herein) to a belt or strap of the recording unit. Or, a visual data acquisition device can be attached with a cord (wire) to the rest of the recording unit so that the visual data acquisition device can be kept in a pocket of the recorder's clothing when not in use. In either case, when the recorder sees something of particular interest, the recorder can grab the secondary visual data acquisition device and begin using the secondary visual data acquisition device in a directed way to obtain a desired visual recording.

It may be desirable to include features in a secondary visual data acquisition device that are not deemed desirable or appropriate in the primary visual data acquisition device. For example, it may be desirable to include zoom capability in a secondary visual data acquisition device, but not in a primary visual data acquisition device, since use of the former is assumed to be a high attention use consonant with the use of a zoom capability, while the latter is assumed to be a low attention use in accordance with the primary focus of the invention.

b. Audio Data Acquisition

Generally, any suitable audio data acquisition device (e.g., microphone) can be used in a recording unit according to the invention. Either analog or digital audio data acquisition devices can be used.

In keeping with the goal of minimizing the need for interaction by the recorder with the recording unit, the audio data acquisition device, like the visual data acquisition device, is desirably adapted to be mounted on (e.g., attached on or worn by, as opposed to held) the recorder. Since the audio data acquisition device can usually be implemented by a very lightweight device (typically, one that is lighter than the visual data acquisition device), and since movement of the audio data acquisition device has a relatively small effect on the quality of the audio recording obtained, the stability of the mounting of the audio data acquisition device and the stability of the location (e.g., body part) at which the audio data acquisition device is mounted are usually not a concern.

It is believed to be preferable (though not necessary) to establish the characteristics of the audio data acquisition device, in conjunction with the location and orientation of the mounting of the audio data acquisition device, so that primarily sounds from in front of the recorder are recorded. It is believed preferable to bias the audio recording in favor of recording sound from in front of the recorder for several reasons: i) a person or persons with whom a recorder is having a conversation will typically be in front of the recorder; ii) a recorder will typically face the parties participating in a conversation that does not include, but is of interest to, the recorder; iii) a recorder will often face the source of other sounds in which the recorder has an interest; and iv) conversations that occur behind a recorder are typically either conversations which the recorder does not want to hear or are conversations which the parties to the conversation may not intend the recorder to hear.

In view of the above-described preference, it is desirable that the audio data acquisition device or devices of a recording unit according to the invention be mounted somewhere on the front of the recorder. If more than one audio data acquisition device is used, it is desirable that the audio data acquisition devices be mounted approximately symmetrically with respect to the center of the recorder and that the audio data acquisition devices be mounted at some distance from the sides of the recorder. Mounting the audio data acquisition device or devices in this way results in the body of the recorder shielding the device(s) to some extent from sound emanating from behind the recorder, thus biasing the content of the audio recording in favor of sound produced in front of the recorder. It may also be desirable to mount the audio data acquisition device(s) with respect to a visual data acquisition device of the recording unit so that the directionality of the audio data acquisition device(s) changes in correspondence with changes in the filming direction of the visual data acquisition device.

The height at which an audio data acquisition device is mounted can also affect the quality of the audio recording data obtained. For example, it can be desirable to mount an audio data acquisition device on a recorder at about chest level, shoulder level or some height in between. This height is desirable because it is near the height at which speech emanates from the recorder (and from some other speakers). Mounting at or just above chest level also enables the audio data acquisition device to pick up spatial imaging of the audio that is similar to that which is experienced by the recorder's ears (e.g., sound wave reflections from the recorder's chest).

Additionally, it can be desirable to implement the audio data acquisition device using a directional microphone that is located and oriented on the recorder so that one of the opposing directions in which the microphone has greatest sensitivity extends approximately straight ahead of the recorder. The use of a directional microphone may reduce to, some extent the importance of the particular positioning of the audio data acquisition device as described above (though it is still desirable to use the recorder's body to shield the microphone from sounds emanating from directly behind the recorder, i.e., in the other direction of greatest sensitivity of the microphone). The use of a directional microphone as described above has been found to enhance the ability to record the voices of other people, particularly when those people are relatively distant from the recorder.

An omni-directional microphone can also be used in a recording unit according to the invention. The use of an omni-directional microphone increases the importance of using the body to shield the microphone from sounds that are expected to be unwanted or relatively unimportant. Nevertheless, it can be desirable to use an omni-directional microphone for several reasons. First, directional microphones are typically long (which may make them undesirably obtrusive, both to the recorder and to others near the recorder) and achieve directionality through use of complex sound cancellation mechanisms that minimize or eliminate sound from the sides of the microphone. As discussed further below, for several reasons it is desirable to use a lavalier microphone in a recording unit according to the invention; however, since a lavalier microphone is very small, it is difficult to implement a lavalier microphone that is highly directional. Second, an omni-directional microphone acquires audio recording data that better represents the spatiality of the actual sounds being recorded than does a directional microphone.

It can be advantageous to implement the recording unit so that the audio data acquisition device can be mounted at different locations on the recording unit. This may be desirable, for example, to accommodate different heights and body shapes of recorders while positioning the audio data acquisition device at a desired location in view of considerations such as those given above. Such adjustable mounting of the audio data acquisition device can be accomplished in any suitable manner, such as, for example, detachably attaching the audio data acquisition device to other parts of the recording unit which are fixedly mounted on the recorder, or attaching the audio data acquisition device to an object which can be adjustably mounted on the recorder.

As one example of adjustable mounting of an audio data acquisition device, the audio data acquisition device can be mounted on a flexible clip that can be attached to, for example, the recorder's clothing or to another part of the recording unit (e.g., a strap). The flexible clip and strap can be constructed, as can be appreciated by those skilled in the art, so that, absent application of an external force, the clip is held in place on the strap by frictional force between the clip and strap. The clip and strap can also be constructed so that, upon application of a force of appropriate magnitude, the clip can slide along the strap to enable the position of the clip (and thus the audio data acquisition device) to be adjusted as desired.

As another example of adjustable mounting of an audio data acquisition device, Velcro™ strips can be used to attach the audio data acquisition device to a part of the recording unit. Since the audio data acquisition device is typically rather small and may not have adequate surface area to which to attach a Velcro™ strip, it can be easier to simply enclose a wire connecting the audio data acquisition device to the remainder of the recording unit between two mating Velcro™ strips that are attached to parts of the recording unit. Similarly, the wire can be attached to an appropriate surface on the recorder or a part of the recording unit using tape, instead of Velcro™ strips. Since the audio data acquisition device is typically lightweight as well, such attachment is usually enough to stably secure the audio data acquisition device to the recording unit, though it is desirable that the section of attached wire be relatively close to the audio data acquisition device so that the audio data acquisition device does not dangle too freely. The above-described mounting using Velcro™ strips or tape can be implemented on the backpack straps or the headgear of the particular embodiments of a recording unit described elsewhere herein.

An audio data acquisition device can be adjustably mounted in any of a variety of other ways. Moreover, in general, adjustable mounting of an audio or visual data acquisition device can be accomplished using any of the ways described herein for either of such devices.

It is also desirable that the characteristics of the audio data acquisition device, in conjunction with the location and orientation of the mounting of the audio data acquisition device, be established so that the audio recording accurately reproduces the spatial distribution of sound that is perceived by the recorder (given the desired bias toward recording sound from in front of the recorder). To this end, it can be desirable to use more than one audio data acquisition device. Generally, any number of audio data acquisition devices can be used in a recording unit according, to the invention. With appropriate placement on the recorder, an increase in the number of audio data acquisition devices improves the spatiality of the audio recording. However, as the number of audio data acquisition devices increases, the cost of providing those devices increases, the complexity of integrating the audio data acquisition devices into the operation and construction of the recording unit increases, the audio data acquisition devices are more likely to distract the recorder or interfere with the recorder's motion, and the audio data acquisition devices tend to become a more ostentatious part of the recording unit (contrary to the goal of making the recording unit inconspicuous). The particular number of audio data acquisition devices used is chosen in view of the tradeoff between these disadvantages and the enhanced audio recording quality.

In general, it is desirable that multiple audio data acquisition devices be mounted approximately symmetrically with respect to the center of the recorder. Further, the accuracy of the reproduction of the spatial distribution of sound is improved as the distance between the audio data acquisition devices is increased. In particular, sound as heard by the recorder can be accurately reproduced by positioning audio data acquisition devices symmetrically with respect to the center of the recorder with a separation approximating the separation of the recorder's ears. However, such positioning causes the audio data acquisition devices to be positioned relatively closely to the sides of the recorder, thus reducing the above-described desired shielding effect produced by the body of the recorder. The particular distance between audio data acquisition devices can be chosen in view of this trade-off between minimizing the recording of sound from behind the recorder and maximizing the fidelity of the spatial distribution of sound in the recording.

Some microphones are constructed so that a single microphone can enable an audio recording to be obtained that reproduces to some degree the spatial distribution of sound that is perceived by the recorder. Such a microphone can be used with a recording unit according to the invention. However, such a microphone generally needs to be positioned at some distance from the body of the recorder in order to work effectively. This can be undesirable because, for example, such positioning interferes more with the recorder's participation in the event, is more noticeable to others, and is more susceptible to bumping that can produce extraneous noise and misorient the microphone. Additionally, the mounting of such a microphone is more complicated to implement.

The audio data acquisition device can be chosen so that a desired bandwidth of audio signals can be recorded. It has been found to be desirable to use an audio data acquisition device that records audio signals over the entire frequency spectrum that is audible to the human ear an audio recording so obtained is believed to provide an aural experience that is more pleasant than that obtained using an audio data acquisition device that records audio signals over a more limited bandwidth range. However, the audio recording obtained by such an audio data acquisition device may be more sensitive to static, buzzes, hums and other background noise. If such noise is deemed undesirable, an audio data acquisition device that records a more limited bandwidth of audio signals can be used. Alternatively, such noise can be removed or reduced by appropriate processing, such as filtering or equalization, either during recording or as part of the post-event processing of recording data.

For many applications (outdoor applications, in particular) it is highly desirable that the audio data acquisition device be adapted so as to minimize wind noise and other ambient noise. For microphones, this can be done by covering the microphone with a conventional windscreen. It may be necessary to modify a conventional windscreen to ensure that the windscreen remains in position on the microphone during the expected conditions of use of the recording unit. (Such modification can be accomplished by those skilled in the art.)

Illustratively, an audio data acquisition device for use in a recording unit according to the invention can be embodied by one or more lavalier stereo omni-directional microphones (e.g., a Lectret 5200). Lavalier omni-directional microphones are desirable for use with a recording unit according to the invention because they are relatively small and lightweight, they are easy to mount on a recorder, they need not protrude from the recorder when mounted, and they have been found to consistently produce a high quality audio recording (in particular, the Lectret 5200 microphone is characterized by a flat, extended frequency response that is suitable for reproduction of voice or musical instruments). An example of a stereo directional microphone that can be used in a recording unit according to the invention is the Sanken CSS-5.

c. Other Data Acquisition

A recording unit according to the invention can also include data acquisition devices for acquiring other types of data. For example, a recording unit according to the invention can include one or more physiological monitoring devices that obtain data regarding a physical characteristic of a recorder. Generally, in view of the desirable characteristics of a recording unit according to the invention (e.g., unobtrusive, small, lightweight, wearable, easily-operable, relatively low power consumption), any physiological monitoring device can be used with a recording unit according to the invention.

For example, a physiological monitoring device can be used to monitor, preferably on an ongoing basis, physical characteristics of a recorder, such as, for example, heart rate, galvanic skin-response, EEG, ECG, body temperature, respiration rate and/or volume, blood oxygen level and/or level of $CO_2$ in exhaled breath, that can be used to infer information regarding the recorder's physical and/or mental state during recording. Such information can be useful in a: variety of ways. For example, monitoring one or more of the, above-mentioned physical characteristics can enable the recorder's emotional state to be inferred (e.g., when the recorder is excited or bored). This information can then be used to enable identification of parts of a recording that have a relatively high probability of being interesting or uninteresting. This can be particularly useful when a large amount of recording data has been obtained, since there may only be a relatively small amount of the recording data that is of real interest. In particular, physiological data can be advantageously used with retrospective and predictive marks (discussed elsewhere herein) to facilitate determination of whether recording data associated with a retrospective or predictive mark in fact represents content of interest (e.g., recording data temporally proximate to the recording data designated by the mark can be searched to identify recording data obtained while the recorder was experiencing a particular emotional state, such as excitement or fear). (Position data can also be used for this purpose.) Additionally, such identification of the nature of content represented by particular recording data can be used itself to mark parts of the recording, e.g., mark parts of the recording that are expected to be interesting. It may also be desirable to simply display such physiological data, or display an indicator of the recorder's emotional state that corresponds to the physiological data n excitement is sensed, display an indication of excitement and, perhaps, the level of excitement).

A physiological monitoring device can also be used to monitor other physical characteristics for other purposes. For example, it may be desirable to measure forces exerted on, or by, a recorder at one or more points on the recorder's body. This data could be displayed to the recorder during recording, perhaps to facilitate the recorder in anticipating fatigue or monitoring over-exertion of a weak or injured body part (e.g., an injured knee), or to allow the recorder to gauge the level of exercise that the recording is receiving during the event (this may be useful, for example, when the recording unit is being used during physically rigorous activities, such as riding a bicycle or hiking). An EMG device, which measures neural activity to muscles, can also be used for these purposes.

Multiple physiological monitoring devices can be included as part of a recording unit according to the invention. A recording unit can include more than one of a particular type of physiological monitoring device (e.g., multiple EMG devices) and/or can include multiple different types of physiological monitoring devices (e.g., devices for measuring heart rate, galvanic skin response and/or body temperature). Measurements from multiple physiological monitoring devices can be compared, combined or otherwise analyzed together to enable or facilitate inference of information regarding the recorder based on the physiological, measurements. Measurement(s) from one physiological monitoring device can also be compared to measurement(s) from a second physiological monitoring device to increase or decrease the level of confidence in information inferred about the recorder based on the measurement(s) obtained by the first physiological monitoring device. For example, measurement of an elevated heart rate of the recorder may indicate that the recorder is excited or has just engaged in physical exertion. A measurement of galvanic skin response can assist in determining which of these two possible explanations (or another explanation) is the most likely explanation for the recorder's elevated heart rate. Respiratory measurements can enable further refinement of the inference regarding the reason for the recorder's physical state.

It may also be desirable to use a biometric device as part of a recording unit for identification purposes, e.g., to render a recording unit non-operational unless an approved person is identified by the biometric device. Biometric identification can also be used to control access to recording data and/or augmenting data. Biometric devices that can be used for this purpose include, for example, fingerprint scanning devices, retinal scanning devices or faceprint scanning devices.

Those skilled in the art will recognize that there are other ways in which the physiological monitoring and/or biometric data described above might be used with a recording unit according to the invention, either during recording or during post-event processing and/or display of a recording. Further, those skilled in the art will appreciate that there are other types of physiological monitoring and/or biometric data that can be obtained and productively used by a recording unit according to the invention.

A physiological monitoring or biometric device for use in a recording unit according to the invention can be implemented so that the recorder must initiate operation of the device (i.e., acquisition of physiological or biometric data). Alternatively, the physiological monitoring or biometric device can be implemented so that the device operates automatically, acquiring data whenever the recording unit is powered on or recording (and, if applicable to the particular device, e.g., a biometric device used for identification, when the device detects the presence of an input to the device's sensor(s)). The latter type of physiological monitoring or biometric device is more in keeping with the goal of making a recording unit according to the invention a low attention device. However, the former may be desirable to give the recorder more control over the acquisition of physiological or biometric data, which recorders may generally deem to be more intrusive and, in some situations, undesirable.

4. Data Processing and Storage

A wide variety of data processing and storage devices can be used in a recording unit according to the invention. The data processing and storage devices used must be controllable by the system controller, which typically is embodied by a computer processing device. The particular devices used can depend upon the intended applications for the recording unit, as well as the types and characteristics of the other devices that are part of the recording unit.

For example, it may be necessary to provide a device that performs A/D conversion of recording data if, for example, the recording unit includes one or more analog data acquisition devices (e.g., analog video camera, analog microphone(s)) and a digital data storage device (e.g., hard disk). Such processing can be accomplished using conventional techniques and apparatus.

Since the amount of visual recording data obtained is typically very large, it can be desirable to provide a device that performs compression of the visual recording data before the visual recording data is stored on the data storage device, thus reducing the amount of data that must be stored to represent a visual recording. (While it is also possible to compress the audio recording data, compression of the audio recording data is typically less useful than compression of the visual recording data, since the amount of visual recording data obtained per unit time is typically much larger than the amount of audio recording data obtained per unit time.) Data compression is particularly advantageous in a small portable device, such as a recording unit according to the invention, since the data storage device(s) included therein are relatively small and, therefore, have a relatively limited storage capacity. A recording unit according to the invention can be implemented so that the amount of compression is predetermined as part of the operating software of the recording unit or, as discussed further below, so that the amount of compression can be specified by the recorder. In particular, it can be desirable to implement the recording unit so that the visual recording data is always compressed a specified minimum amount, since such compression increases the amount of recording data that can be stored by the recording unit and, therefore, the duration of time that the recording unit can be used before the provision for additional data storage must be made (either by transferring the recording data from the recording unit to another data storage medium or by replacing the non-volatile data storage device of the recording unit).

A variety of methods for compressing visual data are known and can be used to compress the visual recording data obtained by a recording unit according to the invention. Compression methods that facilitate searching and/or playback of stored, compressed visual data are preferred. In one embodiment of the invention, a motion JPEG (M-JPEG) compression method is used. (The Recon-11 DDR that can be used in a recording unit according to the invention, as discussed below, uses M-JPEG for compression of the visual recording data.) M-JPEG compresses frames of visual data individually, thus enabling images to be readily located and reconstructed from stored, compressed visual recording data. Additionally, for the processing power that is typically available in a recording unit according to the invention, M-JPEG produces a good combination of image quality and compression ratio. However, other compression methods, such as MPEG or wavelets, can also be used.

Though compression of the visual recording data is desirable-because it reduces the amount of data that must be stored to represent a visual recording, compression of the visual recording data usually results in loss of some of the image quality of the visual recording. Thus, it can be desirable to selectively compress the visual recording data, varying the amount of compression of the visual recording data for different parts of the visual recording. In particular, it can be desirable to enable the recorder to control the amount of compression of the visual recording data as the recording is being obtained. The recorder can then choose to obtain a relatively high quality visual recording (i.e., compress the visual recording data little or not at all) of things that are of particular interest or that the recorder believes may benefit more from an improvement in visual recording quality, and a lower quality visual recording (i.e., compress the visual recording data a relatively large amount) of other things. Or, if the recorder anticipates recording for a relatively long period, of time, the recorder may choose to compress all of the visual recording data (and, perhaps, compress as much as possible), so that the amount of time that the recording unit can be used is increased. The recording unit can be implemented so that the recorder can choose one of several discrete compression ratios, can choose any compression ratio along a continuum between a maximum and minimum compression ratio, or can choose a desired image quality which corresponds, in turn, to a particular compression ratio or sequence of compression ratios (i.e., the amount of compression to produce images of a desired quality can vary depending upon the content of the images).

The difference in duration of visual recording that can be stored by a recording unit can be drastic, depending upon the amount of visual compression used. Illustratively, when the above-described Super Circuits PC-17YC video camera is used for visual recording and a hard disk having a 9 gigabyte storage capacity is used for non-volatile storage of recording data, approximately 20 minutes of visual recording can be stored on the hard disk when the visual recording data is compressed a minimal amount (e.g., a compression ratio of about 4:1). If the visual recording data is compressed as much as possible while still retaining a recognizable visual recording (e.g., a compression ratio of about 54:1), approximately 4.5 hours of visual recording can be stored. It is desirable to compress the visual recording data so that the recording unit can be used for the entirety of most events for which use of the recording unit is intended (e.g., so that 2–3 hours of visual recording data can be stored by the recording unit). Thus, it may be-desirable to restrict the recorder to a minimum compression ratio (e.g., a compression ratio of about 24:1) that ensures that at least a minimum duration (e.g., 2 hours) of visual recording can be stored by the recording unit, and a maximum compression ratio that ensures that the visual recording will have at least a minimum level of image quality.

To conserve power in the recording unit, it can be desirable to control a non-volatile data storage device of the recording unit so that the non-volatile data storage device is not fully operational (e.g., the disk or disks of a hard disk are being rotated) when recording data has not been acquired and stored, or stored recording data has not been accessed for playback, for a predefined period of time. The non-volatile data storage device can be controlled in such manner in response to appropriate control instructions from the system controller or other processing device.

Depending on the particular data acquisition and data processing devices used, it may also be necessary to use a pre-amplifier to amplify the signal representing the data obtained by the data-acquisition device prior to inputting the signal to the data processing device or devices that perform some or all of the above-described functions (e.g., A/D conversion, compression). For example, when the above-described lavalier microphone is used as an audio data acquisition device together in a recording unit with the Recon-11 DDR described below, it is necessary to use a pre-amplifier to amplify the audio signal from microphone level to line level prior to inputting the signal to the Recon-11 DDR.

A digital disk recorder (DDR) can be used to accomplish both A/D conversion and digital data compression in a recording unit according to the invention. Illustratively, a DDR that can be used with the invention is a Recon-11 made by Fast Forward Video, located in Irvine, Calif. This DDR is a relatively low power, small, portable device, thus making it particularly suitable for use in a recording unit according to the invention. Additionally, this DDR can perform A/D conversion of both audio and visual data. This DDR can also be programmed (as can readily be done by those skilled in the art) to enable the DDR to control a non-volatile data storage device to which the DDR is connected, in response to instructions from a system controller, so that the data storage device is operated at a low power condition at times when recording data is not being, or will not imminently be (in accordance with the characteristics of the data storage device), obtained. This DDR can also be programmed (again, as can readily be done by those skilled in the art) to enable the DDR to record other types of data (e.g., GPS data, compass data, time codes) with the visual recording data.

Typically, the data processing device or devices of a recording unit according to the invention are adapted to process recording data from a defined set of data acquisition devices of the recording unit. For example, small DDR's are typically adapted to process recording data from a single visual data acquisition device and several (e.g., 2–4) audio data acquisition devices. It may be desirable, however, for the data processing device(s) to be capable of processing recording data from one or more additional data acquisition devices. For example, it may be desirable for a recording unit including a small, inexpensive DDR as above to be able to receive recording data from an additional visual data acquisition device for storage by the recording unit. This may be necessary, for example, to enable the recording unit to include an additional visual data acquisition device (as discussed above). Or, it may be desirable to enable processing of recording data received by the recording unit from another recording unit to facilitate, for example, display and/or storage of a recording being obtained by such other recording unit. It may also be desirable for a recording unit including a small, inexpensive DDR as above to be able to process data acquired by a visual data acquisition device for storage by the recording unit, while simultaneously outputting data previously stored by the recording unit for display by the recording unit.

One way of enabling processing of recording data from one or more additional devices is to provide redundant data processing device(s) (e.g., multiple DDR's) and integrate the operation of those data processing devices with each other. The integration of multiple DDR's into a recording unit according to the invention, for example, can be readily accomplished by those skilled in the art in view of the description herein. However, a DDR (e.g., a Recon-11 DDR as described illustratively above) can be a significant source of power consumption in a recording unit according to the invention; the use of multiple such DDR's necessitates the provision of a larger power supply (thus making the recording unit larger and heavier) in order to enable the recording unit to be used for the same amount of time without recharging or replacing the power supply, or acceptance that the recording unit can be used for a significantly shorter period of time without recharging or replacement of the power supply. Further, the addition of data processing devices to the recording unit undesirably increases the weight and bulk of the recording unit.

Instead of adding additional data processing devices, the existing data processing devices can be modified (by modifying the data processing device hardware and/or the software used to control operation of the data processing devices) to enable processing of recording data acquired by, or to be provided to, additional devices. This can be desirable to eliminate the extra power consumption, weight and bulk associated with the addition of additional data processing device(s). However, modifying the data processing devices to accommodate additional devices can be a more complex (and therefore, perhaps, undesirable) task than adding and integrating additional data processing devices.

Further, while the current state of DDR technology is such that processing by a single, small DDR of recording data acquired from, or to be provided to, additional devices (especially visual data acquisition devices) as described above mandates use of a DDR that is undesirably expensive, heavy and bulky for use in a recording unit according to the invention, further development of DDRs can be expected to result in the production of a sufficiently inexpensive, small and lightweight DDR that can process the extra recording data from the additional devices.

Another possibility for enabling processing of recording data from additional data acquisition devices is to modify the data processing device(s) so that only some of the data from each data acquisition device is processed. For example, NTSC video, commonly acquired at 30 frames per second, is acquired by interlacing the acquisition of pairs of fields (each field comprised of half the data of a frame of video data) at 60 fields per second. A data processing device adapted-to enable data acquisition from an NTSC video data acquisition device can be modified to acquire data from two NTSC video data acquisition devices by causing the data processing device to process only one of each pair of fields acquired by each video data acquisition device. While this reduces the resolution of the images acquired by each video data acquisition device, that may be deemed an acceptable price to pay to enable acquisition of video from an additional data acquisition device. The above-described technique can readily be used for analog recording. The above-described technique can also generally be used for digital recording, though use of an MPEG compression algorithm may make the technique very difficult or impractical to implement.

If the data processing device(s) of the recording unit are adapted to enable processing of multiple recordings (in particular, multiple visual recordings), it can be possible to further adapt the recording unit to enable the recording data of the multiple recordings to be stored. This can be done by appropriately adapting the data processing device(s) (e.g., the computer programs that effect control of the operation of the data processing device(s)), as can be accomplished by those skilled in the art, to cause the recording data to be stored.

It may be desirable to identify acquired audio recording data that represents sounds that are anticipated to be of little or no interest or importance to the recorder, so that such audio recording data can be discarded and not stored on a data storage device of the recording unit, thereby freeing up storage capacity for obtaining other recording data (e.g., audio recording data from additional audio data acquisition devices). For example, as discussed above, it is anticipated that it will typically be desirable to acquire audio recording data primarily representing sounds that emanate from a location in front of the recorder. However, if a recording unit according to the invention includes omni-directional microphone(s), the acquired audio recording data will include a substantial amount of audio data representing sounds emanating from locations other than those in front of the recorder. Even a directional microphone positioned to primarily sense sounds that emanate from in front of the recorder will sense sound from the sides and behind the recorder. It may be desirable to eliminate such audio recording data. It may also be desirable to eliminate other audio recording data that is anticipated to be of little or no interest or importance to the recorder, e.g., audio recording data representing sounds emanating from particular sources, such as particular speakers.

If a recording unit according to the invention includes multiple microphones, a beam forming method can be used to discriminate the sounds of interest or importance from other sounds. A beam forming method can be performed by the system controller or data processing device(s) operating in accordance with a computer program stored in the data storage device. (It may, alternatively, be desirable to provide a separate processing device or devices, e.g., one or more digital signal processors, to perform beam forming.) Beam forming can, for example, enable isolation of the location of the source of an audio signal from the difference in time of receipt of the audio signal at each microphone. Once the location of the source of the audio signal has been isolated, a decision can be made, based upon one or more predetermined criteria, as to whether to discard or store the audio data representing the audio signal. The implementation of beam forming is known to those skilled in the art and is discussed in more detail below with respect to the description of post-event processing of recording data.

If beam forming is used in a recording unit according to the invention, it may be necessary to use more robust and/or complex processing device(s) and/or methods than would otherwise be used, or add additional processing device(s) to the recording unit, to perform the beam forming computations. If additional audio data acquisition devices are added to the recording as a consequence of performing beam forming, the implementation of beam forming in a recording unit according to the invention may also necessitate more complex data storage device(s) and/or methods. Those skilled in the art of implementing a beam forming method will understand how to specify the data processing and storage capabilities needed to perform the beam forming computations.

The quality of the discrimination of a beam forming method is improved as more microphones are used to provide audio data for use in the method. However, each additional microphone adds to the required data processing and storage capabilities. Moreover, the incremental improvement in beam forming results decreases with each additional microphone. Further, the addition of a microphone will increase the amount of recording data to be stored. The number of microphones used can be determined in view of these considerations.

It may be desirable for several reasons to implement a recording unit according to the invention so that beam forming is performed. For example, as indicated above, beam forming can reduce the data storage capacity required for the audio recording data obtained by a particular audio data acquisition device or devices. Thus, the use of beam forming in a recording unit according to the invention can enable additional audio data acquisition devices to be used in the recording unit with little or no attendant increase in data storage capacity requirements. The acquisition of audio recording data by one or more additional audio data acquisition devices is desirable because the likelihood of obtaining audio content of interest is increased and/or a higher quality audio recording display can be produced from the acquired audio recording data.

Additionally, as suggested above, beam forming can be particularly useful if the microphones of a recording unit according to the invention are omni-directional, since such microphones can be expected to acquire relatively more audio data representing sounds that are not of interest or importance to the recorder. In fact, the use of beam forming can enable relatively cheaper (as compared to directional microphones) omni-directional microphones to be used while still obtaining for storage on the data storage device a set of audio recording data that is, in terms of the spatial distribution of the audio recording, comparable to (or even, perhaps, better than) a set of audio recording data that could be obtained using directional microphones.

However, the implementation of beam forming in a recording unit according to the invention can have some disadvantages. For example, the use of beam forming to discard some audio recording data prior to storage creates the risk that desirable audio recording data may be discarded. (As indicated above, beam forming can be used to eliminate audio data that is anticipated—not known—to be of little interest.) Additionally, the use of beam forming to discard some audio recording data may impair the spatial fidelity of the audio recording. Further, the addition of processing capability to the recording unit to enable performance of the beam forming calculations adds to the cost of the recording unit. Thus, it may be preferred to implement a recording unit according to the invention without the capability to perform such processing of the audio recording data.

It may also be desirable to process physiological monitoring data obtained by a recording unit according to the invention. For example, physiological monitoring data can be lanalyzed to determined the emotional state of the recorder, e.g., the recorder's level of excitement, whether the recorder was startled, etc. Such derivative information can be displayed on a recording display device of the recording unit during recording. Additionally, it may be desirable to store this derivative information on a data storage device of the recording unit. In particular, it may be desirable to store this derivative information in lieu of the raw physiological data in order to minimize the data storage capacity required for storing physiological monitoring information. Alternatively, or in addition, it may be desirable to store the raw physiological data, so that the raw physiological data is available for post-event analysis.

A "data storage device" of a recording unit according to the invention can be embodied by one or more devices. Any appropriate devices, including both digital and analog devices, can be used. A recording unit according to the invention must include one or more non-volatile data storage devices. Below, the characteristics of non-volatile data storage device(s) for use in a recording unit according to the invention, as well as some exemplary embodiments of such non-volatile data storage device(s) are discussed in more detail. A recording unit according to the invention can also include one or more volatile data storage devices. For example, a random access memory (RAM) may be used to buffer data during recording.

The non-volatile data storage device(s) of a recording unit according to the invention are used to store instructions and/or data that are necessary to accomplish the functions of the recording unit or that are acquired during operation of the recording unit. This includes, of course, the recording data. The non-volatile data storage device(s) can also be used to store data (augmenting data) other than the recording data (e.g., data identifying, or corresponding to, the recording data), such as, for example, data identifying the time at which the recording data was obtained, data identifying the recording unit (and/or recorder) that obtained the recording data, data representing the position and/or velocity of the recording unit at the time the recording data was obtained, data representing a mark to be associated with the recording data, and/or physiological monitoring and/or biometric data representing physical characteristics of the recorder. The non-volatile data storage device(s) are also used to store instructions and/or data (e.g., computer programs) used to effect operation of components—in particular, the system controller—of the recording unit.

Recording data and augmenting data can be stored together on a single non-volatile data storage device. Recording data and augmenting data can also be stored on different non-volatile data storage devices. In the latter case, it can be desirable to establish a temporal correspondence between the augmenting data and the recording data in order to minimize or eliminate the need for post-event processing to temporally synchronize the augmenting data and recording data. Such a temporal correspondence can be established using methods as described below for establishing a temporal correspondence between the auxiliary data and the recording data obtained by a hybrid recording unit according to the invention.

In general, it is desirable that a recording unit according to the invention have a large data storage capacity. In particular, this is desirably so for the data storage device(s) used to store the recording data, so that the recording unit can record events of relatively long duration. Data storage capacity can be increased by using a data storage device with larger data storage capacity or by using multiple data storage devices. However, typically, increasing data storage capacity (in either of the foregoing ways) results in an increase in the size and weight of the data storage device(s). Additionally, increasing data storage capacity by adding one or more data storage devices necessitates a more complex integration of the data storage device(s) with the rest of the recording unit (e.g., system controller). As indicated above, it is generally desirable that the recording unit be as small as possible; in keeping with this goal, it is desirable that the data storage device(s) be as small as possible. The data storage capacity of the data storage device(s) of a recording unit according to the invention can be established in view of the above considerations, together with consideration of the intended use(s) of the recording unit and the characteristics (e.g., size and weight) of the other components of the recording unit. It is anticipated that, for many applications of the invention, it is desirable that a non-volatile data storage device of a recording unit according to the invention include sufficient data storage capacity to allow, in view of the particular implementation and operation of other components of the recording unit, several hours (e.g., 2–5 hours) of recording data to be stored.

Since the recording unit is a portable device and therefore more likely than a stationary device to be subject to jarring movements (as a result of, for example, sudden movement by the recorder, jarring of the recorder by impact with another person or an object, dropping of the recording unit, or bumping of the recording unit into another object), it is also desirable that the data storage device(s) be implemented so that the data storage device(s) are relatively insensitive to shocks associated with such impacts. For example, impact-resistant hard disks that are used in portable computers can advantageously be used in a recording unit according to the invention.

As indicated above, any of a variety of appropriate devices can be used to embody a "data storage device" of a recording unit according to the invention. For example, the non-volatile data storage device can be a conventional hard disk. Illustratively, in one embodiment of a recording unit according to the invention, a Seagate Barracuda hard disk having a 6 or 9 gigabyte capacity can be used to embody a non-volatile data storage device of the recording unit according to the invention. A particular Barracuda hard disk that is compatible with the Recon-11 DDR and has a 9 gigabyte data storage capacity is the hard disk having part no. ST 39173-N. The casing of this half-height hard disk is approximately 1 inch high, 4 inches wide and 5.75 inches deep, making it a relatively small device that is suitable for use with a recording unit according to the invention.

In general, both IDE and SCSI hard disks can be used in a recording unit according to the invention. When the above-described Recon-11 DDR is used in a recording unit according to the invention, and the hard disk interfaces directly therewith, a SCSI hard disk must be used. In other embodiments of the invention, however, it can be desirable to, use an IDE hard disk. For example, there are a variety of high-capacity, shock-resistant IDE hard disks that have been developed for use in portable devices. Illustratively, IBM has developed small (i.e., using 2.5 inch disks), lightweight, low power, IDE-compatible hard disks referred to as Travelstar hard disks. In particular, the IBM Travelstar hard disk designated as the 14GS has a 14 gigabyte data storage capacity and is rated to withstand an operating shock of about 125 g's and a non-operating shock of about 400 g's; such a hard disk can be advantageously used in a recording unit according to the invention.

Non-volatile data storage devices other than a hard disk can also be used. For example, the visual recording data can be recorded onto a videotape. Such an implementation has an advantage that videotape is not susceptible to the data destruction that can occur with a hard disk if the disk surface of the hard disk is damaged as a result of jarring of the hard disk. On the other hand, recording data stored on videotape cannot be searched and played back as easily as can data stored on a hard disk. The use of a videotape may also entail some other limitations on the processing of recording data by the recording unit: for example, the use of videotape prevents user-selected variable compression. Either analog videotape (such as a videotape using the Hi-8 format) or digital videotape (such as a videotape using the mini-DV, DV-CAM, DVC-PRO, DVC PRO 50, digital beta cam or D-VHS format) can be used.

A recording unit according to the invention can also be implemented to use a removable data storage medium, such as a recordable once DVD (DVD-R) disk or a recordable/writable DVD (R-W DVD) disk, as a non-volatile data storage device. Such an implementation has an advantage that the recording unit could be modified to enable the DVD disk to be easily removed and replaced with a new DVD disk. This would enable the recording unit to be used "in the field" for a longer period of time, limited only by the number of DVD disks that it is feasible to carry.

Solid-state memory, such as flash memory, can also be used as a non-volatile data storage device in a recording unit according to the invention. Flash memory can be desirable because, unlike a hard disk, there are no moving parts that can fail. Additionally, flash memory consumes relatively little power. Flash memory is also relatively small and lightweight. In view of the foregoing, it can be desirable to use flash memory in a recording unit according to the invention, particularly as the data storage capacity of flash memory increases with further developments in that technology.

The above discussion illustrates some of the possibilities for storage of data in a recording unit according to the invention. Data storage technology continues to evolve, existing technologies being improved (e.g., data storage capacity increased, size reduced, cost reduced) and new technologies being developed. It can readily be appreciated that such developments will produce new, currently nonexistent devices that can advantageously be used in a recording unit according to the invention.

5. Communication with Other Recording Units and Recorders a. Communication Between Recording Units Each recording unit can include a transmitter that enables signals representing the recording data (and, if desired, other related data) obtained by that recording unit to be broadcast from the recording unit. Similarly, each recording unit can include a receiver that enables receipt of signals broadcast from other recording units that represent the recording data (and, if desired, other related data) obtained by those recording units. The transmitters and receivers enable recording data to be communicated between recording units during recording of an event by the recording units, thus enabling a recording unit to display and/or store, during the event, a recording being obtained by another recording unit. The recording data signals transmitted by the transmitter of a recording unit can also be received by the receiver of that recording unit and used to generate a display of the recording being obtained by the recording unit. (This can be advantageous, for reasons explained further below.) While a recording unit may include only a transmitter or a receiver—thus limiting that recording unit to either transmitting its own recording data or receiving recording data signals from other recording units—it is anticipated that it will usually be desirable that all recording units include a transmitter and receiver.

Since, typically, a multiplicity of recording units will be transmitting recording data signals at the same time, the transmitter and receiver of a recording unit according to the invention are preferably adapted to enable transmission and reception of recording data signals over a multiplicity of transmission channels, so that each recording unit can transmit recording data signals over a channel that is not being used by another recording unit. In general, any number of channels can be used. The number of channels can be established in view of expectations regarding the number of recording units that will typically be used together to record an event. Additionally, the number of channels may be limited by the available communications bandwidth (particularly since bandwidth consumptive visual data is being transmitted). The number of channels can be established in view of considerations such as those given above, as well as any other considerations relevant to a particular implementation of a recording unit according to the invention or the intended use of the recording unit. Illustratively, four transmission channels can be used.

Additionally, to ensure that only signals representing recording data from a recording unit according to the invention can be received by a receiver of a recording unit according to the invention, the recording data can be encoded prior to transmission in a manner that identifies the transmitted signal as one transmitted by a "compatible" recording device (i.e., a recording unit according to the invention). Further, the recording data can be more specifically encoded so that the recording data is identified as coming from a particular recording unit or group of recording units. (It is anticipated that the latter, more specific, encoding will typically be done, since it is anticipated that recorders will only want to share recordings with other recorders in their group.) Correspondingly, the receiver can be adapted so that only signals that have been properly encoded (indicating that the signals have been transmitted by a recording unit according to the invention) can be received. Such encoding can be accomplished in any of a variety of well-known ways. For example, the signals can be encrypted (using any appropriate encryption algorithm), transmitted surrounding a specified carrier frequency, transmitted in unique data packets or transmitted using a spread-spectrum technique. Moreover, if the transmitted data includes data other than recording data (such as GPS position data, physiological monitoring data and/or biometric data, as discussed elsewhere herein), the transmitted signals will inherently be closely (perhaps uniquely) identified with recording units according to the invention.

As indicated above, the recording data signals received by a recording unit from another recording unit can be used to generate a display of the recording obtained by that other recording unit and/or used to store recording data obtained by the other recording unit in the data storage device of the receiving recording unit. However, it may desirable to allow storage in a recording unit only of recording data representing the recording(s) being obtained by that recording unit. This may be desirable to minimize the possibility of failing to store recording data representing interesting content. For example, as recording occurs, two or more recorders (and, in a worst case, all recorders) may decide that the recording being obtained by a particular recording unit is of most interest, and may, as a result, control their recording unit to cause that recording data to be stored. Unexpectedly, interesting activity occurs for which recording data is acquired by a recording unit or units that is storing data representing the recording(s) being obtained by another recording unit. Since recording data representing the interesting activity is not being stored, the recording of the interesting activity is lost. Thus, by allowing each recording unit to store data representing the recording(s) obtained by another recording units, one of the advantages of having multiple recording units recording an event from multiple perspectives can be diminished or eliminated. By allowing each recording unit only to store data obtained by that recording unit, the chances of recording interesting activity are increased. Though such a limitation does preclude a recorder from storing recording data obtained by other recording units that may be more interesting than the recording data obtained by the recorder's recording unit, it is anticipated that this limitation will often be of little or no detriment, since it will often be the case that the recorders have a sufficiently close relationship that the recorders can, and will, exchange recording data after the event is over, thus enabling each recorder to obtain, if desired, part or all of a recording obtained by another recording unit. It is to be understood, however, that a recording unit according to the invention can also be implemented so that the recording unit can store recording data obtained by another recording unit, and, further, so that the recorder can, on an ongoing basis, choose from which recording unit to store recording data. Further, with appropriate implementation of the data recording device(s), a recording unit according to the invention may be implemented so that recording data from multiple recording units can be recorded simultaneously; this capability may more likely be included in recording units according to the invention as recording devices (e.g., DDR's) evolve to make such capability more technologically simple (and inexpensive). However, to prevent the storage by others of a recording of something sensitive or personal, it may be desirable to accompany the inclusion of the capability of storing recording data from another recording unit with an additional capability for a recorder to designate recording data acquired by that recorder's recording unit as data that cannot be recorded (even, perhaps, by that recorder's recording unit). It may further be desirable to implement this privacy capability so that the recorder can prevent the transmission of such recording data in the first place. Additionally, the recording unit is preferably enabled to allow a recorder to simply turn off the transmitter at any time.

Transmitters and receivers for use in recording units according to the invention can be embodied by conventional television signal transmitters and receivers. In general, either analog or digital transmitters/receivers can be used. While analog devices are more inexpensive, digital devices are more reliable (e.g., digital devices typically suffer less from problems with interference between channels, digital communication protocols can include redundancy codes, it is easier to insert additional data into the digital data packet stream). The use of digital transmitters and receivers also makes it easier to broadcast other data (e.g., marks) with the recording data. Additionally, it may be desirable to match the type of transmitters/receivers with the type of data acquisition devices being used, so that it is not necessary to perform an A/D or D/A conversion prior to transmission of the data.

Illustratively, 2.4 gigahertz (the "nominal" frequency) analog television signal transmitters and receivers can be used, such components being readily commercially available. Generally, however, transmitters and receivers operating at other parts of the frequency spectrum can be used. Each of the transmission channels operates at a frequency near the nominal frequency.

Recording data can be transmitted as acquired. Alternatively, it can be desirable to process the recording data prior to transmission to other recording units. For example, if the data acquisition devices being used in the communicating recording units are analog and the transmitters/receivers are digital, or vice versa, it is necessary to perform an A/D or D/A conversion, as appropriate, prior to transmitting the data. Additionally, the recording data can be compressed before being transmitted. (The recording data can be compressed by an amount for transmission from the recording unit that is different than the amount by which the recording data is compressed for storage by the recording unit.) Compression of the recording data prior to transmission has the advantage of reducing the amount of data transmitted (which may, for example, enable more channels of recording data to be transmitted, i.e., more recording units can simultaneously transmit data). However, compression can degrade the quality of the images generated from the recording data. Whether or not to compress the recording data—and, if so, how much—can be decided in view of this tradeoff.

Data other than recording data can also be exchanged between recording units. For example, it may be desirable to coordinate the recordings obtained by recording units so that frames of visual recording data obtained by different recording units are temporally synchronized (e.g., so that a frame begins at the same time for each recording unit). This can be done by transmitting a synchronization pulse from a "master" recording unit to each of the other recording units ("slave" recording units). (Synchronizing analog visual data acquisition devices in this way is referred to as "genlocking.")

b. Communication Between Recorders

As discussed above, it is envisioned that a recording unit according to the invention will frequently be used to record a group event that is also being recorded by other people (recorders) who are using a recording unit according to the invention. A recording unit according to the invention can include an audio communication device that enables spoken communications between and among recorders during the event. The inclusion of an audio communication device can be particularly desirable as a mechanism to enable communication when circumstances make direct spoken communication impractical, impossible or undesirable. While an audio communication device is generally desirable to enable communication of any type between recorders, an audio communication device may be particularly desirable to facilitate coordination of recording by different recorders to, for example, increase the likelihood of obtaining content of interest, ensure that all members of the group are being recorded during the event, minimize redundancy in the content of different recordings, or acquire content that can be used to create interesting visual effects when displayed at a later time. While such coordination can occur to a certain extent as a result of sharing recordings, as described above, the use of an audio communication device makes such coordination easier.

Like other components of a recording unit according to the invention, it is desirable that the audio communication device require little attention from the recorder (e.g., be easy to operate). The audio communication device can be made wearable as a means to achieve this goal. Additionally, again like other components of a recording unit according to the invention, it is desirable that the audio communication device be small and lightweight. It is also desirable that the audio communication device have a communication range that is adequate to ensure acceptable communication over the maximum anticipated distance between recorders during the event (it is anticipated that adequate range will not be a problem for most audio communication devices that may be used in a recording unit according to the invention).

Additionally, it can be desirable that the audio communication device be unobtrusive. Obtrusiveness of the audio communication device includes several aspects: characteristics (e.g., loudness) and control of the audio output; physical interference with, or distractiveness to, the recorder; and distractiveness to people in the vicinity of the recorder. For example, it can be desirable that the audio communication device be embodied so that audio communication received from another recorder is not provided to the recorder loudly enough to distract the recorder or people in the vicinity of the recorder from participation in the event, or to be undesirably prominent in the audio recording obtained by a recording unit. The size, weight and mounting location (if wearable) of the audio communication device can also desirably be controlled so that the presence of the audio communication device is not overly noticeable to the recorder. It may also be desirable to implement the audio communication device (together with the control interface device, discussed below), so that the recorder can control whether audio communications can be received by the audio communication device. For example, a recording unit can be implemented so that a signal (e.g., an audible tone and/or a display of the identity of a person attempting to communicate with the recorder) is provided to the recorder when another recorder has indicated a desire to transmit an audio communication, a control interface device of the recording unit including a capability that allows the recorder to either receive or not receive the audio transmission, such decision being communicated to the recorder desiring to transmit an audio communication.

On the other hand, making the audio communication device unobtrusive can have disadvantages. If a person interacting with a recorder is unaware that the recorder is receiving audio communications from other recorders, the person may be put off when the recorder reacts to a communication from another recorder in a manner that seems, absent knowledge of the communication, out of place or rude. Or, if a person is aware that the recorder is receiving audio communications from other recorders, but can't hear the content of those communications, they may feel uncomfortable because of a perception of exclusion or of secretiveness on the part of the recorder. Such considerations are particularly important for an apparatus, such as a recording unit according to the invention, that is intended to be used in social situations. The particular implementation of an audio communication device according to the invention can be chosen in view of the above-described advantages and disadvantages associated with making the audio communications device obtrusive or unobtrusive.

An audio communications device of a recording unit according to the invention can be embodied any of a variety of known devices. The particular device used and the manner of integrating the device with the recorder and the rest of the recording unit can be established in view of the considerations discussed above and below.

For example, a headset including speakers and a microphone, such as worn by telephone operators and receptionists, can be used. The use of such a headset can be desirable because the headset is designed to be a wearable device and is relatively lightweight. The headset also minimizes or eliminates the distractiveness of audio communications to others in the vicinity of the recorder. Additionally, the headset requires no action on the part of the recorder other than speaking and listening (which, of course, is a necessary minimum involvement of the recorder) and is, in that way, unobtrusive. However, the physical presence of the speaker/microphone headset may be distracting to the recorder or to other people interacting with the recorder.

A two-way radio or cell phone can also be used. These devices can be made small and light enough that the device can be carried easily in a pocket of the recorder's clothing, or can be worn by the recorder (e.g., attached in a manner similar to that described above with respect to the visual and audio data acquisition devices, such as by clipping on a shoulder strap). If carried in a pocket, the device is not distracting to others, but may require more interaction by the recorder to enable use of the audio communication device than is desired. Illustratively, a Nextel phone having a walkie-talkie mode that makes use of a cellular network can also be used (as long as the recording units are within range of a Nextel cell site). The use of a Nextel phone can be particularly advantageous because of the extensive communication range afforded (much greater than that of a typical two-way radio). Of particular utility when more than two recorders are using a recording unit according to the invention, a Nextel phone can be operated in a mode that enables communication from a recorder to be broadcast to all recording units in a defined group.

A speaker/microphone lapel unit (such as used by police officers) or other similar unit that can be worn near the head can also be used. Such speaker/microphone units are wearable, small, lightweight and relatively unobtrusive. The speaker/microphone unit would desirably be mounted in the vicinity of the recorder's mouth (e.g., a lapel unit could be mounted on the backpack straps of the particular embodiment of a recording unit described below with respect to FIG. 6) and would include a pushbutton for activating the microphone. Device(s) for transmitting and receiving communication are interconnected with the speaker/microphone unit and can be embodied, for example, in an apparatus that can be carried around in a pocket of the recorder's clothing.

Transmitters and receivers that can be used to communicate recording data between recording units can also be used to enable communication between recorders. A recording unit (the "transmitting recording unit") can be adapted to enable the transmitter of the recording unit to communicate a signal or signals representing communicative information (as described further below) that can be received by the receiver of one or more other recording units (the "receiving recording unit(s)"). For example, a transmitting recording unit can be adapted to transmit communicative information that causes emission of an audible tone, display of a visual cue (e.g., lighting of an LED indicator) and/or production of a haptic sensation (e.g., vibration, using mechanisms such as have been used in cell phones or pagers) by a receiving recording unit, such tone and/or visual cue having a predetermined meaning. The predetermined meaning can be, for example, that a recorder (a "receiving recorder") using a receiving recording unit should listen to the recording being transmitted from the transmitting recording unit. The recorder using the transmitting recording unit (the "transmitting recorder") can then talk, such speech being heard as part of the recording transmitted from the transmitting recording unit to the receiving recording unit(s), thereby enabling the transmitting recorder to communicate to the receiving recorder(s). Such a tone and/or visual cue can also have other meanings, such as, for example, that the receiving recorder should watch the visual recording being transmitted by the transmitting recording unit, that the receiving recorder should look at the transmitting recorder, or that the receiving recorder should look or listen in some other manner (e.g., "look around"). Such communication between recorders can be useful, in particular, when it is difficult or impossible for one or more receiving recorders to otherwise hear or see the transmitting recorder. Further, recording units according to the invention can be implemented so that different communicative information can be transmitted that produces corresponding different tones and/or visual cues. This may be useful, for example, to enable identification of the transmitting recorder when (as is expected will typically be the case) there are multiple possible transmitting recorders. This may also be useful, for example, to enable identification of which of multiple types of communicative information has been received by the receiving recording unit. Communicative information can also be transmitted by implementing a control interface device of a recording unit so that the recorder can specify desired textual information to be transmitted to one or more other recording units, which, upon receipt of that information by receiving recording unit(s), is displayed by a display device (which can be an audio display device, a visual display device, or both) of the receiving recording unit(s). For example, the textual information can be displayed as a text overlay on a visual display device or as digitized or synthesized speech by an audio display device.

It can also be desirable to provide a capability for a recorder to communicate with only a specific one of the other recording units. This can be implemented in a variety of ways. For example, a control interface device of a recording unit can include a special button that is used to indicate to a specified other recording unit (by, for example, causing a transmitter to transmit a signal to that recording unit that causes emission of an audible tone by that recording unit) that a message is being communicated to that recording unit. The control interface device of the first recording unit can then be used as described above to specify communicative information that is received and displayed by a display device of the second recording unit. Another way to provide such one-on-one communication is to designate a particular channel of the audio communications devices used for communication among all of the recorders as a channel for use in such one-on-one communication. While this alternative is less private than the previously described implementation, it may be easier and less expensive to implement, since the necessary devices are already part of the recording units.

6. Recording Display

A recording unit according to the invention can include one or more devices that display a recording to the recorder as the recording is being obtained. While a recording display device is not a necessary part of a recording unit according to the invention, a recording display device (and, in particular, a visual recording display device) is highly desirable, since the recording display device can be used to monitor the content of a recording as the recording is being obtained, thereby enabling a recorder to control the recording unit as necessary to obtain desired content and to verify that the recording unit is operating properly (both of which are particularly useful when the recorder first begins recording or when activity of particular interest is occurring). Additionally, when a recording unit is implemented so as to be able to acquire recording data being obtained by other recording units, the capability of displaying those recordings is important to fully realize the benefits of acquiring that recording data. Further, the ability to view recordings obtained by other recorders can be used, together with the audio communication capability described above, to enable a group of recorders to coordinate their recording.

A display device or devices can be provided that display a visual recording, an audio recording, or both. Generally, any appropriate visual and audio display devices can be used to implement a visual recording display device and audio recording display device in a recording unit according to the invention.

In general, a displayed recording can be a recording obtained by the recording unit of which the display device(s) used to display the recording are part, or a recording obtained by another recording unit. The recording data used by a recording unit to generate a display of a recording obtained by another recording unit is obtained via reception by the recording unit's receiver of appropriate recording data signals from such recording unit, as described above. The recording data used by a recording unit to generate a display of the recording being obtained by that recording unit can also be obtained by the recording unit's receiver. When the recording data for all displayed recordings is obtained by the recording unit's receiver, control of which recording is displayed can be effected by selecting an appropriate channel for reception of the recording data signals for the desired recording.

Alternatively, recording data used to generate a display of the recording being obtained by the recording unit's own data acquisition devices can be obtained from those data acquisition devices (perhaps after processing by a data processing device of the recording unit). This approach necessitates the inclusion of a switching device in the recording unit to enable switching between recording data obtained by the receiver and recording data obtained by the data acquisition device(s). While this approach will typically enable a higher quality display to be generated of the recording being obtained by the recording unit's own recording devices (because there are no transmission losses or signal interference as occur with the transmission of the recording data signal from the recording unit's transmitter to the recording unit's recorder), it will also increase the cost and complexity of the recording unit as a result of the need to provide the switching capability. If digital data acquisition and transmission devices are used, rather than analog, the degradation of the transmitted signal may be relatively minimal, so that the quality of the display generated from the recording data signal received by the receiver that represents the recording unit's own recording data is of the same or nearly the same quality as the display generated from recording data that is obtained from the recording unit's data acquisition devices.

A switching device as described above may also be necessary when the recording unit has been adapted to enable multiple recordings to be obtained (e.g., recordings from multiple visual data acquisition devices).

A recording unit according to the invention can also be implemented so that recording data that has been previously obtained and stored by the recording unit can be retrieved and used to generate a display of a previously acquired part of the recording. The system controller, upon receipt of an appropriate instruction from the recorder via the control interface device, causes the recording data to be retrieved from the data storage device and transmitted to a recording display device for display.

a. Visual Recording Display

In view of the fact that the recording unit is a portable apparatus, and in keeping with the goal of the invention that the recording unit be unobtrusive, the visual recording display device is preferably embodied by a relatively small and lightweight visual display device. For example, in some embodiments of the invention, a recording unit is implemented with the intent that the visual recording display device be carried in a pocket of the recorder's clothing when not in use; in such embodiments, the visual recording display device must be sufficiently small to enable this to be done, typically resulting in a visual recording display device that consumes relatively little power. In some embodiments of the invention, as described further below, a recording unit is implemented so that a visual recording display device is mounted on the recorder; in such embodiments, the visual recording display device should be sufficiently small and lightweight that the mounted visual recording display device does not unduly encumber or distract the recorder. Since power consumption decreases with display size, using a small visual recording display device also has the virtue of reducing power consumption. (Particularly in embodiments of the invention in which the visual recording display device can be carried in the recorder's pocket, the power consumption of the visual recording display device can be greatly reduced by simply turning off the visual recording display device when in the recorder's pocket.)

As other components of a recording unit according to the invention, the visual recording display device can be adapted to be mounted on (e.g., attached on or worn by, as opposed to held by) the recorder. For example, the visual recording display device can be mounted on the back of the hand, on the wrist, or on the forearm of the recorder. This could be accomplished, for example, by attaching (e.g., strapping) the visual recording display device to a glove or a wristband. Illustratively, the visual recording display can be mounted on a wristband having opposing ends on which Velcro™ is formed, the opposing ends of the wrist band being secured to each other when the wristband is wrapped around a recorder's wrist. Such a wristband can be advantageous (particularly vis-a-vis a glove-mounted visual recording display device) because it can readily be used by recorders having different wrist sizes.

Another way in which the visual recording display device can be attached to the recorder is by attaching the visual recording display device to one end of a cord, the other end of which is attached to the recorder, e.g., to a waist belt or strap that is part of the recording unit according to the invention. To prevent the visual recording display device from dangling awkwardly, mating Velcro™ strips (one attached to the visual recording display device, the other attached to the recorder) or other appropriate attachment mechanism can be used to attach the visual recording display device to the recorder when not in use.

It may also be desirable to mount the visual recording display device in the vicinity of the eyes of the recorder (e.g., on the head, neck or shoulders) in a manner that enables the recorder to readily move the visual recording display into and out of the recorder's field of view. Though mounting a visual recording display device in this manner may be more obtrusive than mounting the visual recording display device on another part of the body, such mounting may be desirable—as compared to, for example, mounting the visual recording display device on the hand or wrist, or implementing the visual recording display device as an apparatus to be carried in the recorder's pocket—since the recorder can view a display of a visual recording without occupying a hand, thus leaving the hand free, either to effect control of the recording unit or to enable the recorder to participate in the event being recorded. For example, the visual recording display device can be mounted (e.g., with a hinge or a sliding mechanism) on glasses worn by the recorder so that the visual recording display device can be moved back and forth between positions in front of and away from one (preferable, so that the other eye is free for other viewing) or both eyes of the recorder. Alternatively, a display has recently been developed that can be embedded in eyeglasses (in a manner that is almost completely invisible to others), such that the wearer of the eyeglasses can control whether the display is visible or not (in the latter case, the wearer of the eyeglasses can see normally through the eyeglasses).

A visual recording display device can also be mounted on the visual data acquisition device. This can be useful to facilitate monitoring by the recorder of the visual recording being acquired as the recorder adjusts the orientation, the position or a filming characteristic (e.g., zoom lens, brightness control) of the visual data acquisition device.

Since it is anticipated that the primary function of the visual recording display device is to provide information to the recorder regarding the content of a visual recording that is being obtained by a recording unit, in general the visual recording display device need only produce a quality of display that is adequate to convey to the recorder the content of the displayed recording. Since the cost of a visual display device may decrease as the quality of the visual display decreases, the use of a lower quality display can be desirable because of the reduced cost. However, notwithstanding the increased cost, it can be desirable to provide a visual recording display device having a higher quality display in order to provide a more pleasing viewing experience to the recorder. (This may be particularly desirable if the visual recording display device can be used to view the recordings obtained by other recorders.)

As described above, a recording unit according to the invention can be implemented so as to enable acquisition of recording data obtained by one or more other recording units. Typically, then, this enables a recorder to display any of multiple visual recordings. As described elsewhere herein, a recording unit according to the invention can be implemented so that the recorder can select one of multiple visual channels for display of a corresponding visual recording by a visual recording display device of the recording unit.

In a recording unit that has the capability to acquire visual recordings from multiple recording units, it can be advantageous to implement the visual recording display device using a device capable of simultaneously displaying multiple visual recordings at one time. For example, the visual recording display device could be implemented so that the display screen is partitioned into equally sized windows, each window displaying a specified visual recording. Or, the visual recording display device could be partitioned into windows in a manner analogous to that of the picture-in-picture (PIP) display implemented in some television sets. However, though such simultaneous visual display is desirable. because it enables a recorder to be cognizant of the content of the visual recordings being obtained by more than one recording unit, such a display has disadvantages. For example, it may be felt that the provision of multiple visual recording displays is undesirably distracting to the recorder. Additionally, a visual recording display device having such multiple display capability is more complex and expensive to implement than a visual recording display device capable of displaying only a single visual recording. Further, since a visual recording display device of a recording unit according to the invention is preferably relatively small, the display screen of such device will be small as well: the display screen may be too small to adequately display multiple visual recordings. Whether to provide simultaneous visual display capability can be decided in view of such considerations.

A visual recording display device for use in a recording unit according to the invention can be embodied, for example, by a device that includes an LCD display. LCD displays using absorptive LCD technology can be used, as well as those using reflective LCD technology. The use of an LCD display can be advantageous because of the ready availability and relatively low cost of LCD displays. Illustratively, a Casio VM-50 LCD TFT display can be used. This LCD display is relatively small and produces a high quality image, though it requires a relatively large amount of power. Such display (or any other type of display) is situated within a housing and appropriately connected to other components of the recording unit (such as the receiver) as can be readily understood by those skilled in the art.

b. Audio Recording Display

As with other components of a recording unit according to the invention, it is desirable that the audio recording display device be small. Implementing the audio recording display device together with another component of the recording unit can aid in achieving this goal. For example, the audio recording display device can be one or more speakers integrated together with the visual recording display device in a single device. In the same vein, the audio recording display device can also be embodied by the audio output portion (speaker and related circuitry) of the same device used to implement audio communication between recorders.

Figure 6:
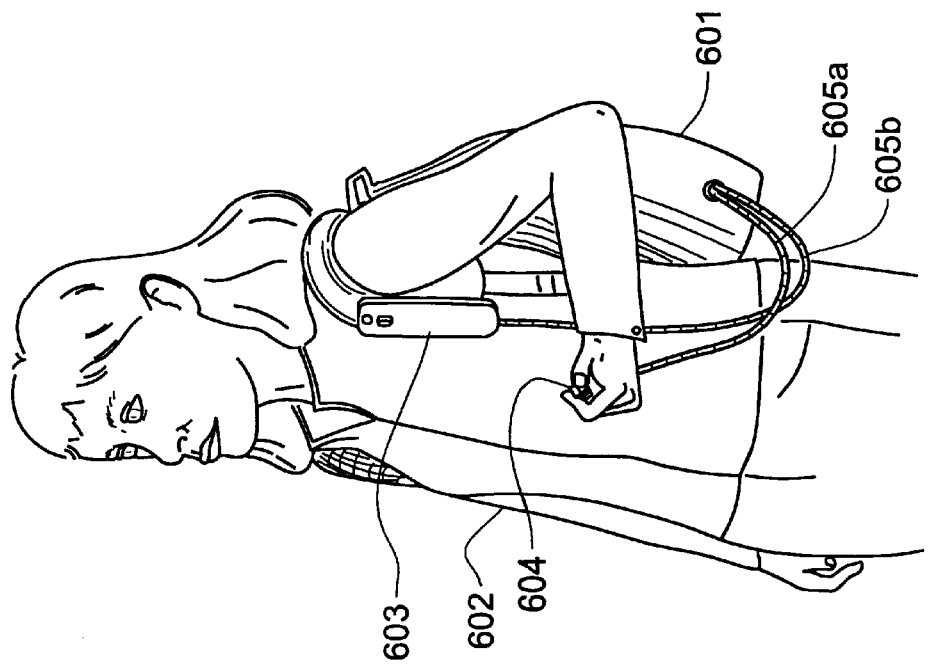
FIG. 6 illustrates another way of packaging a recording unit according to the invention.

It is also desirable that the audio recording display device be unobtrusive. Implementing the audio recording display device so as to be mountable on (e.g., attached on or worn by, as opposed to held) the recorder can aid in achieving this goal. For example, the audio recording display device can be a small speaker mounted near the head (and, thus, ears) of the recorder (e.g., on a backpack strap, in a particular embodiment of a recording unit as shown in FIG. 6). The audio recording display device can also be a headset, such as is commonly used with a variety of portable audio devices. However, the use of a headset may preclude or greatly inhibit firsthand aural participation in the event by the recorder, perhaps rendering its use undesirable. To minimize such detrimental effect, a non-isolating headset, which can be turned off to minimize or eliminate aural interference, can be used.

7. Control Interface

The control interface device includes all of the mechanisms for enabling the recorder to effect control of the operation of the recording unit, as well as the mechanisms for displaying information to the recorder regarding the operation of the recording unit. Illustratively, a control interface device for use in a recording unit according to the invention can be implemented in a manner similar to remote control devices used in other consumer electronic equipment, i.e., a housing including various mechanisms (such as pushbuttons, switches, rotary knobs, and slider bars) which a recorder can activate to cause electronic devices within the housing to provide instructions to the system controller to cause performance of the functions provided by the control interface device.

The control interface device is connected to the system controller, the input received by the control interface device being translated into electrical signals that are transmitted to the system controller which then transmits electrical signals to appropriate component(s) of the recording unit to effect operation of those components in accordance with the input received by the control interface device. The implementation of methods and apparatus to accomplish such interconnection and communication can be accomplished by those skilled in the art, particularly in view of the description herein.

When both are present in a recording unit according to the invention, the control interface device can be integrated with a recording display device or provided separately. Integration of the control interface device and recording display device can be advantageous because it generally enables the control and display functionality to be packaged more compactly and because the consolidation of interface functions can facilitate interaction of the recorder with recording unit. For example, control interface functionality and recording display functionality can be combined into a single hand-held device. (The device could be kept in the recorder's pocket or the device could be attached to the recorder in one of the ways described elsewhere herein, e.g., attached with Velcro™ to a belt or shoulder strap worn by the recorder.) Providing the control interface device and the recording display device in separate devices can be advantageous because it can allow more flexibility in construction and use of the recording unit. For example, it may be desirable to mount a visual recording display device near the recorder's head, as described above, while mounting the control interface device on the recorder's hand or wrist, attaching the control interface device to a waist belt or strap with a cord or strap, or sizing the control interface device so as to fit in a pocket of the recorder's clothing.

As with other components of the recording unit, it is desirable that the control interface device (or devices) be implemented so as to be unobtrusive and, in particular, minimize the need for interaction by the recorder with the control interface device. Thus, it can be desirable that a control interface device be adapted to be mounted on (e.g., attached on or worn by, as opposed to held) on the recorder. Typically, the stability of the mounting of the control interface device is not a significant concern as it relates to affecting the operation of the control interface device; however, the control interface device should be mounted securely enough to ensure not only that the control interface device does not fall off of the recorder, but also that the recorder is not concerned about the control interface device falling off of the recorder (again, with the purpose of freeing the recorder's attention from the recording unit) or is not distracted by excessive movement of the control interface device. It can also be desirable to construct the control interface device in a manner that makes the control interface device unobtrusive (i.e. unnoticeable) to others. For example, the control interface device can be constructed to look like a piece of jewelry (e.g., a brooch) or some other item that people often wear (e.g., a watch).

Generally, the control interface device can be mounted on the recorder in ways that are the same as, or similar to, those described elsewhere herein for other components of the invention. It is desirable to mount the control interface device at a location on the recorder that enables the recorder to easily interact with the control interface device, both to effect control of the control interface device and to view any display regarding the operation of the control interface device. For example, the control interface device can advantageously be mounted on the back of the recorder's hand or on the recorder's wrist. Such mounting of the control interface device would be useful, for example, for events in which the recorder is walking. Illustratively, the control interface device can be attached to a wristband that can be wrapped around a recorder's wrist, opposing ends of the wrist band having Velcro™ formed thereon to secure the opposing ends of the wrist band to each other. Or, the control interface device can be attached to a glove that is worn on the recorder's hand. Other types of mounting may be desirable for other types of events.

It may also be desirable to implement the mounting of the control interface device so that the control interface device can be mounted at different locations on the recorder, thus providing flexibility to the recorder in use of the recording unit. For example, the control interface device can include a clip that can be clipped on to a waist belt or strap of the recording unit at different locations. Mounting with Velcro™ can also be used to effect adjustable mounting in a manner as described elsewhere herein for other components of a recording unit according to the invention. Such mounting could further be implemented so that the control interface device can be pulled away from the belt or strap (if, for example, the device is attached with a cord) or flipped up from a rest position when the recorder wishes to use the control interface device.

However, it is not necessary—and may not be desirable—to mount the control interface device on the recorder. The control interface device can also satisfy the goal of being unobtrusive and minimizing required recorder attention, for example, by being made sufficiently small to fit into a pocket of the recorder's clothing, so that the control interface device can be carried in the pocket and withdrawn only when it is desired to effect control of the recording unit.

Additionally, for some applications, it may be desirable that the control interface device be adapted for mounting on another object. For example, if the recording unit is to be used while the recorder is riding a bicycle, it can be advantageous for the control interface device to be adapted to be mounted on the bicycle, e.g., on the handlebars or the down tube. Such mounting can be accomplished in any of a variety of ways, such as, for example, attachment with mating Velcro™ strips or a clamp. When the control interface device (or any other component of a recording unit according to the invention) is adapted for mounting on another object, it can be particularly desirable for the recording unit to be implemented to enable wireless communication (as discussed further below) between the control interface device (or other component) and the remainder of the recording unit.

As indicated above, the control interface device enables the recorder to control operation of the recording unit. The control interface device includes one or more mechanisms (e.g., pushbutton, switch) for enabling the recorder to start and stop operation of the recording unit. For example, the control interface device includes a power switch that controls whether power is supplied to other components of the recording unit. Depending on the particular implementation of the recording unit, it can take several seconds or more for various components of the recording unit to reach an operational state (e.g., for a hard disk to spin up and/or a data processing device to boot up) after power to the recording unit is turned on. The control interface device can also include a record switch that controls whether recording takes place (once power has been turned on).

During recording, a recorder may suddenly realize that sensitive content is about to be, or is being, recorded, and, as a result, desire to immediately stop recording. If the power switch is used to stop recording, it can take an undesirably long time to power up the recording unit for operation again. It can also take an undesirably long time for the recording unit to execute steps required to shut down the components of the recording unit. Additionally, the record switch may be implemented so that an undesirably long interaction with the recording unit is required to stop recording (e.g., the recorder may need to work through a set of control menus). In view of the foregoing, it can be desirable to provide a readily accessible and operatable mechanism (a "kill switch") that enables the recorder to immediately shut down power to the visual data acquisition device to stop acquisition of recording data (and, if applicable, to the transmitter to stop transmission of recording data), without shutting down all power to the recording unit. Since the kill switch does not shut down power to all components of the recording unit, recording can begin again more quickly than if the power switch was used to stop recording.

The control interface device (or other appropriate component of the recording unit) can also include one or more mechanisms for indicating the status of various operational parameters of the recording unit. For example, the control interface device can include a mechanism for indicating whether the recording unit is recording or not. Such a mechanism can be useful to indicate to the recorder on an ongoing basis whether the recording unit is operating, so that the recorder does not inadvertently miss recording parts of an event that the recorder desires to record or record parts of an event that the recorder does not desire to record, as may otherwise occur if the recorder forgets to turn the recording unit on or off, or if a component of the recording unit fails. Such a mechanism can also be useful to indicate to others that the recording unit is operating, so that people present in the vicinity of the recorder can take appropriate steps, if they desire, to avoid having themselves recorded. The control interface device (or other appropriate component of the recording unit) can also include similar mechanisms for indicating whether the recording unit is turned on or not (i.e., whether power is being supplied to the recording unit components), and whether the recording unit is transmitting or not, so that the recorder can readily monitor those aspects of the recording unit's operation. Each of these mechanisms can be implemented, for example, using a conventional LED appropriately electrically connected to the appropriate electronics of the recording unit, as readily understood by those skilled in the art. Existing camcorders, for example, typically include a similar mechanism which can be adapted for use with a recording unit according to the invention. Alternatively, a single mechanism can be used to convey each of the above-described operational pieces of information, e.g., an LED that emits different light patterns. Or, a text display of a control interface device, as discussed further below, can be used to present operating status to the recorder (e.g., when the recording unit is recording, the text display can display "REC" or "RECORDING"). It may also be desirable to provide multiple mechanisms indicating the status of a particular operating parameter. For example, an LED indicating whether the recording unit is recording could be provided at a location that is especially visible to the recorder and a second LED indicating the same thing could be provided at another location that is especially visible to other people in the vicinity of the recorder. Additionally, it may be desirable to transmit data representing operating status to other recording units. Further, to enhance communication of the function of the recording unit to other people in the vicinity of the recorder, a logo that conveys in some way the function of the recording unit (e.g., "BodyCam") can be formed on an exterior surface or surfaces of the recording unit. For example, this can clarify for people nearby the meaning of an illuminated LED indicating that the recording unit is recording.

As indicated above, the data storage device can be controlled so that the data storage device is only fully operational when it is anticipated that recording data is about to be obtained. The control interface device can include a mechanism that enables the recorder to effect such control of the data storage device. Similarly, if such functionality is implemented in the recording unit, the control interface device can include one or more mechanisms that enable the recorder to shut down other components of the recording unit that are not being used, so that power consumption can be reduced.

If the recording unit is adapted to enable acquisition of recordings from other recording units (or to obtain multiple recordings itself, such as multiple visual recordings), as described elsewhere herein, the control interface device can include a mechanism that enables the recorder to specify which of the recordings to display with the above-described recording display devices (i.e., the control interface device includes a display channel selector). The control interface device can also include a mechanism that enables the recorder to allow or prohibit transmission to other recording units of the recording being obtained by the recording unit. Such mechanisms can be implemented using any of a variety of well-known mechanisms (such as rotary knobs and/or pushbuttons) that are appropriately connected to the electronic devices (e.g., system controller) of the recording unit to effect such control, as known to those skilled in the art of constructing user interface devices. These mechanisms can be implemented so that particular recording units are identified in any appropriate manner, such as, for example, by color (which can correspond to the color of part or all of the recording unit), alphanumeric character, or name of recorder.

If the recording unit is adapted to enable recorder-controlled variable compression of the visual recording data, as described above, the control interface device includes a mechanism that enables the recorder to specify the amount of compression of the visual recording data. Such a mechanism can be implemented using any of a variety of well-known mechanisms (such as a slider bar, a set of pushbuttons, or a menu display), as known to those skilled in the art of constructing user interface devices.

The control interface device can also advantageously include a mechanism to enable the recorder to specify that a particular part of the recording be marked in some manner, i.e., that marking data be stored that is associated with and/or identifies particular recording data in some way. (Storage of marking data requires very little data storage capacity and so will not noticeably affect the capacity of the recording unit to store recording data.) Generally, each mark can be used to specify a time or duration of time during the recording and can have associated therewith a predetermined meaning. Any of a variety of marking capabilities can be established, as described further below and as described in the commonly-owned, copending United States Patent Application entitled "Flexible Marking of Recording Data by a Recording Unit," by Henry B. Strub et al., filed on the same date as the present application and having Attorney Docket No. IR-022, the disclosure of which is incorporated by reference herein. The marking mechanism of a control interface device can be implemented using any of a variety of well-known mechanisms (e.g., one or more pushbuttons, switches or knobs, or a display of one or more menus), as known to those skilled in the art of constructing user interface devices. The particular marking mechanism used may be determined, or militated toward, by the particular marking capabilities provided, as can be appreciated from the further description of such capabilities below.

In a simple implementation of marking capability, the control interface device enables specification of a single type of mark, the mark indicating that a recorder considers the marked part of a recording to include content of particular interest. The marked part of the recording can be identified by the mark as the time during the recording at which the mark was specified. In other words, a recorder can mark content of interest at the moment the content is being recorded. The marking mechanism for such an implementation can simply be, for example, a pushbutton.

A mark enables quick location of recording content in the temporal vicinity of the part of the recording to which the mark refers. What constitutes "temporal vicinity" can be specified in any of a variety of ways. For example, a mark can be used to move to the exact time in a recording specified by the mark. Or, the mark can be used to move to a time in the recording that is a predetermined amount of time before or after the time specified by the mark. Or, the mark can be used to cause a segment of the recording to be displayed, the segment beginning at the time specified by the mark or at a time that is a predetermined amount of time before or after the time specified by the mark, and ending at the time specified by the mark or at a time that is a predetermined amount of time before or after the time specified by the mark (e.g., the segment begins 5 seconds before the time specified by the mark and ends 5 seconds after that time). The temporal vicinity of a mark can be specified as part of the post-event processing and display a recording. The temporal vicinity of a mark can also be defined as the meaning or part of the meaning of a mark.

The invention can be implemented to enable a recorder to mark a part of a recording other than the part being obtained at the time the recorder specifies the mark. In particular, it is anticipated that it will be useful to enable a recorder to specify a mark that is associated with a part of a recording previously obtained (i.e., to mark the recording with a retrospective mark). This can be particularly useful in view of the goal of the invention that the recording unit be implemented so as not to distract the recorder from participating in the event, since a recorder may be so immersed in participating in the event that the recorder does not realize until some time after activity of interest has occurred (perhaps hours or days after) that it is desirable to mark the recording of that activity. Such marking can be implemented, for example, by enabling the recorder to specify a particular time (the specified time being constrained to be prior to the time at which the mark is specified) or a duration of time (the time prior to the time at which the retrospective mark is specified by the amount of the duration of time being the time associated with the mark). The marking mechanism can again be implemented, for example, by pushbuttons: one button can be used to indicate that a retrospective mark is being specified, while other buttons (e.g., a numeric keypad) can be used to specify the amount of time prior to the present which the mark is to designate. Other marking mechanisms can also be used, such as a display of one or more menus. It may also be desirable to enable a range of prior times to be specified (e.g., within 1 minute of the time that is 10 minutes prior to the current time), to enable a confidence level to be specified with a prior time (e.g., a 50% certainty that the content of interest occurred 20 minutes ago), or to enable both a range of prior times and a confidence level to be specified. Further, the magnitude of the range of times and/or the confidence level can be made dependent (perhaps automatically) upon the "recency" of the mark (i.e., the proximity of the marked time to the marking time at which the mark is specified). For example, as the duration of time between the marked time and the marking time increases, the confidence level typically decreases. Additionally, as the duration of time between the marked time and the marking time increases, the importance of the use of other data (e.g., physiological monitoring data, position data) in aiding the identification of the actual recording data that corresponds to a mark increases, and vice versa.

Similar to retrospective marking, the invention can be implemented to enable a recorder to specify predictive marks, i.e., to mark a part of the recording that will be obtained in the future. Like retrospective marking, predictive marking can be consonant with the goal of the invention to minimize distracting the recorder from participating in the event, since the recorder can mark anticipated activity of interest prior to the activity (at a presumably less interesting time), thus freeing the recorder for participation in the activity without having to be concerned about remembering to mark the recording of the activity. Predictive marking can be implemented in ways similar to retrospective marking, e.g., by specifying a particular time in the future (absolute time) or by specifying an amount of time from the present (relative time). Likewise, similar marking mechanisms can be used. And, as with retrospective marking, predictive marking can be implemented to enable specification of, with the predictive mark, a range of future times and/or a confidence level.

The control interface device can also be implemented so as to enable specification of multiple types of marks, each mark having a different meaning. A marking mechanism can be provided for each type of mark (e.g., multiple pushbuttons, one corresponding to each type of mark) or each type of mark can be specified by a sequence of marking mechanism activations (e.g., pressing a sequence of pushbuttons). A joystick or wheel can also be implemented to enable specification of different marks in accordance with corresponding movement of the joystick or wheel (this can be particularly useful when the marks reflect different degrees of some quantity or quality). One or more menu displays can also be used to enable specification of different types of marks. In particular, such marking can be implemented so that the recorder is offered the opportunity to make a mark increasingly specific: an initial mark brings up a menu display which allows the recorder either to accept the current marking definition or select a more specific marking definition, selection of a more specific marking definition brings up a menu display which allows the recorder either to accept the current marking definition or select an even more specific marking definition, etc. (any desired number of levels of such nesting can be used, though as a practical matter, it may be desirable to have no more than one, two or three levels of increasing mark specificity).

As indicated above, the temporal vicinity of a mark can be defined as the meaning or part of the meaning of a mark. When the control interface device allows multiple marks, different marks can have a different temporal vicinity associated therewith. For example, one or more marks can specify marking of the data currently being recorded, while other marks specify marking of data obtained a predetermined amount of time before or after the time of specification of the mark.

Multiple marks can also be used to assign differing levels of importance or interest to the marked data. For example, one mark could indicate that the marked data is extremely important or interesting, another mark that the marked data is very important or interesting, and a third mark that the marked data is moderately important or interesting. One or more marks could also be used to indicate that the marked data is uninteresting or unimportant, so that the parts of the recording corresponding to such marks could be skipped during later playback of the recording.

Multiple marks can also be used to indicate a characteristic of the content which the marked data represents. For example, one mark could be used to indicate that the content represented by the marked recording data includes conversation, while another mark could be used to indicate that the content represented by the marked recording data includes a particular type of scene, while still another mark could be used to indicate that the content represented by the marked recording data includes a particular type of action.

Multiple marks can also be used to indicate the beginning and end of activity of interest during an event. As an illustration of the use of such marks, during a recording of a birthday party, a recorder could specify a "start" mark when a birthday cake is being brought out and an "end" mark when the singing of "Happy Birthday" has been completed. Additional marks can also indicate a characteristic of the content of the marked activity of interest, as discussed above.

Multiple marks can also be used to specify information regarding the recording conditions. For example, different marks could be used to indicate the quality of the ambient lighting, ambient sound and/or filming location. Different marks could also be used to indicate whether noise is present in the audio recording or, further, the amount of noise present in the audio recording.

Multiple marks can also be used to specify a recorder's state of mind during the recording. For example, different marks could be used to indicate different emotions (e.g., happiness, sadness, excitement, boredom)—and, perhaps, the degree of those emotions—experienced by the recorder during the recording. Physiological data that can be acquired by a recording unit according to the invention, as discussed elsewhere herein, can also be used to implement marks of this type, the physiological data being analyzed to infer emotion(s) of the recorder.

It can also be desirable to enable specification of one or more privacy marks, in addition to the other types of marks described above. (Herein, "privacy mark" refers to a mark that either restricts, prohibits or eliminates the possibility of access to the marked part of the recording, or indicates that it is desired to restrict, prohibit or eliminate the possibility of access to the marked part of the recording.) For example, one type of privacy mark could indicate that the marked part of the recording is personal. Such a mark may be used by a recorder to, for example, indicate that the recorder may want to take appropriate steps after the event to inhibit the observation of that part of the recording by others. Another type of mark could indicate that the marked part of the recording is to be erased. Such a mark may be used by a recorder to, depending upon the particular implementation of the recording unit, cause the marked part of the recording to be erased during the event or indicate that the marked part of the recording is to be erased after the event.

Multiple marks can also be used to identify which of multiple recording units is known or thought to have acquired recording content of particular interest. As one illustration of the use of such marks, two recorders may be using recording units according to the invention to record content at different locations. (This marking capability may be particularly useful when the recorders are at locations from which the recorders cannot make visual contact.) The recording units are implemented to enable the recorders and/or the recording units to communicate with each other during recording so that each recorder is aware of the nature of the content being recorded by the recording unit of the other recorder. One of the recorders may decide, based upon such communication, that some or all (audio recording, visual recording or both) of the recording content being obtained by the recording unit of the other recorder is of particular interest, and specify a mark that so identifies that recording unit. (The marking capability may be further implemented to enable more specific identification of the recording content of interest, e.g., audio recording or visual recording.)

Multiple marks can also be used to identify the person making the mark. For example, as described further below, a marking token that can be physically separated from the control interface device of a recording unit according to the invention can be used to specify one or more marks. In particular, such a marking token can be adapted to enable wireless communication with the remainder of the recording unit, thereby enabling the marking token to be given to a person who possesses and controls only the marking token. Such use of a marking token can enable multiple people to specify marks for the recording obtained by a single recording unit. Similarly, if the recording unit is adapted to enable communication with other recording units, it can be possible for those other recording units to communicate marks to the recording unit. Such marks are specified by persons other than those operating the recording unit by which the marks will be stored. In either case, it can be useful for a mark to indicate the identity of the person specifying the mark.

Multiple marks can also be used to identify a person present in the content represented by the marked visual recording data. For example, it can be desirable to specify a set of marks where each mark corresponds to one of some or all of the people participating in an event. Or, depending upon the nature of the event, it may be desirable to specify a set of marks where each mark identifies a person having a particular characteristic, i.e., a person belonging to a pre-defined group (e.g., during a sports event, different marks can be used to identify members of different teams participating in the event).

It can be particularly desirable to implement marking capabilities of a recording unit according to the invention so that the meaning of the marks available to a recorder can be varied (i.e., the meaning associated with the activation of a particular marking mechanism or series of marking mechanism activations can be changed). Such variable mark meaning can enable the recorder to specify particular desired mark meanings, prior to recording an event, that are related to the event which is being recorded. For example, different marks could be defined to correspond to particular people that will participate in the event, so that activity or conversation by those persons during the event can be denoted. Or, different marks could be defined to designate particular occurrences during the event. For example, if the event is a birdwatching expedition, different marks could denote the sighting of particular types of birds.

Varying the meaning of marks can be accomplished, for example, by providing such capability as part of a recording unit docking station (an apparatus separate from the recording unit) which is adapted to enable a user to transfer desired instructions and/or data (including data representing one or more marking definitions) to the data storage device(s) of a recording unit to effect particular operation of the recording unit. The docking station can include an interface which enables a user to specify desired marking definitions. Such a docking station can also be implemented so that the docking station can be connected to a network (e.g., a computer network such as the Internet) to enable marking definitions to be transferred to the recording unit from another network location via the docking station. A recording unit according to the invention can also be implemented so that one of multiple plug-in modules, each plug-in module including a data storage device (e.g., an EEPROM) having stored thereon one or more sets of marking definitions, can be engaged with the recording unit. For example, a theme park may provide multiple such plug-in modules, each module including marking definitions for one or more attractions at the theme park.

A recording unit according to the invention can also be implemented so that the meaning of marks can be varied during recording of an event. Multiple sets of marking definitions can be stored on data storage device(s) of the recording unit, together with instructions regarding selection of a particular set of marking instructions in response either to particular user input or to content of data (recording data by the data acquisition device(s) or data obtained by other device(s), such as a physiological monitoring device, biometric device or position sensing device) obtained by the recording unit. For example, the available types of marks can vary with the position of the recording unit. The recording unit can also be implemented so that the available types of marks vary over time during recording.

The marking capability ("augmented marking") of a recording unit according to the invention can be implemented so that the specification of a mark causes operation of the recording unit in addition to the storage of the meaning and the time of specification of the mark. For example, specifying a mark that indicates that particular content is of no interest can cause the recording unit to compress the recording data acquired by the recording unit by a predefined amount that is greater than the amount of compression (if any) that occurs during normal operation of the recording unit. Similarly, if multiple marks can be specified indicating varying levels of interest, each such mark can cause the recording data to be compressed by a particular predefined amount, e.g., as the mark indicates relatively less interest, the compression ratio increases, and as the mark indicates relatively greater interest, the compression ratio decreases. It may be desirable that such marking capability be implemented so that the compression in accordance with the mark ends after a predetermined amount of time (e.g., some amount of time less than about a minute), so that the recorder, in accordance with the goal of the invention that the recording unit be a low attention device, need not continue to monitor operation of the recording unit to ensure that normal compression (again, if any) resumes when content of interest is again being recorded. Alternatively, such marking capability can be implemented so that compression in accordance with the mark continues until an instruction (such as a mark indicating content of interest) is specified by the recorder that causes such compression to stop. A recording unit according to the invention can also be implemented so that locations of a data storage device at which recording data is stored that represents content marked as being of no interest can be re-used to store newly acquired recording data.

To facilitate the implementation of marking—in particular, to enable specification of marks in a manner that requires as little attention from the recorder as possible—it may be desirable to provide additional apparatus (a "marking token") that can be physically separated from the rest of a recording unit according to the invention. For example, a ring, brooch, bracelet (e.g., a watch-like band) or similar wearable item can be constructed with one or more pushbuttons and adapted to enable communication (perhaps wirelessly) with the remainder of the recording unit. The recorder can then specify a mark by (almost reflexively) simply reaching for the marking token and depressing a pushbutton. Each marking token can be adapted to enable specification of one or more marks; however, it may be desirable, in keeping with the goal of the invention that the recording unit be a low attention device, for each marking token to be confined to specification of a single type of mark, in order to minimize the amount of attention that the recorder must devote to use of the marking token. A marking token can also be implemented to enable storage of marking data thereon (i.e., can include a non-volatile data storage device), such a marking token further including a real-time clock that enables a correspondence between the marking data and the recording data stored by the recording unit to be established. A recording unit according to the invention can include multiple marking tokens. A marking token that is adapted to enable wireless communication with the remainder of the recording unit can be given to a person who possesses and controls only that part (the marking token) of the recording unit, thereby enabling that person to specify marks during or after recording (either in addition to, or instead of, the person operating the remainder of the recording unit).

A recording unit according to the invention can also be implemented to enable a mark to be specified by a voice command ("voice marking"). Microphones that are also used to acquire audio recording data can be used for voice marking, for example.

In one implementation of voice marking, the recorder simply states during recording that particular recorded content is to be identified in a particular way. This mark can be used during later review of the recording.

In another implementation of voice marking, during recording the recorder speaks one or more of a particular set of "marking words" that are recognized by the recording unit and used to generate appropriate marking data. To enable such voice marking, a mechanism for indicating that a voice mark is to be imminently specified is employed to enable a voice mark to be understood (i.e., distinguished from audio recording data). Such mechanism can be, for example, a mechanical control (e.g., pushbutton or switch) or a recognizable speech pattern or sound (e.g., a predetermined word or sequence of words). The identification of the spoken mark can then be determined using voice recognition techniques to analyze the speech occurring after the indication of an impending mark (e.g., within a predetermined short duration of time after such indication), as known to those skilled in the art.

The recording data can be analyzed to produce a mark or to supplement or modify an existing mark. A mark can be produced based on analysis of audio recording data, visual recording data, or both.

For example, the audio recording data can be analyzed to determine if speech is present and, if so, the identity of the speaker. (Such analysis can be facilitated by identifying a set of possible speakers before beginning recording.) Recording data including speech can then be marked with the identity of the speaker or speakers. Or, the audio recording data can be analyzed to detect emphasis, cadence or other characteristics of speech present in the audio recording data. This can be accomplished by, for example, analyzing the stress and/or timing of audio data within a set of audio recording data representing the speech. The characteristics of the speech can then be used to produce, for example, marks indicating a probable level of interest of the recorded content (e.g., speech uttered rapidly or with a relatively large amount of stress tends to indicated excitement on the part of the speaker; the recording data obtained at that time may therefore be marked as probably representing content having a high level of interest). Techniques for accomplishing the above-indicated types of audio data analysis are known to those skilled in the art. For example, such techniques are described in "The use of emphasis to automatically summarize a spoken discourse," by F. R. Chen et al., 1992 IEEE International Conference on Acoustics, Speech and Signal Processing, vol. 1, pp. 229–232, San Francisco, 1992; "Construction and Evaluation of a Robust Multifeature Speech/Music Discriminator," by Eric Scheirer et al., Proceeding of the 1998 International Conference on Acoustics, Speech, and Signal Processing, Munich, 1997; "Baby Ears: A Recognition System for Affective Vocalizations," by Malcolm Slaney et al., Proceeding of the 1998 International Conference on Acoustics, Speech, and Signal Processing, Seattle, 1998; and *Advances in Speech Signal Processing*, edited by Sadaoki Furui and M. Mohan Sondhi, Chapter 22, pp. 701–738, 1992, the disclosures of which are incorporated by reference herein. Techniques for accomplishing such audio data analysis are also described in the commonly owned, co-pending U.S. patent application Ser. No. 08/760,769, entitled "Variable Rate Video Playback with Synchronized Audio," by Neal A. Bhadkamkar et al., filed on Dec. 5, 1996, the disclosure of which is incorporated by reference herein.

The visual recording data can be analyzed to identify colors, textures (i.e., gradations in visual pattern) and/or shapes which can, in turn, be used to identify objects in the visual recording content. The corresponding recording data can then be marked with a mark appropriate to the visual recording content. For example, analysis of the visual recording data may indicate the presence of particular scenery (e.g., a body of water, a tree); a corresponding mark can be used to indicate the presence of that scenery in the recording data. Or, for example, the visual recording data can be analyzed to identify the presence of a person in the visual recording content and, if a person is present, the visual recording data can further be analyzed to identify the person based on facial or other features. Techniques for accomplishing the above-indicated types of visual data analysis are known to those skilled in the art. For example, such techniques are described in "Searching for Digital Pictures," by David Forsyth et al., Scientific American, June 1997; *Face Recognition: From Theory to Applications*, edited by Harry Wechsler et al., pp. 244–261, 1998; "Face and feature finding for a face recognition system," by Andrew W. Senior, Proceedings of the Second International Conference on Audio- and Video-based Biometric Person Authentication, Washington, D.C., 1999; and "Multi-Sensor Biometric Person Recognition in an Access Control System," by Bernhard Froba et al., Proceedings of the Second International Conference on Audio- and Video-based Biometric Person Authentication, Washington, D.C., 1999, the disclosures of which are incorporated by reference herein.

As discussed elsewhere herein, a recording unit according to the invention can be implemented to enable acquisition of data other than recording data or marking data. In particular, the recording unit can be implemented so that such data can be used to supplement or modify another mark in some way, or so that such data can be used as a mark itself. For example, a recording unit according to the invention can include one or more physiological monitoring devices that obtain data regarding a physical characteristic of the recorder, one or more biometric devices, and/or one or more position sensing devices, each of which can acquire data that can be used in the above-described way. Since a non-contemporaneous mark will typically be specified with some degree of uncertainty, such data can advantageously be used, in particular, to assist in the accurate identification of recording content intended to correspond to a non-contemporaneous mark. Further, the importance of using such data for this purpose increases with the distance in time between the marked time and the marking time at which the mark is specified. Particular ways of using such data to produce a mark or to supplement or modify another mark are described in more detail in the above-referenced commonly owned, co-pending United States Patent Application entitled "Flexible Marking of Recording Data by a Recording Unit."

The marking capabilities described herein, while advantageous when implemented as part of a recording unit according to the invention or as part of post-event processing of recording data obtained by a recording unit according to the invention, can, more generally, be implemented as part of any recording apparatus or method, or apparatus or method for processing recording data.

As indicated above, a recording unit according to the invention can be implemented so that recording data that has been previously obtained and stored by the recording unit can be retrieved and used to generate a display of a previously acquired part of the recording. The control interface device can include mechanisms that enable the recorder to specify one or more instructions that cause such recording display to begin and to terminate. The control interface device can also include mechanisms that speed up or slow down the display, or that cause the display to scan or skip backward or forward in time. Identification of the desired part of the stored recording data can be accomplished in any of a variety of ways. In general, the specification of the part of the recording to be displayed can be done in ways similar to those described above with respect to non-contemporaneous marking. For example, the recorder can specify an amount of time prior to the current time, an absolute time, or a particular type of mark. The recording display can then begin in the temporal vicinity of recording data corresponding to the specification made by the recorder, the definition of temporal vicinity being a pre-established characteristic of the recording unit or capable of specification by the recorder. As other mechanisms of a control interface device of a recording unit according to the invention, such mechanism can be implemented using any of a variety of well-known mechanisms (e.g., pushbuttons) that are appropriately connected to the electronic devices (e.g., system controller) of the recording unit to effect such control, as known to those skilled in the art of constructing user interface devices.

The control interface device can also include mechanisms that enable searching of previously recorded, stored recording data. (Such searching would typically be accompanied by display of an identified section of the stored recording, as described above.) Searching can be implemented in a variety of ways. For example, a search for a particular type of mark or marks can be performed. Searching for previously recorded content of interest can also be accomplished by specifying display of a particular part of the recording (e.g., the section of the recording acquired a specified duration of time prior to the present), as discussed above. Display speed control, as also discussed above, can also be used to facilitate searching for desired content.

Above, examples have been given of various types of control functions that can be implemented in a control interface device of a recording unit according to the invention. It is to be understood that there are many other possibilities; in general, the control interface device can be implemented so as to allow any type of control that is possible with the devices that comprise the recording unit.

A control interface device in a recording unit according to the invention can also include a control interface display for enabling the recorder to input control instructions to the recording unit and/or to present information to the recorder regarding operation of the recording unit. In general, the control interface display can include a visual display and/or an audio display.

The LED(s) used to indicate whether a recording unit is recording or not, whether recording data is being transmitted or not, and whether the recording unit is powered or not, described above, are examples of the provision of a visual display as part of a control interface display. One or more LEDs can also be included in a recording unit according to the invention to indicate other binary information (e.g., system operation normal or malfunctioning).

A text display can also be included as part of a control interface display. The text display can be used, for example, to convey instructions to the recorder regarding some aspect of the operation of the recording unit or to provide feedback to the recorder regarding the operational status or performance of a component of the recording unit. In keeping with the goal of making the recording unit small and unobtrusive, it may be desirable to make the text display relatively small. As a result, the display may allow only a small amount of text to be displayed at one time (e.g., one, two or several lines, and a relatively small number of characters per line). To facilitate the presentation of information on a small text display, it may be desirable to implement the display so that characters scroll across the display. The use of a larger text display enables more text to be presented at one time (perhaps avoiding the need for scrolling text, which can be difficult to read) and/or a more legible display of the text. However, as indicated above, the larger display may be more be obtrusive and heavier. Whether a large or small display is used can depend on consideration of these tradeoffs in view of the intended application(s) of the recording unit.

A control interface display can also include a display that makes use of graphical user interface (GUI) techniques, as known by those skilled in that art. For example, appropriate GUI display mechanisms (e.g., graphical pushbuttons, slider bars, data entry boxes, checkboxes, bullet circles, etc.) can be provided that allow the recorder to specify instructions regarding any of the above-described control functions. Other appropriate GUI display mechanisms (e.g., checkboxes, bullet circles, flashing or color-coded parts of the display) can be used to provide information regarding operation of the recording unit. However, the capability of providing such GUI display mechanisms may be limited by the desire to keep the display relatively small.

Like the visual recording display device, it can be advantageous to use an LCD display to implement a control interface visual display because of the ready availability and relatively low cost of LCD displays.

The control interface visual display can be integrated in a single device with a visual recording display or can be implemented in a separate device. One way to integrate the control interface visual display and the visual recording display is to provide those displays separately (e.g., in separate display windows or on separate display screens) in a single display device. Another way to integrate the control interface visual display and visual recording display is to cause the control interface visual display to be overlaid on the visual recording display (e.g., the control interface visual display could be displayed near the bottom or other edge of the visual recording display). It may also be desirable, for example, to overlay only a part of the control interface visual display on the visual recording display, the remainder of the control interface visual display being provided by a separate display device. In particular, overlaying a control interface text display on a visual recording display can be done in a manner that does not overly detract from the visual recording display. Overlaying a control interface text display on a visual recording display requires the provision of additional driver electronics, as known to those skilled in the art. Overlaying a control interface text display on a visual recording display can be a particularly advantageous way of integrating a control interface display and a visual recording display into a single display.

An audio display of a control interface device can be used to convey information to a recorder as described above with respect to the control interface visual display. The use of a control interface audio display can be advantageous because it allows information regarding the operation of the recording unit to be conveyed to the recorder in a manner that requires no visual attention from the recorder.

The control interface audio display is typically a speaker that is included integrally with other parts of the control interface device. The control interface audio display can also be formed integrally with the audio recording display device. In particular, the two audio displays can be implemented by the same device. For example, a headset or a pair of speakers mounted near the recorder's head (one on each shoulder) can be used as both the control interface audio display and audio recording display device. Audio input to the headset or speakers could be controlled, for example, so that the audio recording is emitted from one speaker of the headset or one of the shoulder speakers, and control interface audio output is emitted from the other speaker of the headset or the other shoulder speaker. Or, the control interface audio output could simply be overlaid on to the audio recording, both being emitted from both speakers of the headset or both shoulder speakers, the control interface audio output being given a distinctive sound or sounds so that it can be unambiguously identified by the recorder. Or, the audio display device can be implemented to display only one of the audio recording display or control interface audio display at a time, the control interface device including a control that enables the recorder to switch between the two audio displays.

The control interface audio display can be controlled to emit one or more tones to communicate information regarding the operation of the recording unit. For example, a control interface audio display could be implemented so that a single tone of specified duration indicates the recording unit has been turned off. Two tones could indicate that the recording unit has been turned on. Different types, sequences and/or pitches of tones can be used to convey any of a variety of information regarding operation of the recording unit, in particular information regarding the control functions described above.

A more sophisticated control interface audio display could make use of a digitized voice to report information regarding the operation of the recording unit. Such capability can readily be implemented by one of skill in the art.

Above, the use of a control interface audio display to report information to the recorder is described. An audio data acquisition device could also be included as part of a control interface device of a recording unit according to the invention, so that the recorder can input control instructions to the control interface device via spoken commands. The audio data acquisition device itself can be a conventional microphone. However, when an audio data acquisition device is included as part of the control interface, the recording unit will also have to include appropriate hardware and/or software for identifying the spoken commands and filtering out background noise. Such filtering can be accomplished using methods and/or apparatus known to those skilled in the art.

Figure 5:
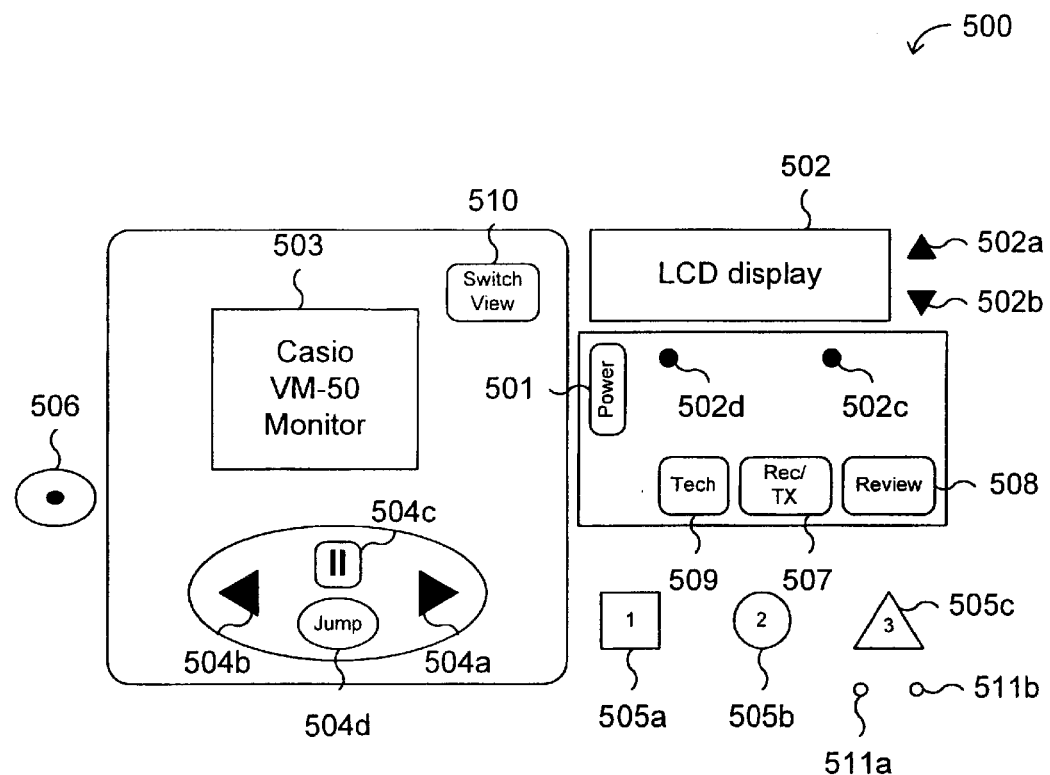
FIG. 5 illustrates a control interface device according to an embodiment of the invention.

FIG. 5 illustrates a control interface device 500 according to an embodiment of the invention.

A power button 501 is used to turn power to the recording unit components off and on. Preferably, a power button of a control interface device of a recording unit according to the invention is located and/or constructed so as to reduce the possibility of being activated accidentally. For example, the power button 501 can be implemented so that a relatively large force must be exerted to activate the power button 501.

A control interface visual display 502 enables display of information to the recorder, in particular, information regarding control and operation of the recording unit. For example, the control interface visual display 502 can display control options in response to activation of buttons of the control interface device 500. The control interface visual display 502 can be, for example, a two-line, 12 character LCD display. The buttons 502a and 502b enable the recorder to scroll through the control interface visual display 502. The buttons 502c and 502d enable the recorder to select one of two displayed control options: the buttons 502c and 502d are positioned to underlie corresponding control options displayed on the control interface visual display 502.

A visual recording display 503 enables display of a recording to the recorder. In response to appropriate instruction from the recorder, as described further below, the visual recording display 503 can display the content currently being recorded or a part of a recording that has previously been recorded. The visual recording display 503 can be, for example, a Casio VM-50 LCD TFT display.

The LEDs 511a and 511b indicate operational status of the recording unit. For example, one of the LEDs 511a and 511b (the "system status indicator") can be used to indicate system status information, such as whether the recording unit is powered or not and whether the recording unit is operating normally or malfunctioning in some manner. Illustratively, the system status indicator can be continuously illuminated to indicate that the recording unit is powered and operating normally, and the system status indicator can flash to indicate a system malfunction or to indicate the recording unit is powering up or powering down. The other of the LEDs 511a and 511b (the "recording/transmission status indicator") can be used, for example, to indicate recording and transmission status. Illustratively, the recording/transmission status indicator can be continuously illuminated to indicate that the recording unit is recording and not transmitting recording data, the recording/transmission status indicator can flash slowly to indicate that the recording unit is recording and transmitting recording data, and the recording/transmission status indicator unit can flash rapidly to indicate that the recording unit is not recording but is transmitting recording data.

The button 507 enables the recorder to start and stop recording, as well as to start and stop transmission of the recording to other recording units. The button 507 is preferably implemented so that a relatively large force must be exerted to activate the button 507. Activation of the button 507 causes the control interface visual display 502 to display control options to the recorder that enable the recorder to start or stop recording, and to start or stop transmission of recording data.

The buttons 504a, 504b, 504c and 504d enable control of the display of a recording by the visual recording display 503. The button 504a causes display of a recording that moves forward in time, while the button 504b causes display of a recording that moves backward in time. The button 504c causes display of a recording to stop. The button 504d causes the display of a recording to skip in a predetermined manner in the temporal direction in which the recording was being displayed. Each of the buttons 504a, 504b, 504c and 504d can also be implemented so that depressing the button 504a, 504b, 504c or 504d in different manners causes different operation of the visual recording display 503. For example, the button 504d can be operated in different modes: one mode can cause the display of the recording to skip to the next mark, while other mode(s) can cause the display of the recording to skip by a specified amount of time. The buttons 504a, 504b and 504c can desirably be shaped as shown in FIG. 5, in accordance with conventional graphical representations of the functionality embodied by those buttons, as used in other user interfaces for recording and display devices.

The button 508 enables the recorder to review a part of a recording that has previously been recorded. The button 508 is preferably implemented so that a relatively large force must be exerted to activate the button 508. Activation of the button 508 causes the control interface visual display 502 to display control options to the recorder that enable the recorder to specify the point at which to begin the display of previously recorded content. After activation of the button 508, the buttons 504a, 504b, 504c or 504d can be used as described above to navigate through the recording.

The button 510 enables the recorder to change the recording being displayed by the visual recording display 503. Activation of the button 510 can cause display of an identification of the recording currently being displayed, as well as control options that enable the recorder to select a particular recording for display.

The button 509 enables the recorder to check the operational status of components of the recording unit (e.g., remaining battery power, data storage capacity used and/or available) and to effect changes in operating parameters (e.g., compression ratio). The button 509 is preferably implemented so that a relatively large force must be exerted to activate the button 509. Activation of the button 509 causes the control interface visual display 502 to display control options to the recorder that enable the recorder to accomplish such functions.

Marking buttons 505a, 505b and 505c enable specification of different types of marks. For example, each button 505a, 505b and 505c can be dedicated to a particular type of mark. Alternatively, one or more of the marking buttons 505a, 505b and 505c can enable specification of multiple types of marks, each such button 505a, 505b and/or 505c causing display of control options by the control interface visual display 502 which allow selection of particular types of marks. (In general, such mark selection control options can be nested to any desired degree and can be implemented so that the recorder can select a mark from any level of the hierarchy.) Each of the buttons 505a, 505b and 505c has a unique shape, so that the recorder can operate a desired one of the buttons 505a, 505b and 505c with little or no visual observation of the buttons 505a, 505b and 505c, in accordance with the goal of the invention that a recording unit be a low attention device.

The button 506 provides the functionality of a kill switch, as discussed above. Preferably, a kill switch of a control interface device of a recording unit according to the, invention is located and/or constructed so as to reduce the possibility of being activated accidentally. For example, the button 506 is located near one edge of the control interface device 500, i.e., out of the "mainstream" of recorder interaction with the control interface device 500. Additionally, the button 506 can be implemented so that a relatively large force must be exerted to activate the button 506. However, the button 506 is preferably made relatively large to facilitate quick and reliable activation of the button 506 by the recorder.

The color, shape, location (including grouping) and/or texture of buttons of the control interface device 500 can be specified to facilitate interaction by the recorder with the control interface device 500, thus facilitating low attention recording. For example, related buttons (e.g., the marking buttons 505a, 505b and 505c) can be made the same color, shape and/or texture, which can be a different color, shape and/or texture than any of the other buttons of the control interface device 500. The color, shape and/or texture of a button can also be specified so as to convey a sense of the function of the button, e.g., the button 506 can be made red (suggesting stopping).

8. Position Sensing Device

A position sensing device can be included in a recording unit according to the invention to enable the position of the recording unit to be ascertained at any point in time. (As used herein, a "position sensing device" can include one or more devices that enable the position, as defined below, of a recording unit to be determined.) Data representing the position can be stored in a manner that relates the position data to corresponding recording data obtained at the same time.

The "position" of a recording unit includes the location of the recording unit and/or the orientation of the recording unit. The location can be specified in global coordinates (i.e., relative to earth), local coordinates (i.e., relative to a fixed region or object on earth), or relative coordinates (e.g., relative to other recording units). The orientation is typically defined with respect to the filming orientation of the visual data acquisition device (which can be specified with respect to one or more of three perpendicular rotational axes, i.e., pan, tilt and rotational axes, as known to those skilled in the art). The orientation can also be defined with respect to another part of the recording unit or a part of the recorder's body.

Whether location is specified in global, local or relative coordinates can depend on the implementation of the position sensing device, the intended environments within which the recording unit is to be used and/or the intended use of the position information. For example, when the position sensing device is a GPS receiver, as described further below, location is specified in global coordinates. If the recording unit is to be used in an environment in which GPS signals cannot be received by the recording unit, as discussed below, then a position sensing device that relates the recording unit location to nearby objects or to other recording units may be used, the former specifying location in local coordinates and the latter in relative coordinates. If the position information is to be used to spatially integrate recordings after the event, then it can be advantageous to use a position sensing device that specifies location relative to other recording unit(s).

The position information can be further used to determine related derivative information, such as, for example, a path of movement of the recording unit or the velocity at which the recording unit is moving. (If a GPS system is used velocity information is provided directly by the GPS system.) The position information and related derivative information can be used, for example, to augment the display of the recording (either in real time as part of the display of the recording by a recording unit, or as part of post-event display of the recording) or to facilitate integration of the recording obtained by the recording unit with the recording(s) obtained by other recording unit(s) (to, for example, enable an integrated post-event display of multiple recordings of an event).

A global positioning system (GPS) receiver can be used, for example, to embody a position sensing device of a recording unit according to the invention that enables determination of the location of the recording unit. Either standard or differential GPS can be used. (Differential GPS necessitates the use of a second receiver.) The latter is more accurate, but is also more expensive and may not be available in many areas. Currently, standard GPS provides a location with an error of less than or equal to about 30–50 feet. However, in the near future, the maximum error of a GPS location determination will decrease to about 5–10 feet, when certain planned modifications are made to the implementation of standard GPS. Further, there are existing private satellite services that can be used to improve the accuracy of GPS location determinations (this undesirably adds to the cost of the recording unit, however, due to the need for another, or a more complex, receiver, and to the need to pay a subscription fee to access the private satellite service's signal). In any event, any error in location is typically the same for all recording units being used at an event, so that the relative locations of the recording units can be known with a high degree of accuracy.

If the event is one that takes place in a building or other environment (such as a high mountain or a city with tall buildings) in which the recorder may be shielded from GPS satellites, the GPS receiver(s) will be ineffective to establish the location of the recording unit. In such a situation, it is necessary to make use of an alternative position sensing system if such information is necessary or desirable.

A GPS receiver can also be used to receive a signal representing the current time that can be used as a clock to generate time-stamps for the recording data. Depending upon the speed of the processing device(s) of the recording unit, the GPS time signal can be updated about once a second. The GPS time signals are extremely accurate; thus, since all of the recording units are receiving this time signal, the time-stamps of all recording units are adequately synchronized.

Though the recording unit must not be constantly blocked from GPS satellites in order for the recording unit to receive such time signals, the recording unit need only be exposed to a GPS satellite for about a minute to enable the time signals to begin. Further, after that point, clock drift occurs slowly, even if the recording unit is blocked from the GPS satellites for a period of time. Additionally, a recording unit according to the invention typically also includes an internal clock, as described above, that, while not as accurate as the GPS time signals, can also be used to accurately time-stamp data.

Other location tracking systems can also be used in a recording unit according to the invention. For example, local positioning systems can be used in which transmitters or receivers are placed beforehand at various locations in the area within which the event will occur, and a corresponding receiver or transmitter, respectively, is included as part of recording units according to the invention. (Such systems are similar in operation to the GPS-fix system described above.) However, such local positioning systems may be disadvantageous in that the recording unit is constrained to use within the area of operability of the system. Further, setting up, configuring and disassembling such a system for each event location may be undesirably burdensome.

Transmitters and receivers that are part of multiple recording units can be used to implement a relative positioning system. The use of such a positioning system can be advantageous because such transmitters and receivers may already be included as part of the recording units for other purposes (e.g., to transmit recording data signals between recording units and/or to enable communication between recorders). The relative positions of the recording units can be determined from broadcasted signals using methods known to those skilled in the art.

An electronic compass can be used, for example, to embody a-position sensing device of a recording unit according to the invention that enables determination of the orientation of the recording unit. Electronic compasses are typically accurate within about 1 or 2 degrees. Electronic compasses that compensate for interference due to the presence of ferro-magnetic material (in particular, ferro-magnetic material that may be present in the recording unit) can be used with a recording unit according to the invention. Typically, as indicated above, the orientation of the recording unit is defined with respect to the filming orientation of the visual data acquisition device. Thus, it is desirable to attach the compass (or other orientation sensing device) to the visual data acquisition device so that the sensed orientation can be easily related to the filming orientation. However, the compass can be mounted on the recorder in other ways so long as the relationship between the orientation of the compass and the visual data acquisition device is known.

Other devices or systems can be used to determine the orientation of the recording unit. For example, an inertial reference system using one or more gyroscopes can be used. A tilt sensor can also be used. In particular, a tilt sensor that can compensate for acceleration can be advantageously used.

It may be desirable to use multiple location tracking systems and/or multiple orientation tracking systems in a recording unit according to the invention to increase the accuracy of the position determination. However, this can add to the cost of the recording unit. The number and type of position tracking systems used in a recording unit according to the invention can be chosen in view of such considerations.

9. Communication Among Components of a Recording Unit

In general, communication among the components of a recording unit according to the invention can be implemented using conventional apparatus and techniques (e.g., using conventional bus techniques and apparatus), and is controlled or mediated by the system controller.

It may be necessary or desirable to implement the recording unit so that components of the recording unit are physically separate. For example, a recording unit may include a video camera mounted on the shoulder of the recorder, a visual recording display device mounted on the recorder's wrist, and other components (e.g., the system controller, data storage device and data processing device) positioned within an encasement strapped to the recorder's back. In general, communication between physically separate components of a recording unit can be implemented using either wired or wireless communication techniques and apparatus. The implementation of wired and wireless communication techniques and apparatus is known to those skilled in the art.

It may be particularly desirable to implement the recording unit so that components of the recording unit that are physically separate (or, at least, components that are most physically separate, or physically separate more than a specified distance) communicate with each other via wireless communications, since then there will be no wires that may obstruct or distract the recorder. Additionally, if the visual data acquisition device and/or the audio data acquisition device are not connected to other components of the recording unit with wires, there is much greater flexibility in deciding where to position the data acquisition devices and/or the other components of the recording unit. For example, if the recorder is riding on a bicycle while recording, a visual data acquisition device that communicates with the rest of the recording unit via wireless communication may be able to be located on the bicycle while the part of the recording unit with which the video camera communicates is located with other parts of the recording unit in a backpack worn on the recorder's back. Alternatively, the opposite may be desirable: the visual data acquisition device can be mounted on the recorder, while the rest of the recording unit is mounted on the bicycle (this may be desirable to reduce the weight carried by the recorder, thus increasing the recorder's comfort, consistent with the goal of the invention to make recording as "painless" as possible). If the visual data acquisition device is connected to the rest of the recording unit with a wire, these configurations may not be possible, or it may be necessary to position the part of the recording unit connected by wire to the visual data acquisition device on the bicycle or the recorder near the visual data acquisition device. As can be appreciated, there may be many other circumstances in which it is desirable to be able to move the visual or audio data acquisition device to a position that is relatively distant from the part of the recording unit with which the visual or audio data acquisition device communicates; wired communication may prevent such movement or, at best, result in the presence of wires which interfere with or distract the recorder. For example, a recording unit can be used by a recorder who is water skiing: for use in recording such activity, the visual data acquisition device (and, perhaps, audio data acquisition device) can be worn by the recorder, while the rest of the recording unit is positioned on, for example, the boat. Or, for example, the recorder may desire to have another person take the visual data acquisition device and obtain, for a period of time, a visual recording. This may be desirable, for example, to enable the acquisition of visual recording data including the recorder. This may also be desirable to enable a small child to obtain recording data without committing an entire recording unit to the child (an entire recording unit may be undesirably heavy for a child or may be too expensive to entrust to a child). Similar flexibility in positioning can also be desirable for other components of a recording unit, such as the control interface device and recording display devices.

If wired communication is used, it is desirable to ensure that the wires do not interfere with the recorder. The accomplishment of this goal can be facilitated by, for example, minimizing the distance between separate components and/or otherwise controlling the position of separate components of the recording unit. For example, extending a communications wire between a video camera positioned on a recorder's shoulder and other system components positioned within an encasement strapped to the recorder's back can be done with little or no obstruction or distraction of the recorder. Additionally, this goal can be attained by using coiled cable (similar to that used for telephone handsets) for the connection between components, the cable extending a relatively short distance and tending to remain untangled when the cable is not fully extended.

It can be desirable to implement a recording unit according to the invention so that additional devices can be easily added to the recording unit. For example, a recording unit according to the invention can be provided with, using methods and apparatus known to those skilled in the art, capability for connecting a device to the recording unit via one or more serial ports or a bus protocol, such as the universal serial bus (USB), IEEE 1394 (e.g., Firewire or iLink) and/or IIC (i.e., I$^2$C) protocols. As with other components of a recording unit according to the invention, interaction of such device(s) with the rest of the recording unit is controlled or mediated by the system controller, though it may be necessary or desirable to provide a special purpose processor to facilitate and/or enable such interaction. The use of the USB or I$^2$C protocols may be desirable because those protocols are currently relatively less expensive to implement than Firewire. The use of the I$^2$C protocol may be desirable because that protocol requires a relatively smaller processing capability than that needed for USB or Firewire.

10. Packaging of Recording Unit Components

In general, it is desirable to "package" the recording unit components in any manner that achieves some or all of the desired characteristics of a recording unit according to the invention, e.g., small size, low weight, unobtrusiveness, and capability of being mounted on a recorder (or, at least, capability of being easily carried by the recorder).

For example, to achieve the goal of making the recording, unit small, it can be desirable to include many of the components of the recording unit (e.g., components other than data acquisition device(s), display device(s) and control interface device(s)) together as part of a single apparatus (e.g., enclose the components within an encasement), so that the recording unit can be made as compact as possible. (It may not be desirable to include the data acquisition device (s), display device(s) and/or control interface device(s) in a single apparatus together with the other components of the recording unit, since it is often desirable to adapt one or more of those devices so that they can be mounted at different locations on the recorder.) Additionally, enclosing those components within a flexible encasement can be advantageous, since the flexibility may make the recording unit more comfortable to wear and may enable the recording unit to be made even more compact. Including components together as part of a single apparatus may also facilitate making the recording unit as lightweight as possible.

On the other hand, it may be desirable to separate the recording unit components into several parts. This can be desirable to enable the parts of the recording unit (and, thus, the weight of the recording unit) to be more evenly distributed over the recorder's body. This can also be desirable to reduce the bulkiness of any one part of the recording unit. For example, the power supply, which is often a relatively bulky and heavy component of a recording unit according to the invention, can advantageously be separated from other components of the recording unit. However, if wired communication between recording unit components is used, the more that recording unit components are separated from each other, the greater number of interconnecting wires that must be used. Wires can interfere with the recorder's movement. Further, the wires are susceptible to damage from movement by the recorder and/or contact with other objects.

Further, it is desirable that the recording unit components be packaged so that the recording unit has a discreet appearance, rather than an ostentatious or "technological" one (e.g., a "cyborg" look). This is in keeping with the goal of making the recording unit unobtrusive (particularly to persons other than the recorder) so that the recording unit can best be used for its intended purpose, i.e., as a device that enables low attention recording. For example, it can be desirable to integrate components of a recording unit according to the invention into clothing to be worn by a recorder. In particular, small components of a recording unit according to the invention (e.g., microphones, GPS receiver, video camera) can be sewn into clothing. Illustratively, a special police officer's uniform or a rental tuxedo may have sewn therein components of a recording unit according to the invention.

It can also be desirable that the recording unit components be packaged so that parts of the recording unit that come into contact with the recorder or that are susceptible to becoming dirty can be cleaned. For example, those parts of the recording unit can be adapted to be separated from the rest of the recording unit to enable such cleaning. Those parts of the recording unit can also be constructed of materials that are capable of being cleaned without damaging the functionality of the recording unit and that are, preferably, relatively easy to clean. For example, those parts of the recording unit can be constructed so that they do not include electronics or cables that would be damaged by contact with water or a cleaning fluid.

FIG. 6 illustrates a recording unit according to the invention. Most of the components of the recording unit are enclosed within a backpack 601 that is worn by a recorder 602. A visual data acquisition device 603 is mounted on a strap of the backpack 601 at about the recorder's chest level. A control interface device 604 can be carried by the recorder 602 and is sized so that, when not in use, the recorder 602 can carry the control interface device 604 in a pocket of the recorder's clothing. The visual data acquisition device 603 and control interface device 604 are connected by wires 605a and 605b to the components in the backpack 601, the wires 605a and 605b passing through a hole formed in the backpack 601. The backpack straps can be adjusted to enable the recording unit to be comfortably and securely worn by people have a variety of body sizes and shapes.

Illustratively, a recording unit as shown in FIG. 6 can be implemented using off-the-shelf components and packaging materials so that the recording unit weighs about 24 pounds. It is anticipated that a recording unit implemented using components that are particularly designed for use in the recording unit can be implemented so that the recording unit is lighter (and smaller): such a recording unit may weigh about as much as a conventional camcorder and be of comparable size.

11. Specialized Recording Unit Implementations a. Recording Unit for Use by Vigorously Active Recorder It is anticipated that a recording unit according to the invention will sometimes be used for recording an event during which the recorder engages in vigorous physical activity. For example, a recorder may desire to obtain a recording while engaging in an athletic activity, such as hiking, snow skiing or ping pong. Such events particularly demand that the recording unit allow the recorder freedom of movement and not distract or encumber the recorder's participation in the activity. It can be desirable to tailor a recording unit according to the invention for use in recording such events, with an increased emphasis on the wearability characteristics of the recording unit (in particular, vis-a-vis vigorous recorder movement) as compared to other aspects of the recording unit.

Figure 7:
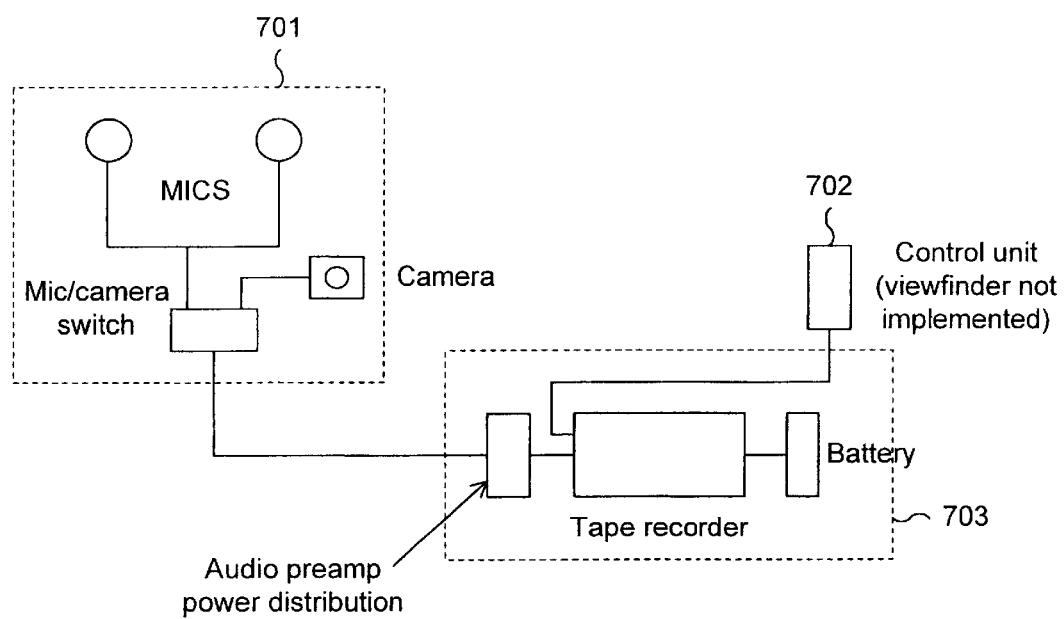
FIG. 7 is a block diagram of the functional components of a recording unit according to a particular embodiment of the invention that is particularly well suited for use in recording an event in which the recorder engages in vigorous physical activity.

FIG. 7 is a block diagram of the functional components of a recording unit 700 according to a particular embodiment of the invention that is, as will be better appreciated from the description below, particularly well suited for use in recording an event during which the recorder engages in vigorous physical activity. In general, except as modified by the description below, aspects of the recording unit 700 can be implemented as described above.

As illustrated in FIG. 7, the recording unit 700 includes three physically separate components: a data acquisition unit 701, a control interface unit 702, and a data storage and system control unit 703. (A recording unit according to the invention such as the recording unit 700, i.e., for use by a recorder engaging in vigorous physical activity, can be separated into a different number—greater or fewer—of components. Some examples of such modification of a recording unit are discussed below; it will be understood that other such modifications can be made in accordance with the desired characteristics of this type of recording unit according to the invention, as described elsewhere herein.) Separating a recording unit into physically separate components enables the weight of the recording unit to be distributed over the recorder's body to enable the recorder to more easily and comfortably support the recording unit, and to reduce the effect of the recording unit on the recorder's balance. Further, each component can be made relatively smaller than a single device that embodies all of the functionality of the recording unit 700, thus reducing the propensity of components to pull away from the recorder's body and reducing the likelihood of injury if the recorder falls on a component. Additionally, each component can be mounted on a recorder at a location that is particularly desirable for that component. For example, components with which the recorder interacts during recording can be mounted at relatively accessible locations, while components with which the recorder interacts little or not at all can be mounted on locations that are less accessible. Each of these characteristics is particularly desirable in a recording unit that is to be used for recording an event during which the recorder engages in vigorous physical activity.

The data acquisition unit 701 includes a visual data acquisition device for obtaining visual recording data and an audio data acquisition device for obtaining audio recording data. In view of the anticipated use of the recording unit 700, it is particularly desirable that the visual data acquisition device and audio data acquisition device be small and lightweight.

For example, a "board" camera can be used as a visual data acquisition device of a recording unit according to the invention such as the recording unit 700. Board cameras include, for example, cameras constructed using charge-coupled device (CCD) technology (the Chugai CEC-100, discussed above, is an example of such a camera) and cameras constructed using CMOS technology (referred to herein as a "CMOS camera"). Contemporaneous advances in technology are producing board cameras that include a single chip mounted on a small (e.g., less than one inch square) circuit board; such cameras can advantageously be used in a recording unit according to the invention such as the recording unit 700.

Figure 8A:
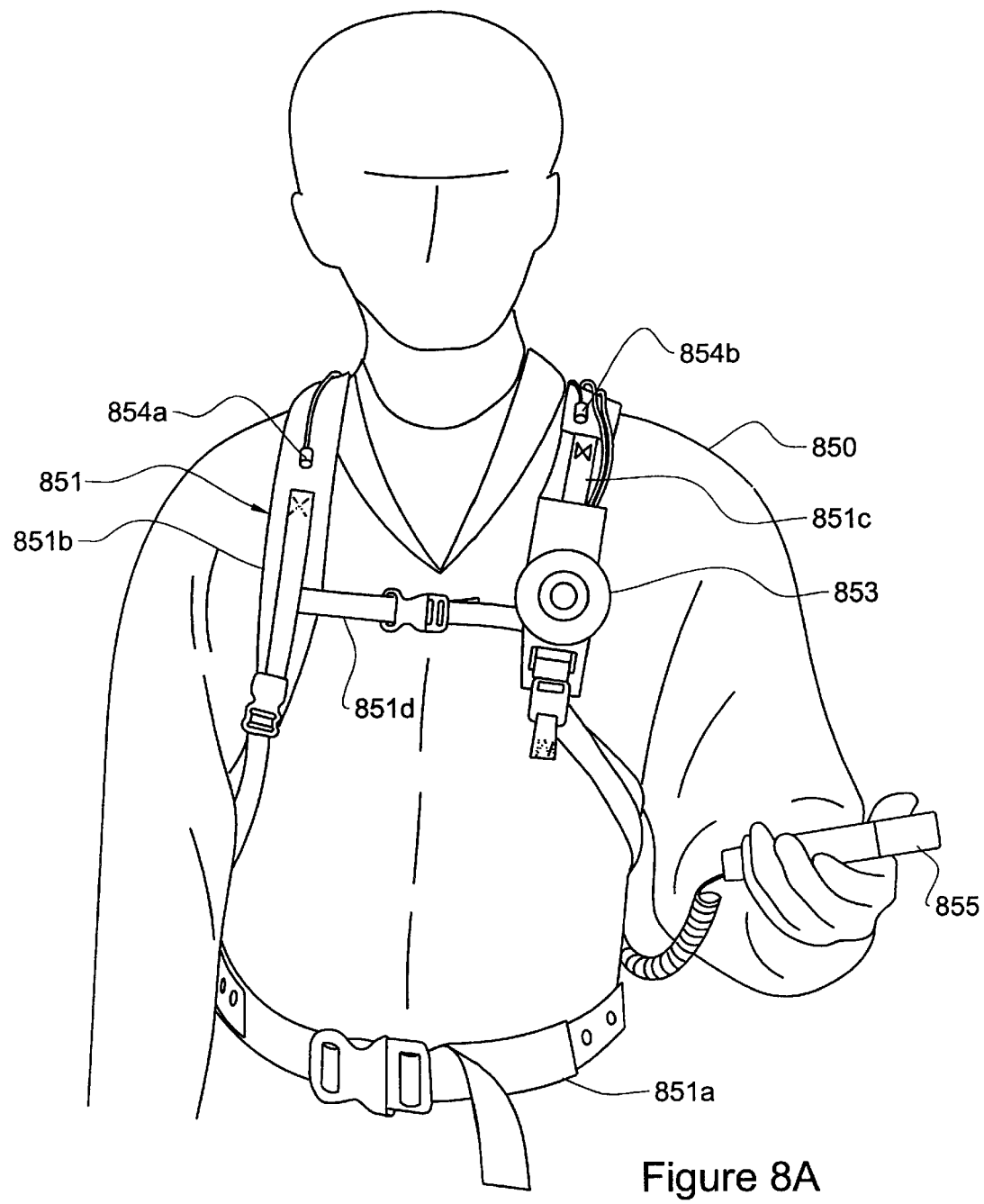
FIGS. 8A–8C are perspective views of a recording unit representing a particular physical instantiation of the recording unit of FIG. 7, the recording unit illustrated in FIGS. 8A–8C as worn by a recorder.
Figure 8B:
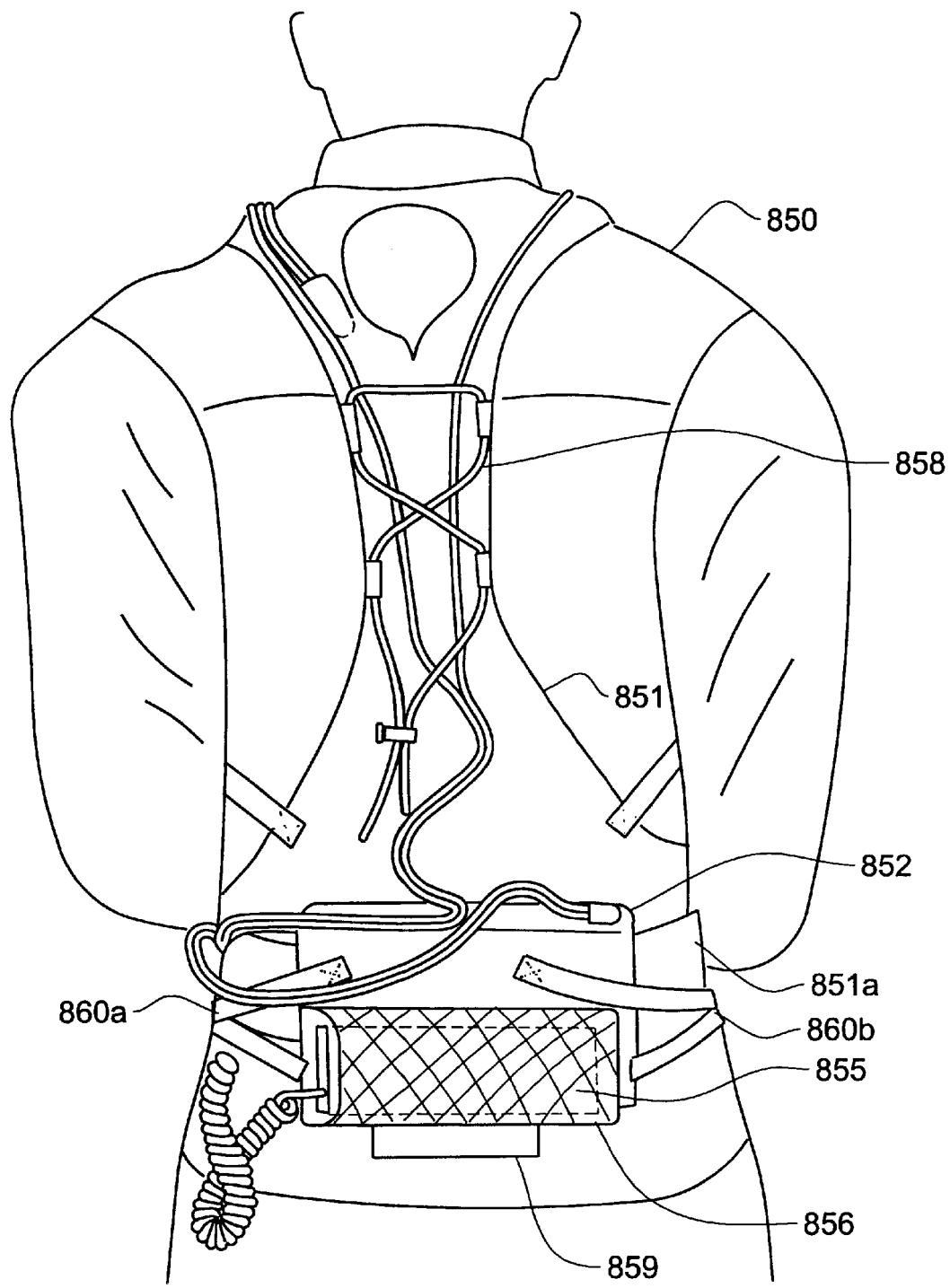
Figure 8C:
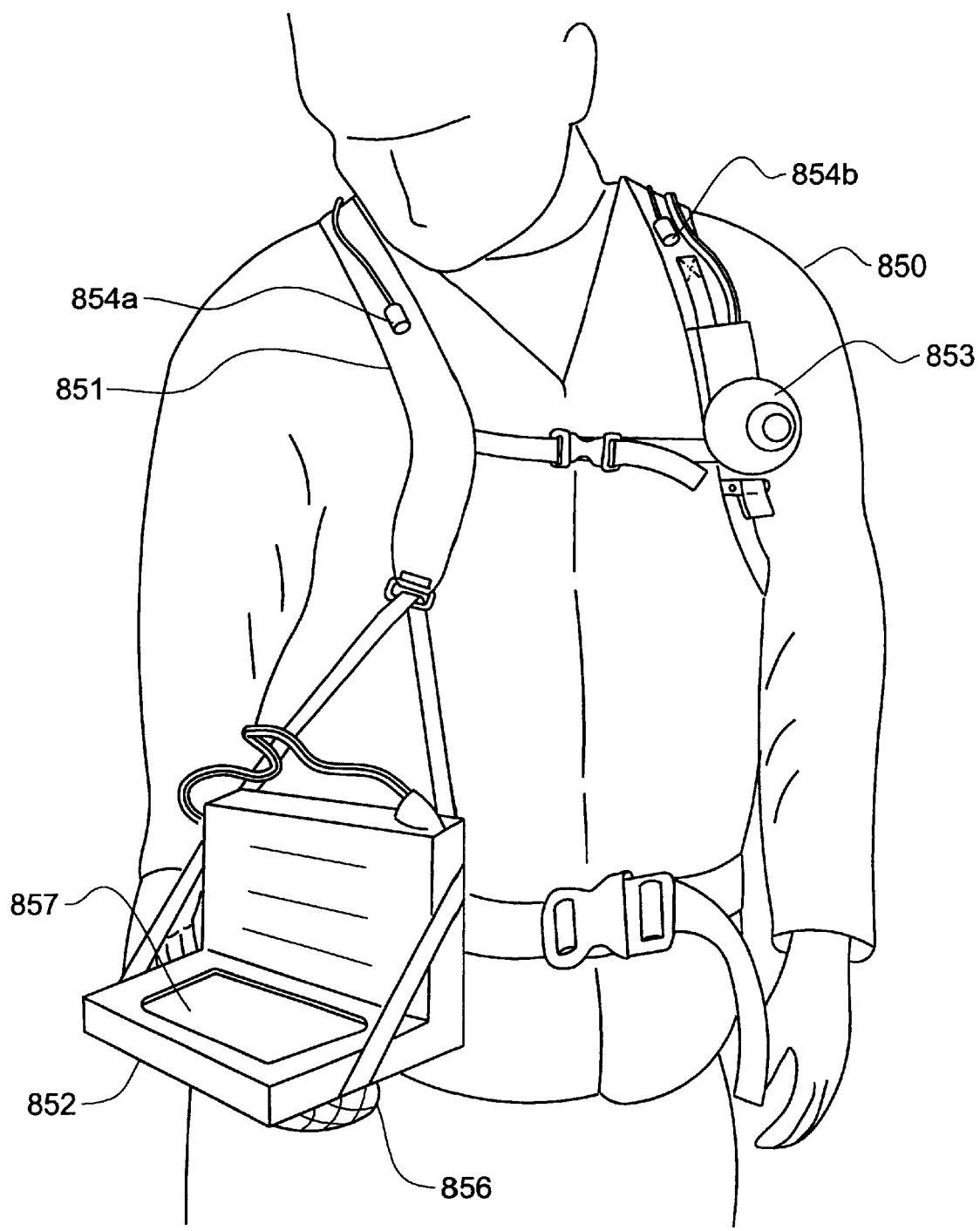

The audio data acquisition device can be embodied, for example, by two omni-directional stereo lavalier microphones (e.g., Lectret 5200 microphones, discussed above). It is desirable to mount the two microphones symmetrically on the front of the recorder's body. For example, when the recording unit 700 is embodied as shown in FIGS. 8A–8C (discussed below), one of the microphones can be mounted on each shoulder strap of a harness used to mount the recording unit 700 on a recorder. The microphones are preferably mounted on the front of the recorder's body so that the recorder's body helps to shield the microphones from sounds emanating from behind the recorder (which are expected to be unwanted or relatively unimportant).

The audio data acquisition device can also be embodied by two directional microphones. Again, it is desirable to mount the two microphones symmetrically on the recorder's body: when the recording unit 700 is embodied as shown in FIGS. 8A–8C (discussed below), one of the microphones can be mounted on each shoulder strap of a harness used to mount the recording unit 700 on a recorder. However, directional microphones need not be mounted on the front of the recorder's body; the directional microphones can be mounted on the straps adjacent to the tops of the recorder's shoulders.

The data acquisition unit 701 also includes mechanisms for mounting the audio and visual data acquisition devices on the recorder, another person or another mounting object. In general, mounting mechanisms as described elsewhere herein can be used. It can be advantageous to mount the audio and/or visual data acquisition devices so that the audio and/or visual data acquisition devices are detachably attached. It can be particularly advantageous to detachably attach the visual data acquisition device so that the visual data acquisition device can be mounted at various locations and/or so that the visual data acquisition device can be handheld.

A mounting mechanism as described in the U.S. patent application Ser. No. 09/225,993, discussed above, can advantageously be used to mount a visual data acquisition device of a recording unit according to the invention that is to be used for recording an event during which the recorder engages in vigorous physical activity. That mounting mechanism enables a visual data acquisition device to be mounted on a strap so that the visual data acquisition device can be easily moved to different locations on the strap. That mounting mechanism also enables the filming orientation of the visual data acquisition device to be easily changed about any of three perpendicular axes. Advantageously, that mounting mechanism enables multiple positioning parameters (e.g., orientation about multiple axes) to be adjusted with one hand and, in some cases, using a single control mechanism of particular importance for a recording unit (such as the recording unit 700) that is intended to be used to record events during which the recorder engages in vigorous physical activity, that mounting mechanism also attaches the visual data acquisition device to a person very stably.

The visual data acquisition device can also be mounted on or near the recorder's head. For example, the visual data acquisition device can be attached to a head harness that is worn by a recorder, as illustrated in FIG. 4, discussed above. The visual data acquisition device can also be mounted, for example, on a headband near the recorder's ear or on the side of a pair of eyeglasses worn by the recorder, as also discussed above.

The audio data acquisition devices can be mounted, for example, using a bracket which houses the audio data acquisition devices and can be attached to a strap so that the bracket can slide along the strap.

The adjustability of the mounting mechanisms for the audio and visual data acquisition devices advantageously allow the positioning of the audio and visual data acquisition devices to be changed to accommodate different body sizes and shapes.

The data storage and system control unit 703 includes a data storage device for storing recording data. The data storage and system control unit 703 also includes a system controller for controlling the operation of, and mediating interaction among, other devices of the recording unit 700. In one particular embodiment of the recording unit 700, the data storage and system control unit 703 can be embodied by a Sony Video Walkman, GV-A500 Hi 8 video cassette recorder NTSC. The GV-A500 also includes a 4 inch color LCD screen that can be used to display a recording. In another particular embodiment of the recording unit 700, the data storage and system control unit 703 can be embodied by a Sony GV-D300 mini-DV cassette recorder. The recording unit 700 also includes a power supply (e.g., battery); this can be included in the data storage and system control unit 703. When the above-indicated GV-A500 video cassette recorder is used to embody the data storage and system control unit 703, one of the following Sony InfoLITHIUM™ batteries can be used: the NP-F550, the NP-F750 or the NP-F950, providing approximately 1.2, 2.6 or 4.3 hours of recording time, respectively. The above-indicated cassette recorders are devices that store recording data on a linear data storage medium. Other devices that store recording data on a non-linear data storage medium, as discussed in more detail above, can be used.

The control interface unit 702 can be embodied generally in a manner as described above. In particular, the control interface unit 702 can be embodied by the Sony RM-95 Remote Commander remote control unit. The RM-95 can be connected to the GV-A500 video cassette recorder via the LANC port of that recorder. (The GV-A500 can also be controlled using mechanisms that are part of the GV-A500.) It can also be desirable to substitute a coiled cord (e.g., as used with a telephone handset) for the cord typically provided with the RM-95 to minimize dangling of connecting wires between the control interface unit 702 and the data storage and system control unit 703.

Integration of the components of the recording unit 700 can readily be accomplished by those of skill in the art in view of the description herein. Communication between components of the recording unit 700 can be implemented using wired or wireless techniques and apparatus, as known to those skilled in the art. The use of wireless communication between some or all of the components can be desirable to increase flexibility in choosing mounting locations for the various components. If wired communication among components is used, the wires between components can be made of a length that enables a desired range of relative movement between the connected components as can be expected to occur during use of a recording unit intended for use by a recorder engaged in vigorous physical activity.

FIGS. 8A–8C are perspective views of a recording unit 800 representing a particular physical instantiation of the recording unit 700 of FIG. 7, the recording unit 800 illustrated in FIGS. 8A–8C as worn by a recorder 850. As will be clearer from the description below, the recording unit 800 can be made compact and lightweight. Additionally, the recording unit 800 is constructed in a manner similar to a conventional backpack, providing a familiar look and feel to a recorder. The recording unit 800 can also be constructed with relatively few wires connecting components, and so that those wires which are used are constrained to minimize interference with the recorder or other objects. The recording unit 800 can also be implemented to have a relatively simple set of functional capabilities, thus reducing the amount of power required and enabling a smaller power supply to be used in the recording unit 800. The recording unit 800 can also be made water resistant, which can be particularly useful if the recording unit 800 is used during activities such as water skiing or snow skiing.

A harness 851 securely attaches the components of the recording unit 800 to the recorder 850. The harness 851 can advantageously be implemented so that the components of the recording unit 800 can be detached from the harness 851 and used separately from the harness 851 or with another harness.

The harness 851 includes a waist strap 851a, two shoulder straps 851b and 851c, and a sternum strap 851d. The harness 851 can be implemented so that one or more of the waist strap 851a, shoulder straps 851b and 851c, and the sternum strap 851d can be adjusted (i.e., loosened or tightened about the recorder 850) to accommodate different body sizes and shapes (using, for example, conventional mechanisms used for that purpose with backpack straps) and to ensure that the harness 851 remains securely in place on the recorder 850 during vigorous physical activity. Additionally, the waist strap 851a, shoulder straps 851b and 851c, and the sternum strap 851d are arranged so as to distribute the weight of the recording unit 800 over the recorder's body.

The waist strap 851a is preferably padded. It can also be desirable that the waist strap 851a be made wider at the back of the recorder 850, particularly if the housing 852 and associated apparatus (described below) are to be supported there, to facilitate distribution of the weight of the recording unit 800. In such case, the waist strap 851a can be shaped to curve around the hip of the recorder 850.

The visual data acquisition device 853 is mounted on the shoulder strap 851c. As will be more readily apparent from the description below, the visual data acquisition device 853 can also be mounted on the shoulder strap 851b. This flexibility in mounting can be desirable, for example, to accommodate left- and right-handed recorders.

The shoulder straps 851b and 851c, and sternum strap 851d help stabilize a visual data acquisition device 853 that is mounted on the shoulder strap 851c. In particular, the shoulder straps 851b and 851c, and sternum strap 851d can be tightened to so that the harness 851 (and, thus, the visual data acquisition device 853) is held tightly to the body of the recorder 850.

Audio data acquisition devices 854a and 854b are mounted on shoulder straps 851b and 851c, respectively. As can be appreciated from FIGS. 8A and 8C, such mounting enables the audio data acquisition devices 854a and 854b to be mounted symmetrically (or substantially symmetrically) on the recorder 850 (about a vertical plane parallel to the direction of view from in front or back of the recorder 850). The audio data acquisition devices 854a and 854b can also be mounted at the same (or approximately the same) height on the recorder 850, if desired.

The device or devices that embody the data storage and system control unit 703 (FIG. 7) are mounted within a housing 852. The housing 852 is made of a material and constructed so that the device(s) inside the housing 852 are protected from damage resulting from exposure to moisture and debris, as well as damage from light impacts against the housing 852. Tensioning straps 860a and 860b can be attached to the housing 852 and the waist strap 851a to help securely hold the housing 852 on the recorder 850.

The housing 852 is attached to the waist strap 851a of the harness 851 so that the housing 852 can slide along the waist strap 851a, thus enabling the data storage and system control unit 703 to be positioned at any location about the waist of the recorder 850. It is anticipated that the recorder 850 will typically choose to position the data storage and system control unit 703 at a location adjacent to the recorder's back when the recorder 850 is participating in the event (see FIG. 8B), since it is expected that that position will typically minimize interference by the data storage and system control unit 703 with participation by the recorder 850 in the event, is a more comfortable position for the recorder 850 to support the data storage and system control unit 703, and provides some protection from impacts for the data storage and system control unit 703. Similarly, it is anticipated that the recorder 850 may want or need to interact with the data storage and system control unit 703 (e.g., view a display 857, as shown in FIG. 8C) while the recorder 850 is wearing the recording unit 800 and, further, that such interaction can most easily take place if the data storage and system control unit 703 is positioned in front of (or, at least, to the side of) the recorder 850 (see FIG. 8C). Attaching the data storage and system control unit 703 as described above allows the recorder 850 to easily position the data storage and system control unit 703 in these two positions as desired.

The housing 852 can alternatively be mounted on other parts of the harness 851 and/or the housing 852 can be mounted so that the housing 852 remains in a fixed position rather than being able to slide along a strap of the harness 852.

A control interface device 855 is connected to electronics within the housing 852. A pocket 856 is formed on the housing 852 so that the control interface device 855 can be inserted into the pocket 856 when not in use by the recorder 850. The pocket 856 can be formed with an opening on both the left and right so that the control interface device 855 can be inserted into the pocket 856 from either side (this can be desirable, for example, to accommodate left- and right-handed recorders). Velcro™ can be used to close the openings after the control interface device 855 has been inserted.

The wiring (not numbered in FIGS. 8A–8C) used to connect the components of the recording unit 800, or conduits for guiding the wiring, can be sewn into the harness 851, so as to minimize or eliminate entanglement of the wiring with the recorder or other object.

The harness 851 is desirably made of a material (e.g., Cordura™, a durable, water resistant material) that can be washed (e.g., using water and appropriate cleaning agent). Further, the electronic components of the recording unit 800 are desirably constructed so that the electronic components are sealed from moisture penetration and/or can be easily removed from the harness 851 to enable cleaning. For example, the visual data acquisition device 853 can be readily detachable from the shoulder strap 851c and the housing 852 can be enclosed within a washable material (e.g. cordura).

The harness 851 can include one or more storage compartments or holders. For example, the harness 851 can includes a water bottle holder 858 (FIG. 8B). The harness 851 can also include (e.g., constructed as part of the waist strap 851a) one or more pouches, compartments and/or pockets for storage of a wallet or other valuables. It can be particularly desirable that the harness 851 include one or more pouches, compartments and/or pockets that can be sealed to enable storage of (e.g., water, sun tan lotion, food) that may otherwise present danger of damaging other parts (especially electronic components) of the recording unit 800. It can also be desirable that the harness 851 include one or more pouches, compartments and/or pockets that provide a secure enclosure that prevent the objects (e.g., a wallet or other valuables) enclosed therein from falling out of the enclosure, thereby preventing the objects from getting lost during the vigorous physical activity in which the recorder is participating. Further, the harness 851 can be implemented to enable various device holders (such as are used with handyman or policeman utility belts) to slide on to, for example, the waist strap 851a. This can advantageously eliminate the need for a separate belt or harness for carrying such device holders. The harness 851 can also be implemented to enable a hydration system (e.g., a Camelbak™ system) or water bladder to be attached thereto.

As illustrated in FIG. 8B, a battery compartment 859 extends out of the housing 852. The battery compartment 859 can be opened to enable the battery to be changed without opening the rest of the housing 852. Alternatively, the battery can be separated out as a separate component and mounted at a different location on the recorder 850 (e.g., between the shoulder blades) in order to further enhance the benefits (e.g., distribution of weight) of separating the components of the recording unit 800.

FIGS. 9A and 9B are perspective views of a recording unit 900 representing another particular physical instantiation of the recording unit 700 of FIG. 7. FIG. 9A is a front perspective view of the recording unit 900 being worn by a recorder 950. FIG. 9B is a side perspective view when the recording unit 900 is not being worn by a recorder.

Generally, the recording unit 900 can be constructed similarly to the recording unit 800 described above with respect to FIGS. 8A–8C. The recording unit 900 primarily differs from the recording unit 800 in that the construction of the harness (designated in FIGS. 9A and 9B by the numeral 951) of the recording unit 900 is different than that of the harness of the recording unit 800. The harness 951 of the recording unit 900 includes a waist strap 951a and a shoulder-strap 951b. The harness 951 can be implemented so that one or both of the waist strap 951a and the shoulder strap 951b can be adjusted (i.e., loosened or tightened about the recorder 950) to accommodate different body sizes and shapes, and to insure that the harness 951 remains securely in place on the recorder 950 during vigorous physical activity. The adjustability of the shoulder strap 951b can be implemented using, for example, a releasable mechanism 955a such as is commonly used for backpack shoulder straps. The adjustability of the waist strap 951a can be implemented using, for example, mating velcro strips 955b and/or conventional backpack release mechanisms. Since the harness 951 of the recording unit 900 includes fewer straps than the harness 851 of the recording unit 800, the recording unit 900 may provide the recorder 950 with a sense of freedom of movement that is greater than that sensed by the recorder 850. A recorder may also perceive that the harness 951 is easier to put on and take off than the harness 851.

As illustrated in FIG. 9A, a visual data acquisition device 953 can be mounted on the shoulder strap 951b. Mounting of the visual data acquisition device 953 on the shoulder strap 951b can be implemented so that the visual data acquisition device 953 can be moved to one of various positions along the shoulder strap 951b. (A mechanism for accomplishing this is described in more detail in the above-referenced U.S. patent application Ser. No. 09/225,993.)

An audio data acquisition device 954 can also be mounted on the shoulder strap 951b. The audio data acquisition device 954 can be implemented so that the audio data acquisition device 954 can be mounted at various locations on the harness 951 (it may be desirable, for reasons discussed elsewhere herein, to mount the audio data acquisition device 954 proximate to the top of the shoulder of the recorder 950). Further, the audio data acquisition device 954 can be implemented as multiple separate devices, as discussed elsewhere herein. For example, the audio data acquisition device 954 can be implemented as two microphones, each of which can be clipped on (or otherwise attached) to the recorder 950 or the harness 951. In such case, it can be desirable to mount the multiple devices symmetrically with respect to the body of the recorder 950, as also discussed elsewhere herein.

As illustrated in FIG. 9A, the recording unit 900 includes a visual recording display 957 that is attached to, or mounted on, the waist strap 951a. As illustrated in FIG. 9B, the recording unit 900 includes a pocket 952 within which one or more electronic components of the recording unit 900 can be positioned. Additionally, the harness 951 can include a pocket 956 which can be used for holding any of a variety of objects, as discussed elsewhere herein. The pocket 956 can be constructed to include a zipper so that the pocket 956 can be opened to place objects in the pocket 956 and closed to securely hold objects within the pocket 956.

The color of visible surfaces of components of a recording unit according to the invention such as the recording unit 700 can be chosen to produce desired visual characteristics. For example, as discussed above, it can be desirable that the appearance of a recording unit according to the invention be unobtrusive: making visible surfaces of components of the recording unit black can help accomplish that goal. Other colors can be chosen to connote the anticipated use of the recording unit, either generally (i.e., use during participation in a vigorous activity) or particularly (i.e., use during participation in a particular activity) or for other purposes. For example, yellow may be used for a recording unit intended for use in a sports activity, or camouflage colors may be used for a recording unit intended for use in activities such as hunting. Or, the colors of the recording unit can be chosen to complement the colors of clothing worn by the recorder (e.g., match the color(s) of a uniform, integrate fashionably with the recorder's clothing).

Though not shown in FIG. 7 (or in FIGS. 8A–8C or FIGS. 9A and 9B), a recording unit according to the invention such as the recording unit 700 can also include a marking mechanism having capabilities similar to that described above. In view of the anticipated uses of such a recording unit, it is desirable to make the marking mechanism relatively simple. For example, the marking mechanism can be implemented to include a single button that is used to effect control (e.g., specify mark(s)) of the marking mechanism. Additionally, it is anticipated that a recorder may often want to mark recording data obtained hours or days previously. Therefore, it can be advantageous to implement the marking mechanism so that the marking mechanism is physically separated from the rest of the recording unit and so that the marking mechanism includes a non-volatile data storage device that enables marking data to be stored on the marking mechanism, thus enabling the recorder to carry around the relatively small and simple marking mechanism without need to carry the entire recording unit. When the marking data is stored on the marking mechanism, the marking mechanism is constructed with a communications port that enables the marking data to transferred from the marking mechanism. Further, when the marking data is stored on the marking mechanism instead of with the recording data, temporal synchronization of marks with recording data can be enabled in the manner described below by including an LED and a real-time clock (RTC) as part of the marking mechanism. The marking mechanism can be constructed so that, during operation of the recording unit, the marking mechanism can be operated (e.g., the button can be depressed for more than a predetermined duration of time)

to cause the LED to flash, the marking mechanism being held in a position that enables the visual data acquisition device to film the flashing LED. The above-described synchronization is performed each time that recording begins again after having been stopped.

b. Hybrid Recording Unit

Above, embodiments of a recording unit according to the invention are described in which the recording unit is constructed from component parts that, together, provide the functionality of the recording unit. Recording units according to other embodiments of the invention can be constructed by adding to a portable video recorder (e.g., camcorder, portable dockable videotape recorder (VTR)) one or more devices (referred to hereinafter as the "auxiliary device") that provide functionality of a recording unit according to the invention as described above. (For convenience, such a recording unit according to the invention is sometimes referred to herein as a "hybrid recording unit.") In particular, the auxiliary device can advantageously provide one or more of the following types of functionality described above: 1) marking capability; 2) position sensing (e.g., GPS position and time measurements, electronic compass measurements); 3) physiological monitoring; and/or 4) biometric identification.

Some portable video recorders include an external communication port that enables communication with an external device. For example, some camcorders made by Sony Corporation (e.g., CCD-TR101) include such an external communication port that enables communication with an external device in accordance with a communication protocol known as LANC (also referred to as Control-L). Some camcorders sold by Ricoh (e.g., R-18H), Nikon and Canon (e.g., ES-900) also enable communication with an external device in accordance with the LANC protocol. Some camcorders made by Panasonic (e.g., AG-196U) include an external communication port that enables communication with an external device in accordance with a different, though comparable, communication protocol (referred to as a "5-pin editing terminal"). Some camcorders made by JVC (e.g., GR-DVL9000) include an external communication port that enables communication with an external device in accordance with still another comparable communication protocol referred to as JLIP. Additionally, the IEEE 1394 (e.g., Firewire or iLink) communication protocol can be used with some camcorders (e.g., Sony DCR-PC1, Sony DCR DVR 900, Panasonic AG-EZ30U) to enable communication to an external device. Additionally, SMPTE time code input can be used with professional camcorders or portable dockable videotape recorders (VTRs), such as the Sony BVV-5 dockable Beta-SP VTR, to enable synchronization with an external device. Such portable video recorders can be used to construct a hybrid recording unit according to the invention, since the communication capabilities of the portable video recorder enable the portable video recorder and auxiliary device to coordinate operation as needed to provide the additional functionality of the auxiliary device.

In addition to functionality such as marking capability, position sensing, physiological monitoring and/or biometric identification, the auxiliary device includes a system controller that controls the operation of other functional aspect(s) of the auxiliary device and mediates interaction between the auxiliary device and portable video recorder, and mechanism(s) for communicating with the portable video recorder (which communication can be wired or wireless). The construction and operation of an auxiliary device of a hybrid recording unit according to the invention can be implemented by those skilled in the art in view of the description above of implementation of the functionality embodied in the auxiliary device, as well as the description below of other aspects of a hybrid recording unit according to the invention.

It may not be possible (or it may not be desirable) to store data ("auxiliary data") acquired and/or produced by an auxiliary device on the data storage medium (e.g., videotape, DVD or hard disk) used by a portable video recorder to store recording data. In particular, typical consumer camcorders (as opposed to camcorders used for professional visual recording work) do not enable auxiliary data to be stored on the data storage medium used to store recording data. (All of the above-indicated camcorders are consumer camcorders, except the Panasonic AG-196U and Panasonic AG-EZ30U.) Such camcorders may include another data storage device on which auxiliary data can be stored, though this is often not the case. If a portable video recorder does include another data storage device, auxiliary data can be communicated to the portable video recorder via the external communication port and stored on that data storage device. If the portable video recorder does not include another data storage device, it is necessary to provide for storage of auxiliary data on another data storage device. Typically, this can be accomplished by including a non-volatile data storage device as part of the auxiliary device. Data storage devices that are relatively small and lightweight, and consume relatively little power are preferred, such as, for example, an EEPROM, flash memory, an Iomega Clik! drive, or an IBM Microdrive. However, the auxiliary device can also be constructed to communicate (in particular, wirelessly communicate) auxiliary data to a data storage device that is part of neither the auxiliary device nor the portable video recorder.

If an auxiliary device of a hybrid recording unit according to the invention stores auxiliary data on a data storage device separate from that on which recording data is stored by the portable video recorder, it is desirable to implement the hybrid recording unit with the capability to establish a temporal correspondence between the auxiliary data and recording data in order to minimize or eliminate the need for post-event processing to temporally synchronize the auxiliary data and recording data. (Herein, for convenience, a data storage medium on which recording data is stored is sometimes referred to as a "recording data storage device," while a data storage medium on which auxiliary data is stored is sometimes referred to as an "auxiliary data storage device.") The above-described camcorder communication protocols can enable data representing the value of a data counter of the camcorder (e.g., a tape counter for a videotape) to be communicated to an external device. In a hybrid recording unit according to the invention, the value of the data counter can be communicated to the auxiliary data storage device so that a temporal correspondence can be established between the auxiliary data stored thereon and the recording data stored on the recording data storage device. As an event is being recorded, the current value of the data counter can be periodically communicated to the auxiliary data storage device and stored thereon in a manner that associates the data counter value with the auxiliary data obtained at the same time. However, data counter values are typically not inherently associated with a particular storage location on a recording data storage device (i.e., any data counter value only indicates the location of the associated recording data on the recording data storage device relative to the location of other recording data acquired during the same recording in accordance with the relationship to the data counter value associated with that other recording data), so that associating a data counter value with particular auxiliary data does not by itself identify the recording data obtained at the same time as that auxiliary data (i.e., does not establish a temporal correspondence between the recording data acquired during a recording and the auxiliary data acquired and/or produced during the recording). Such a temporal correspondence can be established by additionally identifying the location on the recording data storage device at which recording data associated with any particular data counter value is stored (i.e, by establishing a reference data counter value to which all other data counter values can be related).

It is anticipated that portable video recorders with which an auxiliary device will be used to produce a hybrid recording unit according to the invention will often make use of a linear (i.e., not random access) data storage medium, such as a videotape. (For convenience, the following description is given with respect to a portable video recorder that stores recording data on a videotape; however, with appropriate modification, as will be readily understood by those of skill in the art, the description is generally applicable to portable video recorders that make use of any linear data storage medium.) Further, many of such portable video recorders do not write a time code to the linear data storage medium (Hi-8 with RC time code and mini-DV, for example, do) indicating the time at which corresponding recording data was obtained. In general, at the beginning of use of such a portable video recorder, the videotape can be wound to any position (the "initial recording position"), i.e., recording can begin at any location on the videotape. For portable video recorders that don't store time code with the recording data, to establish a temporal correspondence between the auxiliary data and the recording data, it is necessary to identify the initial recording position and communicate that information to the auxiliary data storage device. As indicated above, a communication protocol (e.g., Sony's LANC) that enables tape counter data to be communicated to the auxiliary data storage device can be used for this purpose. Prior to beginning recording, the value of the tape counter at the initial recording position is identified. The videotape is then rewound to the beginning (a "beginning data storage position") of the videotape. The value of the tape counter at the beginning data storage position of the videotape is identified. The two tape counter values are compared to each other (e.g., subtracted) to establish a tape counter offset that represents the number of tape counter counts from the beginning data storage position of the videotape to the location of the initial recording position on the videotape. The videotape is wound to the initial recording position so that recording can begin. (The tape counter values and notification that the videotape is at the beginning data storage position or the initial recording position can be ascertained by the auxiliary device and/or the auxiliary data storage device via communication with the portable video recorder in accordance with the communication protocol.) The beginning of recording can define a tape counter value of zero for the auxiliary data (which also corresponds to the location on the videotape defined by the tape counter offset). During recording, the portable video recorder can communicate incremental tape counter values (relative to the tape counter value at the beginning of recording) to the auxiliary data storage device, which stores each incremental tape counter value so that the value is associated with auxiliary data obtained at that time. Each incremental tape counter value defines the location on the recording data storage device, relative to the location defined by the tape counter offset, at which recording data is stored that corresponds to the auxiliary data associated with the incremental tape counter value. Thus, as can be seen, the determination of the tape counter offset enables a temporal correspondence to be established between the recording data and the auxiliary data.

There may be no need to calculate a tape counter offset (or other, comparable data counter offset) in some hybrid recording units according to the invention (e.g., when the hybrid recording unit includes a camcorder that uses the LANC protocol and writes RC time code to the videotape, or when the hybrid recording unit includes a mini-DV camcorder). However, in such hybrid recording units according to the invention, it can be desirable to ensure that recording begins at a location on the portable video recorder videotape immediately following the location at which the most recently acquired recording data is stored. (A current location at which recording data is to be stored may not be the same as such location due to, for example, rewinding of the videotape to enable display of previously stored recording data.) In a hybrid recording unit including a mini-DV camcorder (which stores a time code on the videotape as each video frame is acquired, and associates the time code with that video frame), for example, to ensure that newly acquired recording data is stored beginning just after the location on the videotape of the most recently acquired recording data, the hybrid recording unit can be implemented to operate in accordance with the following procedure. When recording is to begin, a determination is made as to whether a time code is stored at the current location of the videotape, in a manner as known to those skilled in the art. If not, then the videotape is rewound to a location at which storage of a time code on the videotape is detected, also in a manner as known to those skilled in the art, or until the beginning of the videotape is reached. In either case, recording begins at the location to which the videotape is rewound. If, on the other hand, a time code is stored at the current location, then the videotape is wound forward until a section of the videotape is reached at which no time codes have been stored. Then, the videotape is rewound as described above, recording beginning at the location to which the videotape is rewound. The above-described operation of a hybrid recording unit according to the invention can either be automatic (i.e., can occur each time recording begins, without explicit instruction from a recorder) or manual (i.e., can occur upon provision to the hybrid recording unit of an appropriate instruction or instructions by the recorder).

The auxiliary device can be implemented so that determination of a tape counter offset (or other, comparable data counter offset) as described above can occur automatically upon insertion of a videotape into the portable video recorder. Upon determining that a videotape has been inserted into the portable video recorder (this can be ascertained via communication with the portable video recorder in accordance with the communication protocol), the auxiliary device identifies the current tape counter value, then transmits an instruction to the portable video recorder via the external communication port to cause the portable video recorder to rewind the videotape. (Some portable video recorders may only enable rewinding of the videotape when the portable video recorder is operating in a particular mode, e.g., VCR mode; for portable video recorders for which this is true, a recorder will have to establish that mode of operation of the portable video recorder—if not already established—before the videotape can be rewound.) When the auxiliary device identifies that the videotape has been rewound to the beginning of the videotape, the auxiliary device identifies the current tape counter value. The auxiliary device then transmits an instruction to the portable video recorder to cause the portable video recorder to wind the videotape until the tape counter value of the initial recording position is reached. Before, during and/or after the videotape is wound back to the initial recording position, the auxiliary device compares the two tape counter values to determine the tape counter offset.

If it is known that the videotape is ready for recording at the beginning of the videotape, it is not necessary to determine a tape counter offset (or other, comparable data counter offset) as described above. Rather, the tape counter value can be identified by the auxiliary device and recording can begin immediately. While the method for determining a tape counter offset as described above can be used in such a circumstance (the tape counter offset will be determined to be zero), some time will elapse (e.g., several seconds) while the auxiliary device and portable video recorder operate to make the tape counter offset determination, such that content of interest is not recorded while the tape counter offset determination is made. It can be preferable to implement the auxiliary device to provide a control mechanism that enables a recorder to indicate that no tape counter offset determination is necessary, so that recording can begin immediately or nearly immediately (in any event, appreciably sooner than would otherwise occur). More generally, a recorder may find it desirable to use such control mechanism at any time, not only when it is known that the videotape is, ready for recording at the beginning of the videotape (a temporal correspondence between the auxiliary data and recording data can be established as part of post-event processing of the auxiliary data and recording data).

A temporal correspondence between the auxiliary data and recording data can be established in other ways. For example, a predetermined visual phenomenon (e.g., a flash of light) or aural phenomenon (e.g., a handclap or emission of a predetermined tone) that will be recorded by the portable video recorder can be generated at the beginning of recording. The beginning of the auxiliary data corresponds to the occurrence of the visual or aural phenomenon in the recording data stored on the recording data storage device.

II. Post-Event Use of Event Recording

A. Processing of Recording Data

1. In General

As discussed above, the recording data stored by a recording unit is typically digital data, either because of conversion of analog recording data acquired by the recording unit or because digital data acquisition devices were used to acquire the recording data. However, even if the recording data stored by a recording unit is analog, it is desirable to convert the analog recording data to digital form to enable a wider range of processing and display of the recording data as described below.

It may be desirable to temporally synchronize multiple recordings of the same event that were simultaneously obtained by different recording units according to the invention. Such synchronization can be desirable if it is desired to display the recordings in a manner that enables simultaneous observation of the recordings. Further, such synchronization is necessary if the content of multiple recordings is to be integrated in some manner to produce a display, as described further below in the discussion of ways of displaying recordings. As described above, a recording unit according to the invention typically includes a clock that is used to time-stamp recording data as the recording data is acquired. However, the clocks of different recording units may not be adequately synchronized to enable use of the time-stamps associated with the recordings obtained from different recording units to synchronize those recordings. (If recording units according to the invention each include a GPS receiver, such mis-synchronization will only exist to an appreciable degree if one or more recording units are shielded from a GPS transmitter system for an extended period of time, e.g., several hours.) Or, the recording units may not include clocks for enabling time-stamping of the recordings.

The content of multiple recordings can also be used to establish a synchronization between recordings (or to double-check a synchronization based upon time-stamps). In general, either the content of visual recordings or the content of audio recordings (or both) can be used to establish synchronization between the recording data obtained by different recording units.

For example, when two different visual recordings capture (at least in part) the same content, that overlapping visual content can be used to synchronize the visual recordings. During display of the visual recordings, one of the visual recordings can be paused while content is being displayed that is known to also be present in the other visual recording. The display of the other visual recording can then be moved either forward or backward in time until the same content is displayed in that visual recording. The locations within each visual recording can then be marked as occurring at the same time, thus synchronizing the visual recordings.

Because pausing an audio recording allows no sound to be displayed, synchronizing audio recordings cannot be done as easily as synchronizing visual recordings as described above and may not be sufficiently accurate. An analogous synchronization of audio recordings would require successive starting and stopping of the audio recordings to zero in on the overlapping audio content. Thus, when visual recordings include overlapping content, it is typically preferable to use the visual recordings to synchronize the recording data. Nevertheless, due to the (typically) relatively limited field of view of the visual recordings, it may be the case that there is little or no overlapping content in the visual recordings from different recording units, thus making the use of visual recordings to establish a synchronization difficult or impossible. (However, anticipating the need for later synchronization, recorders can intentionally operate their recording units for a short period of time to acquire overlapping visual content.) The audio recordings can be used to establish a synchronization in such case, since audio recordings typically include content from all around the recorder, thus increasing the likelihood that there will be overlapping content in the audio recordings obtained by different recording units.

It is anticipated that many users of a recording unit according to the invention will not have access to sophisticated methods and apparatus for processing recording data after an event. Advantageously, the above methods of synchronizing the post-event display of multiple recordings can be implemented without use of sophisticated methods or apparatus. However, synchronization of multiple recordings can also be accomplished using other (perhaps more sophisticated) methods and/or apparatus. For example, the audio and/or visual recording data from multiple recordings can be analyzed and compared to determine the time of occurrence of the same content within different recordings, thereby enabling the recordings to be synchronized.

As discussed above, a recording unit according to the invention can be adapted to enable marking of the recording as the recording is obtained, each mark specifying a time or duration of time during the recording. The capability can be provided to specify new marks (including defining new types of marks) as part of post-event processing of the recording data. The capability to modify existing marks in the recording data can also be provided, e.g., move the location (time) of a mark within the recording data, change the type of mark specified at a particular location within the recording data. The temporal vicinity of a mark (e.g., the exact time in the recording specified by the mark, a time in the recording that is a predetermined amount of time before or after the time specified by the mark, or a specified duration of time relative to the time specified by the mark) can also be specified as part of post-event processing of the recording data.

Often, it will be necessary to process the recording data to enable display of one or more recordings in a particular manner. For example, as indicated above, it may be desirable to integrate the content from multiple recordings to produce a display. Recording displays in which content from multiple recordings is integrated are discussed further below, together with the processing of recording data necessary or desirable to effect such displays. Other ways of displaying a recording (e.g., summarization of a recording, variation in the speed of display of a recording) may also require processing of the recording data in a particular manner; such processing is described below, as appropriate, with the discussion of such 2. Visual Data Processing It may be necessary or desirable to process the visual recording data to ameliorate undesirable characteristics of the visual recording. For example, since a guiding principle of the invention is that the recording of an event be obtained in a manner that is, in some sense, incidental (i.e., in a manner that requires little interaction by the recorder), it will often be the case that the visual recording suffers from "shake" or "jerk" (i.e., the field of view of the visual recording rapidly and repetitively goes through wide ranges of movement) that results from motion of the recorder during the recording (e.g., a rhythmic motion of the visual data acquisition device—with shocks at extremes of the motion—as the recorder walks or runs; or an abrupt movement of the visual data acquisition device as the recorder jumps from a ledge, trips over a curb or rapidly turns to look in another direction). Additionally, as discussed above, as the lens angle (i.e., field of view) of the visual data acquisition device increases, the distortion (fish-eye effect) at the edges of the recorded image can increase. It will often be desirable to remove such artifacts from the visual recording. However, in each case, whether to incur the computational cost of processing the visual recording data to improve the quality of the visual recording should be decided in view of the magnitude of the improvement: some improvements may be insufficiently great to warrant the cost associated with processing the recording data.

In general, any of a variety of known methods can be used to process visual recording data to reduce or eliminate the above-described undesirable characteristics of a visual recording. Such methods are described in, for example, the following papers, the disclosures of which are incorporated by reference herein: 1) "Creating Full View Panoramic Image Mosaics and Environment Maps," by Richard Szeliski et al., Computer Graphics Proceedings, Annual Conference Series, 1997, pp. 251–258 (referred to hereinafter as the "first Szeliski publication"); 2) "Video Mosaics for Virtual Environments," by Richard Szeliski, IEEE Computer Graphics and Applications, March 1996, pp. 22–30 (referred to hereinafter as the "second Szeliski publication"); 3) "Virtual Bellows: Constructing High Quality Stills from Video," by S. Mann et al., First IEEE International Conference on Image Processing (ICIP-94), Vol. 1, November 1994, pp. 363–367 (referred to hereinafter as the "first Mann publication"); and 4) "Video Orbits of the Projective Group: A simple approach to featureless estimation of parameters," by S. Mann et al., IEEE Transactions on Image Processing, September 1997, Vol. 6, No. 9, Oct. 15, 1996, pp. 1–31 (referred to hereinafter as the "second Mann publication"). Additionally, a technique developed by NASA and known as Video Image Stabilization and Registration (VISAR) can be used to reduce or eliminate blurring and other artifacts in a visual image.

For example, when the field of view of the visual recording undergoes rapid, repetitive movements (e.g., movements in rhythm with the recorder's walking or running), there will typically be content, generally located centrally within the range of visual content during such movement, that remains continually in the visual recording. The appearance of movement in the visual recording display can be reduced or eliminated by analyzing the visual recording data (e.g., in a video recording, comparing each successive frame of video data to one or more of the immediately previous video frames) and discarding visual recording data (for convenience, referred to herein as "transient visual recording data") that represents content that does not remain "continually" in the visual recording. Any appropriate method can be used to determine which visual recording data is transient (and should not be used to generate the visual recording display) and which is not (see, e.g., the first and second Mann publications referenced above). In particular, the analysis of the visual recording data may incorporate consideration of the frequency with which content moves into and out of the visual recording: a high frequency indicates rapid movement that may make elimination of transient visual recording data desirable, while a low frequency indicates slow movement that may make elimination of transient visual recording data unnecessary and undesirable. Alternatively or additionally, the visual data acquisition device can be instrumented (with, for example, one or more accelerometers) to identify movement of the visual data acquisition device that results in movement of the field of the view of the visual data acquisition device, and that information used to identify whether—and, if so, which—visual recording data should be eliminated. The display window can be varied in size in accordance with the amount of visual content that is discarded.

Another approach to processing visual recording data to ameliorate rapid, repetitive movement of the field of view of the visual recording is to move the display window in synchronization with the movement so that distraction associated with movement of the field of view of the visual recording is minimized or eliminated. As before, transient visual recording data is identified and eliminated. Content (for convenience, referred to herein as "focal content") that, does not correspond to transient visual recording data is displayed at a fixed location on the display screen of a display device. Content that moves into and out of the visual recording is added to and removed from, respectively, the display of the visual recording at a location on the display screen that is appropriate for that content. Thus, while the display of the visual recording appears to move around on the display screen, the focal content remains displayed at a fixed location (i.e., does not appear to move).

Still another approach to processing visual recording data to ameliorate rapid, repetitive movements of the field of view of the visual recording involves using a visual data acquisition device having a field of view larger than the area of the display window within which the visual recording will be presented. Since the visual data acquisition device field of view is larger than the area of the display window, some of the visual recording data is eliminated prior to generating the visual recording display. Identification of transient visual recording data can be one consideration in determining which visual recording data is to be eliminated.

Yet another approach to processing visual recording data to ameliorate rapid, repetitive movements of the field of view of the visual recording is to display only some of the frames of visual recording data. Displaying single frames for longer periods of time can create an image that appears to be more stable than would be the case if all of the frames of a sequence of frames of visual recording data were displayed.

As the lens angle of a visual data acquisition device increases, lines at the edges of the recorded image start to appear curved. This "fish-eye" effect can be corrected using techniques known to those skilled in the art (see, e.g., the second Mann publication referenced above, U.S. Pat. No. 5,185,667 and U.S. Pat. No. 5,796,426).

Additionally, when successive images of a visual recording include the same content in part or in whole, the parts of those images containing that content can be analyzed and combined to produce an enhanced representation of that content (see, e.g., the second Mann publication referenced above, as well as the NASA VISAR technique, also referenced above). Even when there are no distortions in a visual recording, this processing can be used to improve the quality of the visual recording.

Above, ways of reducing or eliminating distortion of a visual recording, or enhancing the quality of a visual recording, have been discussed. It may sometimes be desirable to introduce distortion into a visual recording to produce particular visual effects.

For example, the visual data can be processed, using techniques known to those skilled in the art (see, e.g., the first and second-Mann publications referenced above), to produce a visual recording display in which images are stretched or squeezed, or in which the aspect ratio of the image is changed. Stretching the visual recording display can be desirable to enable more visual content to be displayed. Squeezing the visual image can be desirable to enable information other than the visual recording to be displayed, such as, for example, information concerning the content being displayed, the time of acquisition of the displayed content, and the location at which the displayed content was acquired. Changing the aspect ratio (i.e., stretching and/or squeezing the height and width of the visual recording display in different ways) can be desirable to accommodate one or both of displaying more visual content and displaying other information.

As another example, the displayed image can be rotated with respect to the orientation at which the image was acquired. As an illustration, if the recorder was bent over or otherwise positioned so that, when visual recording data was being acquired, the visual data acquisition device was rotated with respect to the normal orientation of the visual data acquisition device, it may be desirable, when displaying the visual recording, to rotate the displayed image in an amount equal and in opposite direction to the rotation of the visual data acquisition device. Thus, a visual recording display can be produced in which a constant orientation of the displayed image is maintained regardless of rotation of the visual data acquisition device during acquisition of the visual recording data.

Other types of distortions that can be introduced into a visual recording display can actually help smooth a visual recording display that would otherwise appear jerky. Processing of video recording data to achieve this effect is known to those skilled in the art.

3. Audio Data Processing

In general, any appropriate method for processing audio data to reduce or eliminate distortion can be used as necessary to process audio recording data obtained by a recording unit according to the invention. For example, when multiple audio recordings are displayed together (either the recordings obtained by multiple audio data acquisition devices of a single recording unit or recordings obtained by multiple audio data acquisition devices of different recording units), the differences in position of the audio data acquisition devices and/or differences in synchronization of the audio recordings may produce echo. However, as known to those skilled in the art, methods exist for processing multiple audio recordings to reduce or eliminate echo; those methods can be used for the same purpose in processing audio recordings obtained by recording units according to the invention. Further, the position information and time codes that can be obtained by a recording unit according to the invention can be used to identify the position of each recording unit at any particular time, thus facilitating such processing by enabling the delays between recording units to be calculated.

Additionally, like visual recording data obtained by a recording unit according to the invention, it may be desirable to process audio recording data obtained by a recording unit according to the invention to add distortion to the audio data. For example, it may be desirable to process the audio recording data to eliminate or reduce background noise or identifiable sounds that are undesirably present in the audio recording. Conventional techniques, known to those skilled in the art, can be used to process audio recording data in this way.

Processing of the audio recording data can be performed for other purposes as well. As discussed above, beam forming can be used to discriminate among various sound sources in an audio recording. In the discussion above, beam forming was used to eliminate audio data during the recording of an event so that only audio data that was anticipated to be of particular interest or importance to the recorder is stored on a data storage device of the recording unit. Beam forming can also be used after an event as part of the post-event processing of the audio recording. This may be preferable to performing beam forming during recording of the event, since, as discussed above, the latter may result in the loss of valuable audio recording data. Further, particularly as part of post-event processing of recording data, beam forming can be performed using audio recording data obtained by microphones from multiple recording units.

The implementation of beam forming is known by those skilled in the art and is described in more detail in, for example, "A microphone array for car environments," by Yves Grenier, Speech Communication, Vol. 12, No. 1, March 1993; "Computer-steered microphone arrays for sound transduction in large rooms," by J. L. Flanagan et al., J. Acoust. Soc. Am., Vol. 78, No. 5, November 1985; and "An Algorithm for Linearly Constrained Adaptive Array Processing," by Otis Lamont Frost III, Proceedings of the IEEE, Vol. 60, No. 8, August 1972, the disclosures of which are incorporated by reference herein. Beam forming can be used, for example, to identify the location from which sounds emanate. As discussed above, it may be desirable to eliminate audio recording data that corresponds to sounds which do not emanate from a location in front of the recorder. Beam forming can also be used to enable the display of sounds only from particular sources. For example, it might be desired to display only the speech of a particular person or group of persons. Beam forming can be used to identify the audio recording data that includes the speech of that person or group of persons. Only that audio recording data is then used to generate a display of the audio recording. The use of beam forming to identify audio data corresponding to particular speakers is described in, for example, U.S. Pat. No. 5,694,474, entitled "Adaptive Filter for Signal Processing and Method Therefor," issued to John-Thomas Calderon Ngo et al., on Dec. 2, 1997, the disclosure of which is incorporated by reference herein.

The audio recording data can also be augmented with other audio data during post-event data processing. For example, music can be added to the audio recording data.

B. Display of Recorded Event

1. In General

It is anticipated that, frequently, multiple recording units according to the invention will be used to simultaneously obtain multiple recordings of an event. As described further below, it can be desirable to simultaneously display multiple recordings of an event that were simultaneously obtained by different recording units. However, the capability of viewing any single recording of an event, selected from multiple recordings of the event, and the capability of serially viewing multiple recordings of an event, are also very desirable in their own right.

In particular, since a recording unit according to the invention is intended to be operated with little or no attention from the recorder, it can be expected that, at many times during an event, the recording obtained by a particular recording unit will be deficient in some way. For example, content of interest may not be captured in the recording. Or, content of interest may not be captured as well as desired (e.g., visual content is not framed as desired or background noise obscures audio content of interest). When multiple recordings of an event are obtained, there is a reasonable likelihood that, at a time when the recording obtained by a particular recording unit is deficient in some way, another recording unit obtained a recording that does not suffer from that deficiency. (Or, if neither recording is deficient, one recording may still be better in some way.) For example, as a result of differences in proximity to the source of audio content of interest, one recording may have captured the audio content better than another recording and/or may have acquired visual recording data have better resolution than the other recording. Or, if the recording obtained by one recording unit has background noise that obscures a conversation of interest, a recording obtained by another recording unit may well have obtained a recording of that conversation that is not so obscured. Or, if one recording unit missed filming particular activity of interest, the existence of other recordings provides the possibility that the activity was captured in one of those recordings. In general, then, the existence of multiple recordings tends to increase the quality of the recording of an event.

Additionally, each recorder, whose recording unit will not record visual recording data including the recorder's participation in an event (unless the recorder allows another participant to use the recording unit or, at least, the visual data acquisition device of the recording unit), can be expected to be desirous of viewing, in addition to the recording obtained by the recorder's recording unit, a recording of the event that includes visual content in which the recorder is present. The existence of multiple recordings increases the likelihood that, at any given time, a recorder is present in a visual recording of the event.

Rather than serially displaying entire recordings of an event, it can be desirable to serially display segments of multiple recordings that are temporally coincident (i.e., to view a particular activity as recorded by different recording units). It may further be desirable to display the same audio recording with each visual recording segment, either by selecting one of the audio recordings or by blending the multiple audio recordings (as discussed further elsewhere herein).

As indicated above, it is also desirable to simultaneously display multiple different recordings of the same event. Like the serial display of single recordings, displaying multiple recordings simultaneously can enable each recorder to observe (view or listen to) activity during an event of which the recorder may not have been aware, as well as view content that includes the recorder (which typically will not be part of the recording obtained by that recorder). Further, it will usually be desirable that multiple recordings displayed at the same time be temporally synchronized. (An initial synchronization can be accomplished as described above.) The concurrent viewing of synchronized recordings obtained from different viewpoints during an event is an informative and interesting viewing experience that cannot be obtained by a viewing a single recording from one point of view.

Some display devices may not adequately maintain synchronization of the display over time. Typical consumer videocassette recorders (VCRs) are subject to playback drift that over a relatively short time will result in an unacceptable loss of synchronization between recordings displayed by different VCRs. Expensive VCRs (e.g., those currently costing about $5000 to $40,000, such as the Sony EVO-9850 Hi-8 VCR and the Panasonic A6-DS555 S-VHS VCR) operating under control of an edit controller that is connected to, or includes, a common time-based correcting unit do not suffer from this problem.

It can further be desirable to integrate the content of multiple recordings in some manner. For example, the displays of multiple recordings can be located with respect to each other (either on a single display device or multiple display devices) in a manner that replicates the spatial relationship of the content of the respective recordings within the environment in which the recordings were obtained. Using techniques known to those skilled in the art, as discussed further elsewhere herein, position information (and, perhaps, the related derivative information) obtained by position sensing devices of the recording units that obtained the recordings can be used to enable such spatial integration of the displays of multiple recordings, since the position information can be used to determine the relative locations and orientations of those recording units throughout the recordings. It may also be possible to use the content of the recordings themselves to spatially integrate the recording displays (especially if the content of the recordings overlaps), again using techniques known to those skilled in the art.

Multiple recordings can be blended to form a single displayed recording. Ways of blending visual recording data and audio recording data are discussed in more detail below.

Multiple recordings can also be integrated in other ways. For example, a single integrated recording display can be formed by combining segments of different recordings obtained at different times. Such a recording may further be characterized in that the successive recording segments are temporally synchronized so that the end of one segment corresponds temporally with the beginning of the next segment. Thus, for example, a single display of the entire event can be constructed in which different recordings are being displayed at various times. Such a display may be desirable, for example, as a way to concisely display the "best" overall content obtained by all of the recording units during the event.

A single integrated recording display can also be formed by combining different types of recording data obtained at the same time by different recording units. For example, the audio recording obtained over a particular duration of time by one recording unit can be combined with the visual recording obtained over the same duration of time by a different recording unit. Again, such a display may be desirable as a way to concisely display the "best" overall content obtained by all of the recording units during the event. Similarly, such a display may be created to display the best audio recording for a particular visual recording or vice versa. As an illustration, one recorder may obtain a visual recording of a conversation between two other recorders: it may be preferable to use that recorder's visual recording of the conversation because neither of the visual recordings obtained by the other two recorders will include both conversing recorders. However, the best recording of the speech of each recorder will typically be the audio recording obtained by that recorder. Thus, it may be preferable to alternately use the audio recordings of those two recorders, depending upon who is speaking at any given time. Or, the audio recordings obtained by those two recorders can be blended (as described elsewhere herein) and displayed as a single audio recording.

A single integrated recording display can also be formed by locating and combining different views of the same space. The views can be taken from different recordings or a single recording.

Multiple recordings can also be displayed simultaneously in a non-integrated way. Examples of such visual and audio recording displays are discussed in more detail below.

As described above, a recording unit according to the invention can be adapted to enable marking of a recording as the recording is obtained. (As indicated above, each mark can be used to specify a time or duration of time during the recording and can have associated therewith a predetermined meaning.) Marks can be used to search, display and/or process recording data. Such searching, display and/or processing can take place during recording of an event (if the recording unit is adapted to enable such functionality) or after recording of an event (including after recording and marking data has been transferred to another device). To make maximum use of the flexibility in searching, displaying and/or processing a recording that is provided by marking the recording, the recording data is preferably stored on a non-linear data storage medium (such as a conventional hard disk or DVD disk) that enables immediate access to any of the recording data, rather than on a linear data storage medium, such as a tape.

The marks can be used to effect display of the marked recording in a particular manner. In general, a mark enables an observer of a displayed recording to quickly move to recording content in the temporal vicinity of the marked part of the recording. (What can constitute "temporal vicinity" is discussed in more detail above.) For example, marks can be used as a tool for enabling skimming of a recording, replay of a part or parts of a recording, or summarizing of a recording. Marks can be used to control display of a recording either automatically or under control of an observer of the recording. For example, all marked parts of a recording, or all parts of a recording marked by a mark having a particular meaning, can be displayed automatically. (Automatic display further necessitates that both the beginning and end of a marked part be identified in some manner, either explicitly or relative to a specified location in the recording, e.g., the location of a mark.) Similarly, during observation of a recording, an observer could (with appropriate adaptation of the display device, as can be understood by those skilled in the art) control a display device to fast-forward or skip to a part of a recording marked by any mark or a mark having particular meaning.

As discussed above with respect to non-contemporaneous marking (i.e., retrospective and predictive marking), in addition to specifying the time of a mark, a confidence level can be specified indicating the level of certainty that the time of the mark corresponds to the content that the recorder is seeking to mark. A specified confidence level can be used to affect the display of a corresponding marked part of the recording. For example, the magnitude of the confidence level can be used to determine a duration of time prior to the marked time at which to begin the display: as the confidence level decreases, the duration of time increases, thus increasing the likelihood of displaying the content of interest. Or, for example, if the mark specifies a particular time during the recording, the magnitude of the confidence level can be used to determine a duration of time, relative to the marked time, to display: as the confidence level increases, the duration of time decreases. Illustratively, a 50% confidence level might cause the display of a minute of a recording (centered about the time of the mark), a 75% confidence level might cause the display of 45 seconds of the recording, and a 100% confidence level might cause the display of 30 seconds of the recording. The durations of display can also be adjusted in accordance with the recency of a mark, e.g., as the duration of time between the marked time and the marking time increases, the duration of the display can increase a corresponding amount. The magnitude of the confidence level can also be used to affect the speed with which a recording is displayed. For example, the recording display speed can decrease as the confidence level increases. Further, the manner in which the recording is displayed based on the confidence level (as well as the magnitude of the range of times and/or the confidence level, as discussed above) can be made dependent upon the recency of the mark. Additionally, the recording unit can be implemented so that a confidence level is automatically associated with a mark based on the recency of the mark. For example, the confidence level can decrease with increase in the duration of time between the marked time and the marking time.

The use of marks to effect display of a recording entails use of the marks to search the recording data. Marks can also be used to enable searching of recording data without subsequent display. A recording can be searched to identify any marked part of a recording or only parts of a recording marked with a particular type of mark or marks. For example, it may be desirable to search recording data to identify particular marked parts of a recording and discard parts of the recording data that were not recorded within a predetermined duration of time from the time of the marks.

Though it is contemplated that it will be particularly useful for a recorder to be able to specify marks in a recording as the recording is being obtained, it can also be useful to provide a device that enables a recorder or other person (e.g., an observer of the recording display other than a recorder) to add marks to the recording (including defining new types of marks), modify existing marks (e.g., move the location of a mark within the recording data, change the type of mark specified at a particular location within the recording data), or delete existing marks after the recording has been obtained (i.e., post-event). The temporal vicinity of a mark (e.g., the exact time in the recording at which the mark was specified, a time in the recording that is a predetermined amount of time before or after the time at which the mark was specified, or a predetermined duration of time relative to the time at which the mark was specified) can also be specified as part of post-event processing of the recording data. Nevertheless, it may be desirable to implement such capability so that it can be disabled by, for example, the recorder who obtained the recording. It may also be desirable to enable one or more people that add marks to prevent (either automatically or at the direction of the person adding the mark) deletion or modification of the marks that they add.

As indicated above, a mark enables an observer of a displayed recording to quickly move to recording content in the temporal vicinity of the marked part of the recording. (What can constitute "temporal vicinity" is discussed in more detail above.) The display device can be adapted to allow the observer to specify the temporal vicinity of a mark as the observer is observing a recording.

The display of a recording can be augmented with additional information regarding data acquired during recording in addition to recording data, as well as information derived therefrom. In particular, such information can concern the "recording state" at the time displayed content was recorded. For example, the time of recording, position information (i.e., location of the recorder and/or orientation of the data acquisition device) obtained by a position sensing device, related derivative information (e.g., velocity of the recorder) determined from the position information, information regarding control settings of the data acquisition device (e.g., setting of the lens focusing mechanism, white balance, pedestal, aperture and/or gain of the visual data acquisition device, or setting of the audio pickup pattern of the audio data acquisition device), or physiological monitoring information (either raw physiological data, or physiological monitoring information gleaned from raw physiological data, such as the level of excitement of the recorder) can be displayed. It is also possible, after reviewing a display of the recording, to add information to the display regarding the content of the recording, such as a description of the location at which the recording occurred, the activity recorded, and a person or persons that were recorded. Other types of information, such as the recorder's thoughts at the time particular content was recorded or thoughts about the content that was recorded can also be added to the display. Additionally, some of the above-described information can be displayed in context. For example, an indication of the location of the recorder at the time when currently displayed content was recorded can be displayed within a map of the space within which the recorded event took place. Or, for example, the time at which particular content was obtained can be displayed within a representation of the duration of the recording, indicating, for example, whether the recorded activity took place near the beginning, middle or end of the event. Augmenting a display with additional information as above can be particularly desirable when the recording content remains substantially constant over a period of time. For example, an audiovisual recording of a ski run can be enhanced by a display of the skier's level of excitement (as determined from physiological monitoring data) during the run. Or, the display of position information during an audiovisual recording of a skier's activity can aid a viewer's recollection of where on a mountain particular skiing occurred.

A recording can also be displayed in a variety of ways as a result of particular processing of the recording data. For example, the display rate of a recording can be varied (either speeded up or slowed down). In general, any appropriate method can be used to vary the display rate of a recording obtained by a recording unit according to the invention. For example, a method as described in the above-referenced U.S. patent application Ser. No. 08/760,769 can be used to vary the display rate of a recording.

A recording can also be summarized. In general, any appropriate summarization method can be used to summarize a visual recording and/or an audio recording obtained by a recording unit according to the invention. For example, a method as described in commonly owned, co-pending U.S. patent application Ser. No. 08/761,025, entitled "Indirect Manipulation of Data Using Temporally Related Data, with Particular Application to Manipulation of Audio or Audiovisual Data," filed on Dec. 5, 1996, by Emanuel E. Farber and Subutai Ahmad, the disclosure of which is incorporated by reference herein, can be used to summarize a recording.

It may also be desirable to extract keyframes from a visual recording. In general, this can be done using any appropriate method. For example, a method as described in commonly owned, co-pending U.S. patent application Ser. No. 08/528, 891, entitled "A Method of Compressing a Plurality of Video Images for Efficiently Storing, Displaying and Searching the Plurality of Video Images," filed on Sep. 15, 1995, by Subutai Ahmad, the disclosure of which is incorporated by reference herein, can be used to extract keyframes from a visual recording.

2. Visual Recording Display

When the visual recording is a continuous visual recording of the event obtained by a video camera, the display of the visual recording is usually a display of all, or one or more segments, of the visual recording. Such display can be generated using any appropriate apparatus, such as a computer display monitor or television. Still images can be displayed on a display device such as a computer display monitor or television, or can be displayed as photographs.

Simultaneous display of multiple visual recordings can be accomplished by providing a visual display device for each visual recording. Alternatively, it can be desirable to provide a single visual display device having the capability to simultaneously display multiple visual recordings. With the addition of appropriate processing capability (e.g., specialized video cards), computer display monitors can display multiple visual recordings at one time. Televisions also have capabilities such as picture-in-picture that allow simultaneous display of multiple recordings.

Multiple visual recordings can be combined to form a panoramic visual display (either a video display or a still image). To construct such a panoramic visual display, the spatial relationship of the content of the visual recordings must be determined, as discussed above. Overlapping and adjacent images of different recordings that were obtained at the same time can be blended (using methods known to those skilled in the art; see, e.g., the first and second Szeliski publications referenced above, and the paper entitled "Dealing with Speed and Robustness Issues for Video-Based Registration on a Wearable Computing Platform," by Li-Te Cheng et al., IEEE Second International Symposium on Wearable Computers, Oct. 19–20, 1998, p. 84 et seq., referred to hereinafter as the "Cheng publication", the disclosure of which is incorporated by reference herein); or otherwise combined to form a single image.

Multiple visual recordings can also be combined to form a visual display (either a video display or a still) other than a panoramic display (i.e., the combined images need not be from the same nodal point). The images can be combined to form either two-dimensional or three-dimensional displays. Overlapping images can be combined and/or images can be synthesized to fill in gaps between images generated from recording data. Techniques that can be used to generate such visual displays are described in, for example, the paper entitled, "An Architecture for Multiple Perspective Viewing," by Patrick Kelly et al., ACM Multimedia '95, 1995, San Francisco, Calif., pp. 201–212, the disclosure of which is incorporated by reference herein.

Multiple visual recordings can also be displayed simultaneously in a non-integrated way. For example, multiple visual recordings can be displayed together to form a visual collage (with or without audio). The collage can be comprised of moving or still visual images.

Though a continuous visual recording can (and often will) be displayed by displaying all, or one or more segments, of the visual recording, it is also possible to display only single images (e.g., frames) of the visual recording, thus effectively producing a display similar to that produced by a visual recording comprised of a set of still images. While the displays are similar, it can be preferable to display single images from, or based upon, a continuous visual recording for a variety of reasons. For example, a continuous visual recording provides a larger set of images from which to select an image to be displayed.

It is also possible to synthesize a single image from multiple images of a continuous visual recording (see, e.g., the second Mann publication referenced above). Such synthesis can be used to generally improve the quality of a continuous visual recording or to produce very high-quality still images.

Single images from a continuous visual recording can also be used to create a panoramic image. (In fact, the recording unit can intentionally be operated, i.e., the visual data acquisition device can be panned over a desired area—in either a controlled or casual manner—by the recorder so as to acquire single images that enable the creation of such a panoramic image.) Images of adjacent and/or overlapping content can be stitched together using one of a variety of known techniques to create the panoramic image. Such stitching methods that can be used with the invention are described in, for example, U.S. Pat. Nos. 5,396,583, 5,510,830 and 5,262,856, the disclosures of which are incorporated by reference herein. Methods that can be used are also described in the first and second Szeliski publications referenced above, as well as the Cheng publication referenced above. If the content of the scene of which it is desired to create a panoramic image is relatively unchanging, differences in time of acquisition of the images used to create the panoramic image are often relatively unimportant. As the rapidity with which the content of the scene changes increases, it becomes relatively more important to obtain the images within a short time period of each other.

Single images from a continuous visual recording can also be used to create other types of composite images. There are a large variety of types of composite images and techniques for creating composite images that have been developed by others. In general, any of those techniques can be used to create a composite image, and any of those types of composite images can be created, from the images of a continuous visual recording obtained by a recording unit according to the invention. For example, some methods enable the visual recording data for a visual recording of an event of known type to be analyzed and images of activity meeting certain criteria culled from the visual recording and combined into a single visual display (e.g., a collage). (Such methods can also be used to summarize a recording and/or to enable searching of a recording, as can be appreciated by those skilled in the art.) Illustratively, a method of this type can enable images of a run being scored to be extracted from a visual recording of a baseball game.

3. Audio Recording Display

In general, the audio recording display can be generated using any appropriate devices. Often, the audio recording display will be generated using speakers that are part of a device used to generate the visual recording display.

Audio recording data can be processed so that only particular audio content from the audio recording is displayed. For example, as described above, beam forming can be used to discriminate among various sound sources in an audio recording. Such discrimination can be used to cause recording content to be displayed that includes sounds emanating from a particular source or sources (e.g., a particular person or group of persons).

As described above, it is desirable to display multiple recordings simultaneously. For such simultaneous display, the audio portion of multiple recordings can be integrated to produce a single audio recording display or the audio recordings can be displayed simultaneously without integration.

It may be possible and desirable to integrate audio recordings obtained by different audio data acquisition devices by blending the audio recording data acquired by those audio data acquisition devices. It may be particularly desirable—and most feasible—to blend audio recordings obtained by multiple data acquisition devices that are part of the same recording unit. It may also be possible to blend audio recordings obtained by multiple data acquisition devices that are part of the different recording units. However, in the latter case, during some or all of an event recorders may be sufficiently far removed from each other that their recording units acquire audio recordings including audio content that is so different that the audio content cannot be blended in a meaningful way.

Audio recording data can be blended in any appropriate way. For example, an audio mixer can be used to select audio recording data from multiple audio recordings in accordance with specified characteristics, and the selected audio recording data used to generate an audio display. Or, for example, position information obtained during recording can be used to identify the location at which particular audio recording data was obtained and the audio recording data mixed as appropriate. Or, for example, as described above, position information obtained during recording can be used with a beam forming technique to isolate particular sounds in the audio. The audio recordings of sounds to be retained in the audio display are blended and displayed.

It can also be desirable to simultaneously display multiple audio recordings without blending the audio recording data. Omni-directional microphones that can be used in a recording unit according to the invention to acquire audio data can overly emphasize the loudness of the recorder's voice. Directional microphones are intended to acquire audio data preferentially; it may be realized after the event has been recorded that such preferential recording has caused sounds of interest to be minimized or eliminated from the audio recording. Displaying multiple recordings can ameliorate both of these problems: in the former case, the addition of other recordings reduces the prominence of a recorder's voice from any one recording, while in the latter, the addition of other recordings increases the chance that audio content not captured satisfactorily in one recording will be recorded adequately in another. Further, during an event, recorders may be sufficiently far removed from each other that, apart from any limitations of the particular audio data acquisition devices used, the recording units acquire audio recordings including different audio content. Simultaneous display of audio recordings can give a more complete representation of the audio content over the space traversed by recorders during an event, both by better reproducing the content that existed and by better replicating the richness of the audio space (particularly if the audio display is implemented so as to reproduce the spatial relationships of the recording units during recording) that may have existed in that space.

Various embodiments of the invention have been described. The descriptions are intended to be illustrative, not limitative. Thus, it will be apparent to one skilled in the art that certain modifications may be made to the invention as described above without departing from the scope of the claims set out below.

We claim:

1. A hybrid recording unit for use in recording an event, comprising:
- a portable video recorder, the portable video recorder configured to receive data from a portable video camera configured to generate video data representing the event, wearable by a user, the portable video recorder, further comprising:
  - means for recording live said video data representing the event; and
  - an external communication port for communicating with an external device;
- an auxiliary device, comprising:
  - means for producing and/or acquiring auxiliary data during the recording of the event; and
  - means for communicating with the portable video recorder via the external communication port of the portable video recorder; and
- means for establishing a temporal correspondence between the auxiliary data and: said recorded video data representing the event;
- a controller configured to monitor a physiological characteristic of the user wherein the physiological characteristic identifies a part of the event and may be used to modify the recording of the event; and
- wherein establishing a temporal correspondence comprises associating the auxiliary data with a corresponding portion of the recorded video data representing the event that was recorded at approximately the same time that the auxiliary data was produced and/or acquired.

2. A hybrid recording unit as in claim 1, wherein the auxiliary data is of a type that cannot be acquired by the portable video recorder.

3. A hybrid recording unit as in claim 1, wherein the means for producing and/or acquiring auxiliary data further comprises means for specifying a mark that is associated with particular recording data acquired by the portable video recorder.

4. A hybrid recording unit as in claim 3, wherein the means for specifying a mark further comprises means for specifying multiple types of marks.

5. A hybrid recording unit as in claim 1, wherein the auxiliary device further comprises a non-volatile data storage device for storing auxiliary data.

6. A hybrid recording unit as in claim 5, wherein the non-volatile data storage device further comprises an EEPROM.

7. A hybrid recording unit as in claim 5, wherein the non-volatile data storage device further comprises a flash memory device.

8. An auxiliary device for use with a portable video recorder, the portable video recorder configured to receive data from a portable video camera configured to generate video data representing an event, the portable video recorder, wearable by a user, further being adapted to record live said video data representing the event, the auxiliary device comprising:
- means for producing and/or acquiring auxiliary data during said live recording of the event;
- means for communicating with the portable video recorder via an external communication port of the portable video recorder;
- a non-volatile data storage device for storing auxiliary data; and
- means for establishing a temporal correspondence between the auxiliary data and said recorded video data representing the event;
- a controller configured to monitor a physiological characteristic of the user wherein the physiological characteristic identifies a part of the event and may be used to modify the recording of the event; and
- wherein establishing a temporal correspondence comprises associating the auxiliary data with a corresponding portion of the recorded video data representing the event that was recorded at approximately the same time that the auxiliary data was produced and/or acquired.

* * * * *